US012561052B2

(12) United States Patent
Kim et al.

(10) Patent No.: US 12,561,052 B2
(45) Date of Patent: Feb. 24, 2026

(54) USER INTERFACE FOR MANAGING RETARGETING OF DASHBOARD CONTENT

(71) Applicant: Salesforce, Inc., San Francisco, CA (US)

(72) Inventors: Hyeok Kim, Chicago, IL (US); Matthew Michael Brehmer, Seattle, WA (US)

(73) Assignee: Salesforce, Inc., San Francisco, CA (US)

( * ) Notice: Subject to any disclaimer, the term of this patent is extended or adjusted under 35 U.S.C. 154(b) by 57 days.

(21) Appl. No.: 18/240,342

(22) Filed: Aug. 30, 2023

(65) Prior Publication Data

US 2024/0077989 A1 Mar. 7, 2024

Related U.S. Application Data

(60) Provisional application No. 63/409,165, filed on Sep. 22, 2022, provisional application No. 63/407,986, (Continued)

(51) Int. Cl.
*G06F 3/04847* (2022.01)
*G06F 3/0482* (2013.01)
(Continued)

(52) U.S. Cl.
CPC ........ *G06F 3/04847* (2013.01); *G06F 3/0482* (2013.01); *G06F 3/0484* (2013.01);
(Continued)

(58) Field of Classification Search
CPC .. G06F 3/04847; G06F 3/0482; G06F 3/0484; G06F 9/451; G06F 9/453;
(Continued)

(56) References Cited

U.S. PATENT DOCUMENTS 7,945,846 B2 5/2011 Beauchamp et al.
11,010,031 B2 5/2021 Migunova et al.
(Continued)

FOREIGN PATENT DOCUMENTS

WO WO-2013181074 A1 12/2013
WO WO-2018117970 A1 6/2018

OTHER PUBLICATIONS

"Grafana—Share a Panel." Captured Aug. 11, 2022. https://web.archive.org/web/20220811191958mp_/https://grafana.com/docs/grafana/latest/sharing/share-panel/ (Year: 2022).*
(Continued)

*Primary Examiner* — Matthew Ell
*Assistant Examiner* — Alvaro R Calderon, IV
(74) *Attorney, Agent, or Firm* — Morgan, Lewis & Bockius LLP

(57) ABSTRACT

A computing device displays a user interface that includes a first snapshot that is authored by a user of the computing device and displayed on a messaging application of a collaboration platform. The device displays information regarding metadata of one or more originating dashboards corresponding to the one or more snapshot components of the first snapshot. In response to detecting a first user selection of a notification, displayed in the user interface, indicating that the first snapshot has expired, the device transmits one or more identifiers of the one or more originating dashboards to a computer system and receives, from the computing system, updated data for the one or more snapshot components of the first snapshot. The device generates an updated view of the first snapshot according to the received updated data and displays the updated view of the first snapshot in the user interface.

20 Claims, 68 Drawing Sheets

Related U.S. Application Data filed on Sep. 19, 2022, provisional application No. 63/404,518, filed on Sep. 7, 2022, provisional application No. 63/403,167, filed on Sep. 1, 2022.

(51) Int. Cl.

| | |
|---|---|
| *G06F 3/0484* | (2022.01) |
| *G06F 9/451* | (2018.01) |
| *G06F 16/23* | (2019.01) |
| *G06F 16/26* | (2019.01) |
| *G06T 11/20* | (2006.01) |
| *G06T 11/60* | (2006.01) |
| *H04L 51/07* | (2022.01) |

(52) U.S. Cl.
CPC .............. *G06F 9/451* (2018.02); *G06F 9/453* (2018.02); *G06F 16/2358* (2019.01); *G06F 16/26* (2019.01); *G06T 11/206* (2013.01); *G06T 11/60* (2013.01); *H04L 51/07* (2022.05); *G06F 2203/04803* (2013.01)

(58) Field of Classification Search
CPC ................ G06F 16/2358; G06F 16/26; G06F 2203/04803; G06T 11/206; G06T 11/60; H04L 51/07; H04L 12/1813; G06Q 10/101; G06Q 10/103

See application file for complete search history.

(56) References Cited

U.S. PATENT DOCUMENTS

| | | | |
|---|---|---|---|
| 11,250,032 B1 | 2/2022 | Moss et al. | |
| 11,429,253 B2 | 8/2022 | Atallah et al. | |
| 2009/0260060 A1 | 10/2009 | Smith et al. | |
| 2021/0124541 A1 | 4/2021 | Moy et al. | |
| 2022/0109707 A1 | 4/2022 | Butterfield et al. | |
| 2022/0147205 A1 | 5/2022 | Koste et al. | |

OTHER PUBLICATIONS

Kim, Notice of Allowance, U.S. Appl. No. 18/240,322, Jul. 7, 2025, 14 pgs.
Kim, Office Action, U.S. Appl. No. 18/240,322, Mar. 18, 2025, 20 pgs.
Salesforce, Inc., International Search Report and Written Opinion, PCT/US2023/031774, Jan. 4, 2024, 24 pgs.

* cited by examiner

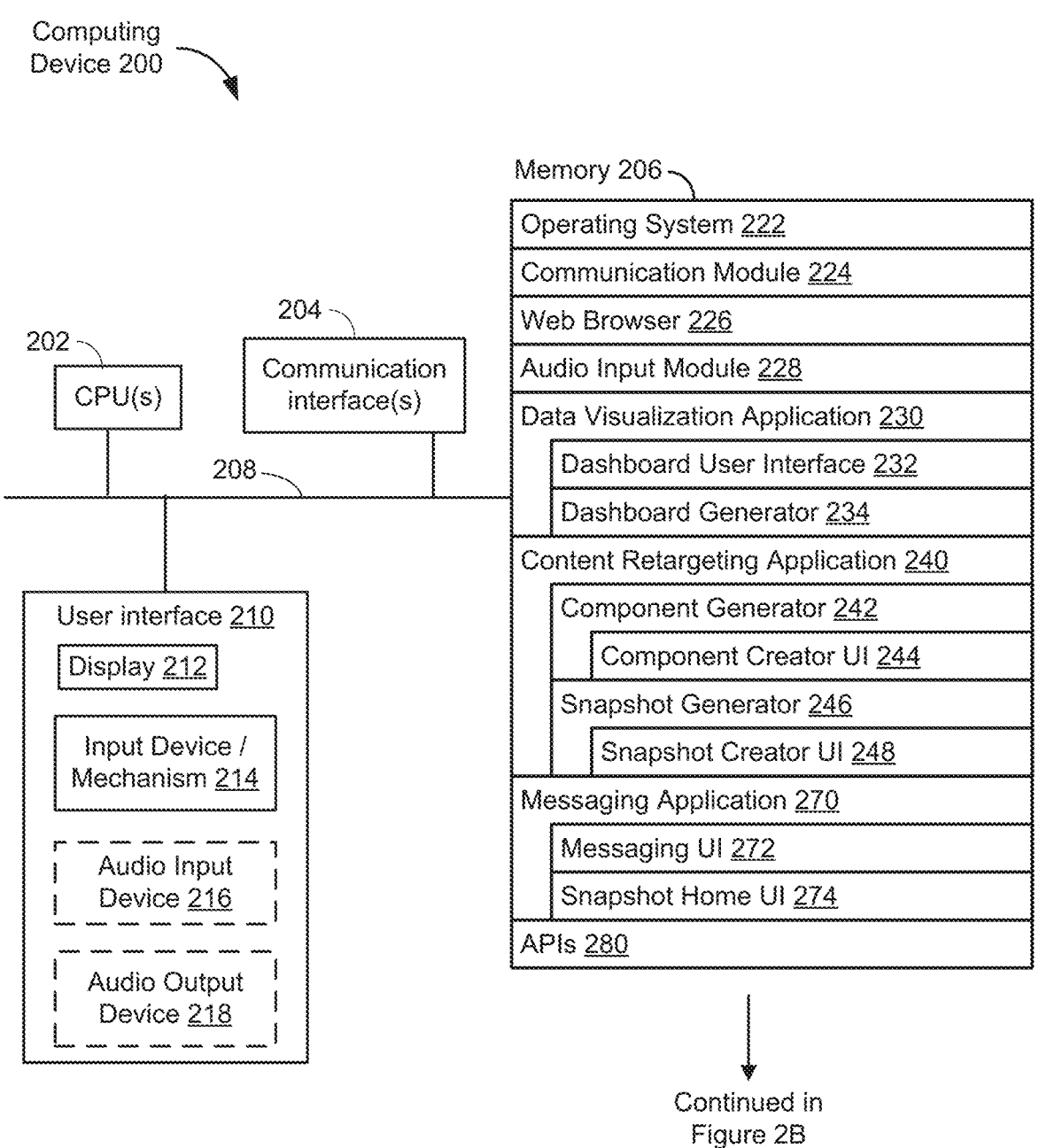

Computing Device 200

202 — CPU(s)

204 — Communication interface(s)

208 —

User interface 210

Display 212

Input Device / Mechanism 214

Audio Input Device 216

Audio Output Device 218

Memory 206

Operating System 222

Communication Module 224

Web Browser 226

Audio Input Module 228

Data Visualization Application 230

Dashboard User Interface 232

Dashboard Generator 234

Content Retargeting Application 240

Component Generator 242

Component Creator UI 244

Snapshot Generator 246

Snapshot Creator UI 248

Messaging Application 270

Messaging UI 272

Snapshot Home UI 274

APIs 280

Computing
Device 200
(cont'd)

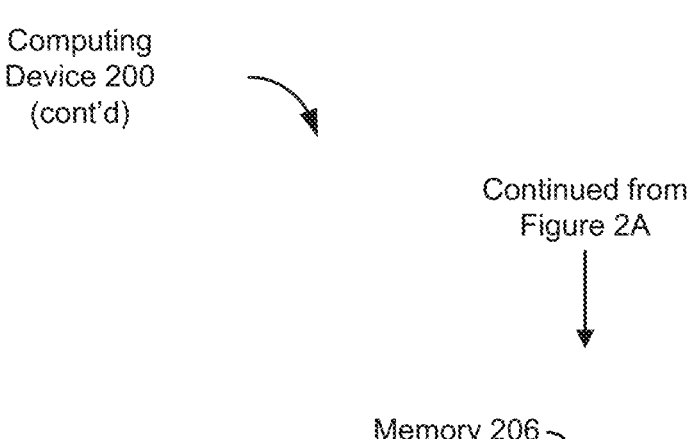

Continued from
Figure 2A

Memory 206

| Component Specifications 250 |
|---|
| Component 1 Specification 250-1 |
| Component 2 Specification 250-2 |

| Snapshot Components 252 |
|---|
| Snapshot Component 1 252-1 |
| Snapshot Component 2 252-2 |

| Snapshot Specifications 254 |
|---|
| Snapshot 1 Specification 254-1 |
| Snapshot 2 Specification 254-2 |

| Data Snapshots 256 |
|---|
| Data Snapshot 1 256-1 |
| Data Snapshot 2 256-2 |

| Data Dashboards 258 |
|---|
| Data Dashboard 1 258-1 |
| Data Dashboard 1 elements 260-1 |
| Data Dashboard 2 258-2 |
| Data Dashboard 2 elements 260-2 |

| Templates 262 |
|---|
| Template Specifications 264 |

| Database / Data sources 266 |
|---|
| Data Source 1 266-1 |
| Data Source 2 266-2 |

Figure 2B

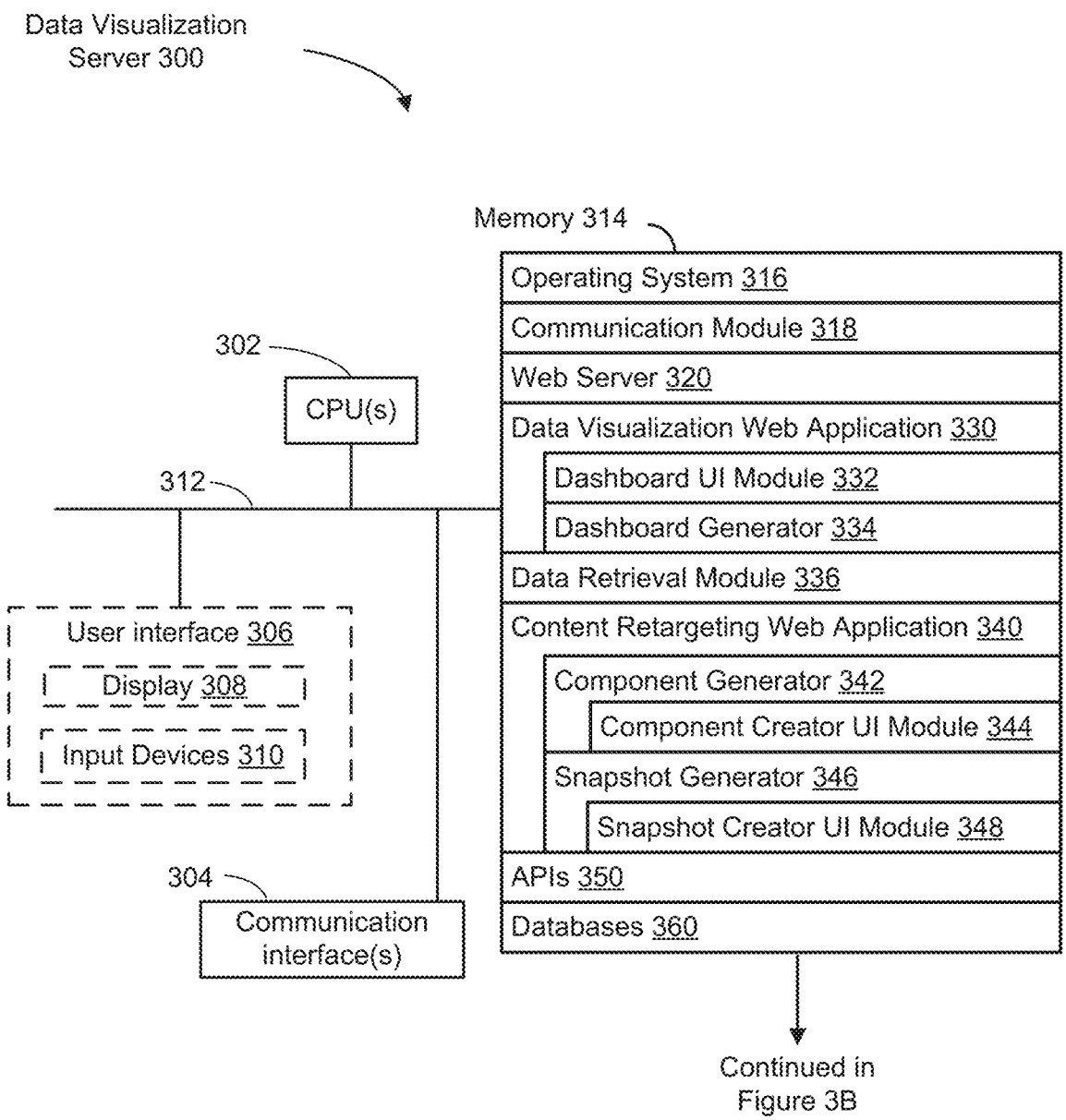

Data Visualization
Server 300

302 —

CPU(s)

312 —

User interface 306

Display 308

Input Devices 310

304 —

Communication
interface(s)

Memory 314

Operating System 316

Communication Module 318

Web Server 320

Data Visualization Web Application 330

Dashboard UI Module 332

Dashboard Generator 334

Data Retrieval Module 336

Content Retargeting Web Application 340

Component Generator 342

Component Creator UI Module 344

Snapshot Generator 346

Snapshot Creator UI Module 348

APIs 350

Databases 360

Data Visualization
Server 300 Cont'd)

Continued from
Figure 3A

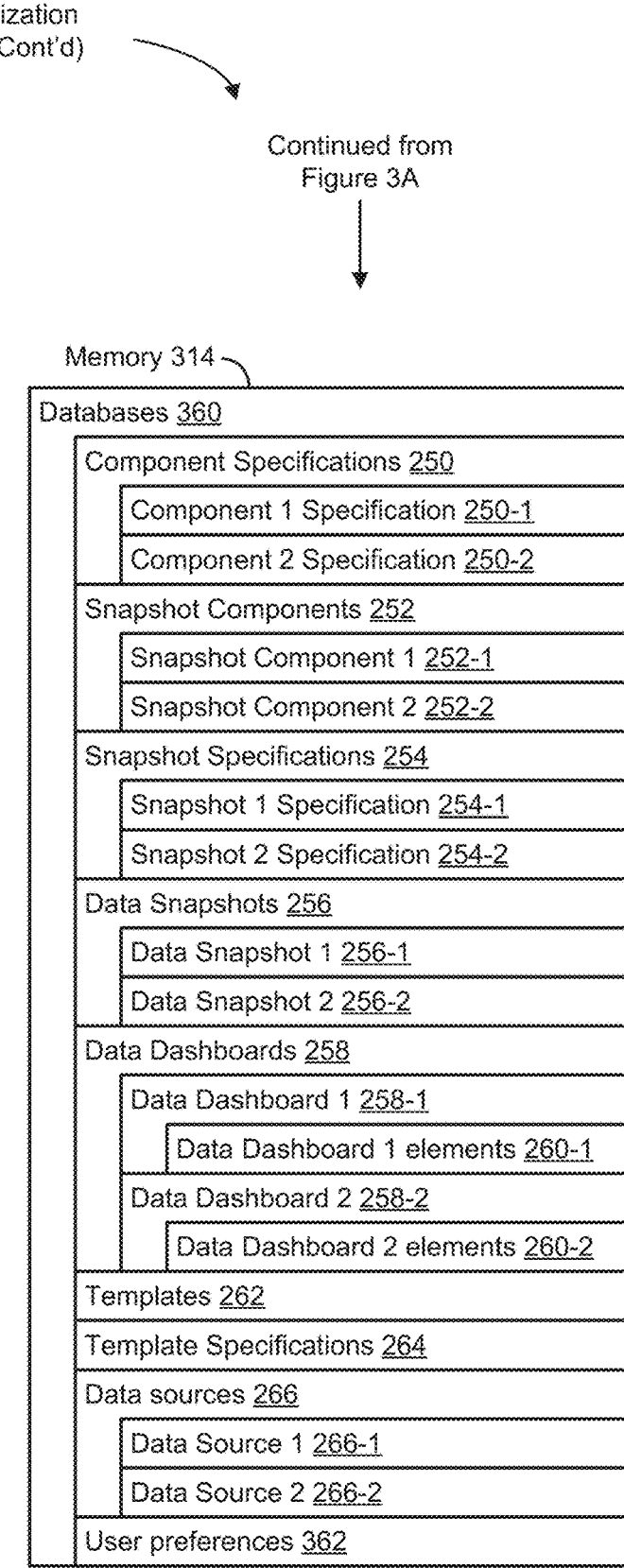

Memory 314

Databases 360

Component Specifications 250

Component 1 Specification 250-1

Component 2 Specification 250-2

Snapshot Components 252

Snapshot Component 1 252-1

Snapshot Component 2 252-2

Snapshot Specifications 254

Snapshot 1 Specification 254-1

Snapshot 2 Specification 254-2

Data Snapshots 256

Data Snapshot 1 256-1

Data Snapshot 2 256-2

Data Dashboards 258

Data Dashboard 1 258-1

Data Dashboard 1 elements 260-1

Data Dashboard 2 258-2

Data Dashboard 2 elements 260-2

Templates 262

Template Specifications 264

Data sources 266

Data Source 1 266-1

Data Source 2 266-2

User preferences 362

Figure 3B

Electronic
Device 400

402
CPU(s)

404
Communication
interface(s)

408

Memory 406
Operating System 422
Communication Module 424
Web Browser 426
Audio Input Module 428
Messaging Application 270
Messaging UI 272
Snapshot Home UI 274
APIs 430
. . .

User interface 410
Display 412
Input Device /
Mechanism 414
Audio Input
Device 416
Audio Output
Device 418

602

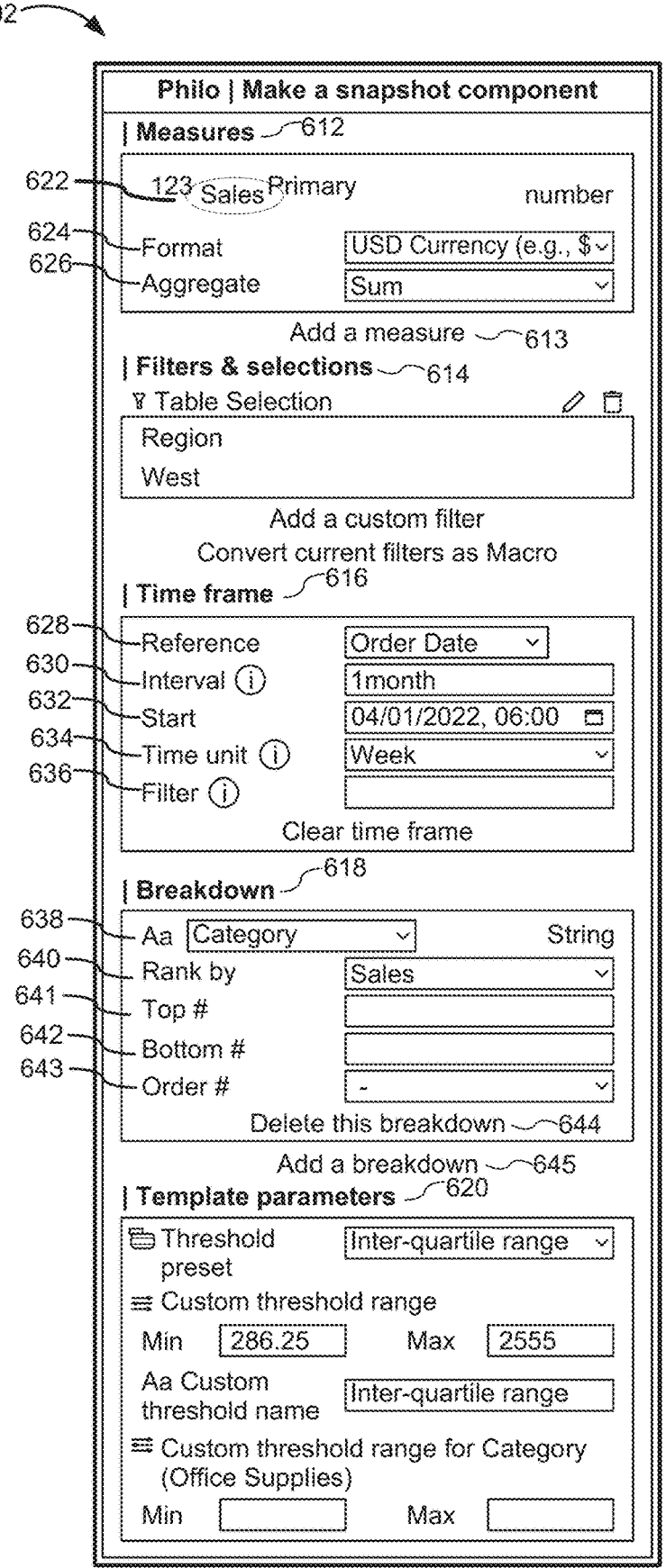

Philo | Make a snapshot component

| Measures —612

622 — 123 Sales Primary                    number

624 — Format          USD Currency (e.g., $ ⌄)
626 — Aggregate       Sum ⌄

Add a measure —613

| Filters & selections —614

⊽ Table Selection                    ✎  🗑

Region
West

Add a custom filter

Convert current filters as Macro

| Time frame —616

628 — Reference       Order Date   ⌄
630 — Interval ⓘ     1month
632 — Start          04/01/2022, 06:00   ▦
634 — Time unit ⓘ    Week          ⌄
636 — Filter ⓘ

Clear time frame

| Breakdown —618

638 — Aa  Category        ⌄      String
640 — Rank by    Sales            ⌄
641 — Top #
642 — Bottom #
643 — Order #    -               ⌄

Delete this breakdown —644

Add a breakdown —645

| Template parameters —620

🗄 Threshold      Inter-quartile range  ⌄
   preset

≡ Custom threshold range

Min  286.25      Max  2555

Aa Custom        Inter-quartile range
threshold name

≡ Custom threshold range for Category
   (Office Supplies)

Min               Max

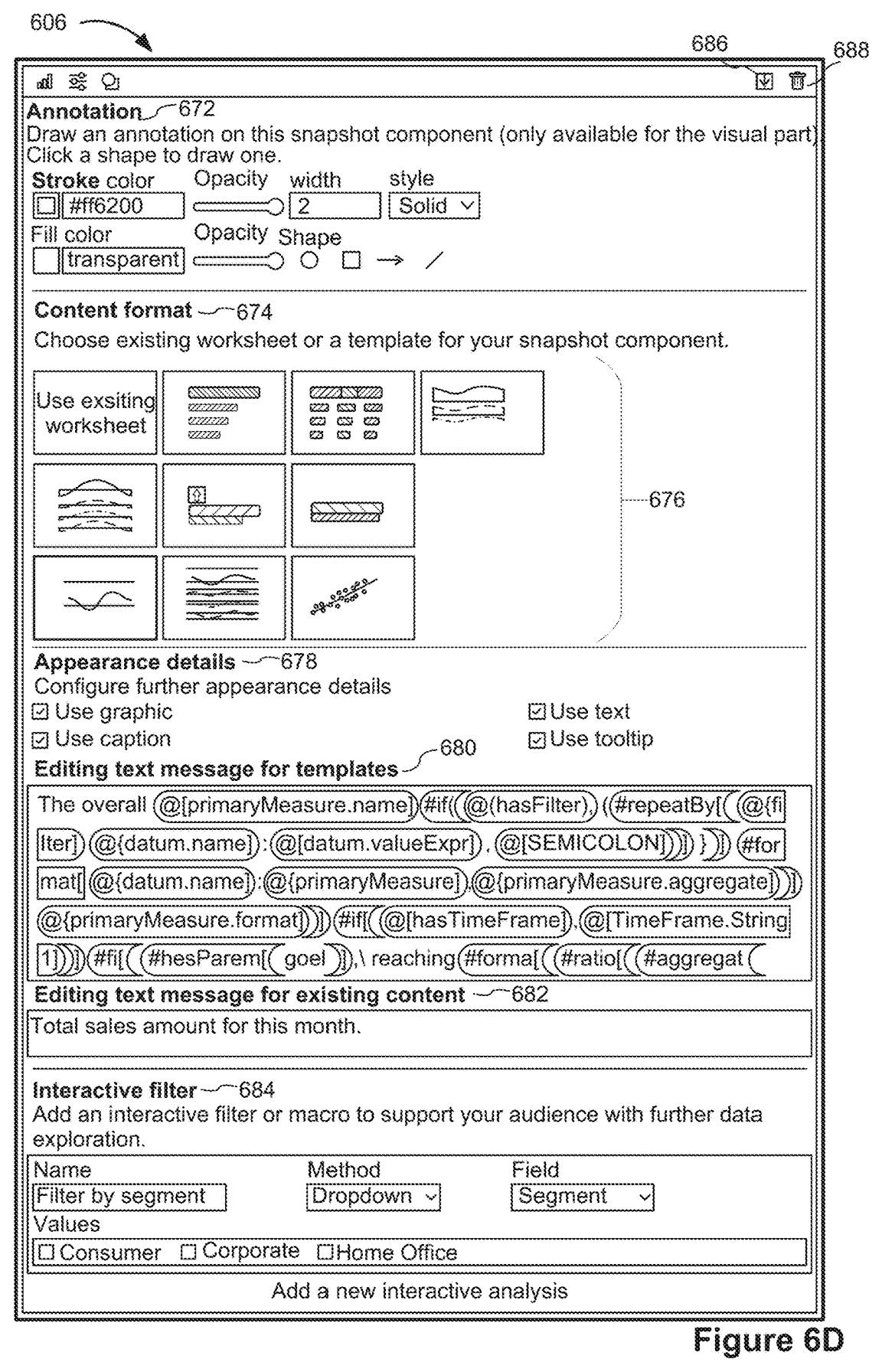

Annotation 672

Draw an annotation on this snapshot component (only available for the visual part)
Click a shape to draw one.

Stroke color    Opacity    width    style

☐ #ff6200    ○━━━○    2    Solid ⌄

Fill color    Opacity   Shape

☐ transparent    ○━━━○   ○ ☐ → /

Content format 674

Choose existing worksheet or a template for your snapshot component.

676

Appearance details 678

Configure further appearance details

☑ Use graphic            ☑ Use text

☑ Use caption            ☑ Use tooltip

Editing text message for templates 680

The overall (@[primaryMeasure.name]) (#if( (@(hasFilter)), (#repeatBy( (@(filter]) (@{datum.name}): @[datum.valueExpr], (@[SEMICOLON])) ) ) (#format[ (@{datum.name}): @{primaryMeasure}) (@{primaryMeasure.aggregate]) )) (@{primaryMeasure.format]) )) (#if( (@[hasTimeFrame]), @[TimeFrame.String 1])) (#fi( (#hesParem( goel ))),\ reaching (#forma[( (#ratio[( (#aggregat (

Editing text message for existing content 682

Total sales amount for this month.

Interactive filter 684

Add an interactive filter or macro to support your audience with further data exploration.

| Name | Method | Field |
|---|---|---|
| Filter by segment | Dropdown ⌄ | Segment ⌄ |
| Values | | |

☐ Consumer    ☐ Corporate   ☐ Home Office

Add a new interactive analysis

Figure 6D

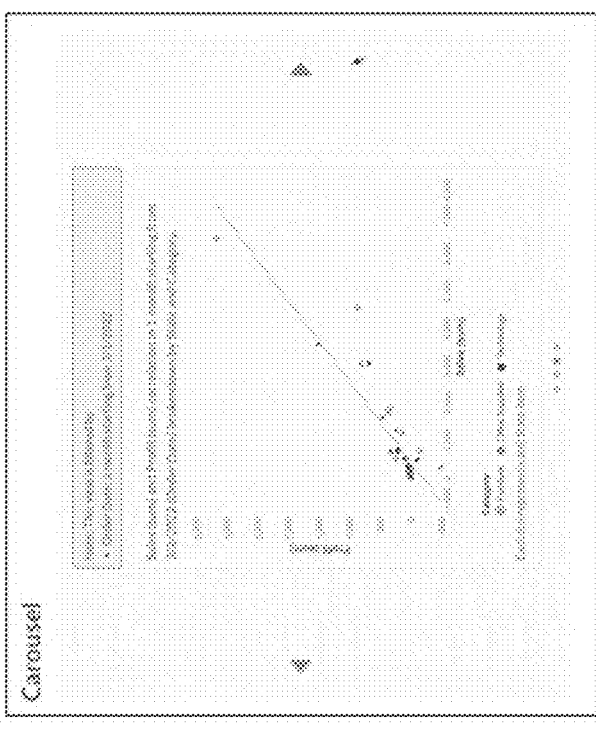
Carousel
Carousel
Visualization A
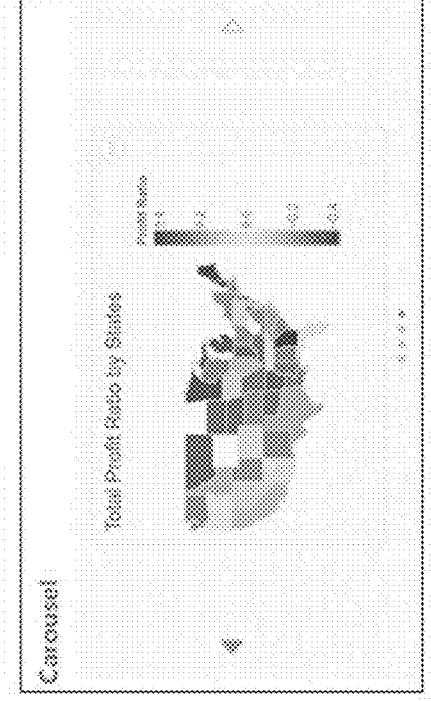
Carousel
Visualization B (in response to selecting the right arrow in Visualization A
Visualization C (in response to selecting the right arrow in Visualization B
Figure 9B Snapshot Home UI 274

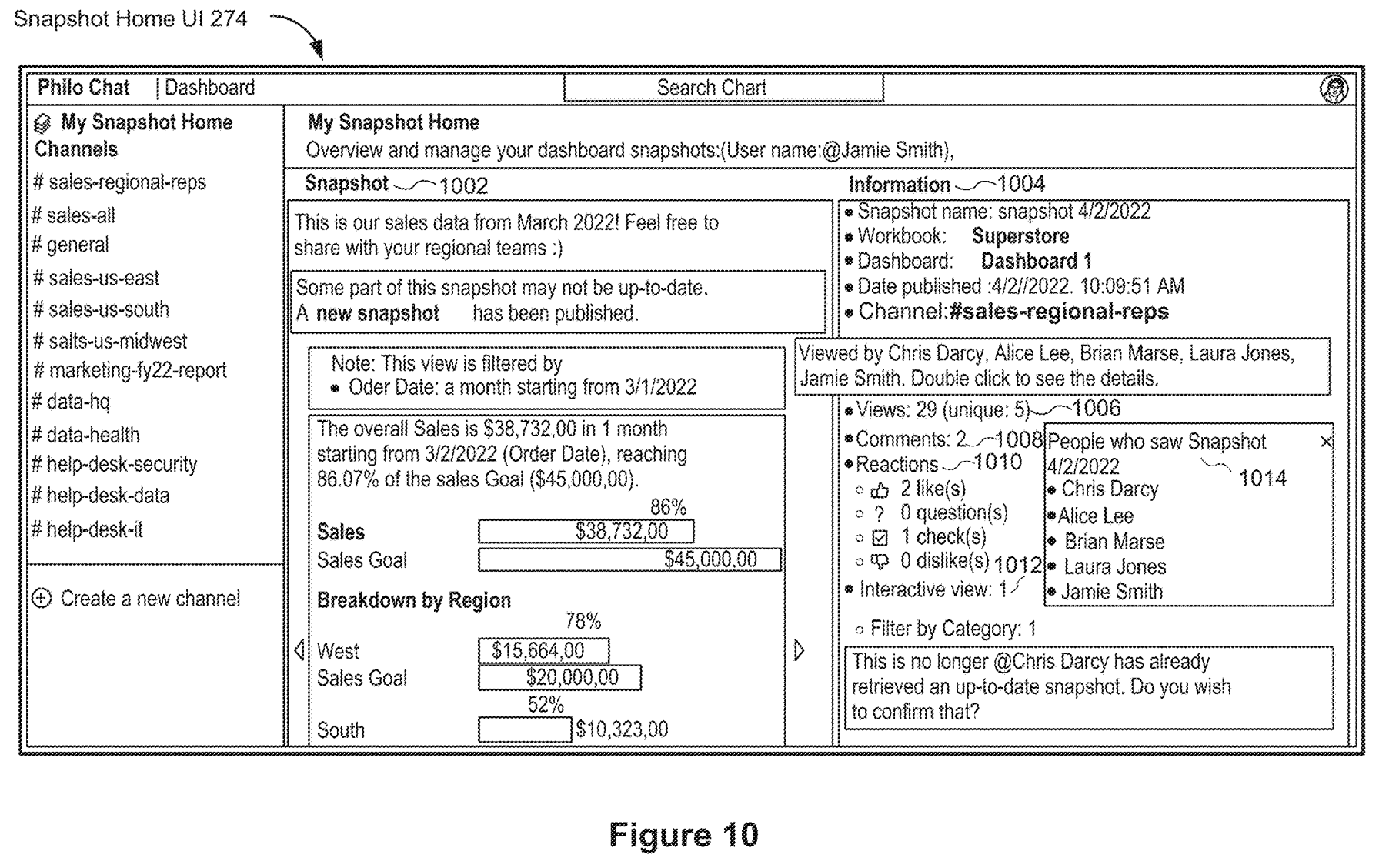

Philo Chat | Dashboard

Search Chart

My Snapshot Home
Channels sales-regional-reps sales-all
general
sales-us-east
sales-us-south
salts-us-midwest
marketing-fy22-report
data-hq
data-health
help-desk-security
help-desk-data
help-desk-it ⊕ Create a new channel

My Snapshot Home
Overview and manage your dashboard snapshots:(User name:@Jamie Smith), Snapshot ⏦1002

This is our sales data from March 2022! Feel free to share with your regional teams :)

Some part of this snapshot may not be up-to-date. A new snapshot has been published.

Note: This view is filtered by
  • Oder Date: a month starting from 3/1/2022

The overall Sales is $38,732.00 in 1 month starting from 3/2/2022 (Order Date), reaching 86.07% of the sales Goal ($45,000.00).

Sales                    86%
                         $38,732.00
Sales Goal               $45,000.00

Breakdown by Region
                         78%
◁ West    $15,664.00
Sales Goal $20,000.00
          52%
South              $10,323.00

Information ⏦1004
  • Snapshot name: snapshot 4/2/2022
  • Workbook:      Superstore
  • Dashboard:     Dashboard 1
  • Date published:4/2/2022. 10:09:51 AM
  • Channel:#sales-regional-reps

Viewed by Chris Darcy, Alice Lee, Brian Marse, Laura Jones, Jamie Smith. Double click to see the details.

• Views: 29 (unique: 5)⏦1006
  • Comments: 2 ⏦1008
  • Reactions: ⏦1010
    ○ 👍 2 like(s)
    ○ ? 0 question(s)
    ○ ☑ 1 check(s)
    ○ 👎 0 dislike(s) 1012⏦
  • Interactive view: 1

○ Filter by Category: 1

People who saw Snapshot
                    ⏦1014
4/2/2022
  • Chris Darcy
  • Alice Lee
  • Brian Marse
  • Laura Jones
  • Jamie Smith This is no longer @Chris Darcy has already retrieved an up-to-date snapshot. Do you wish to confirm that?

Figure 10

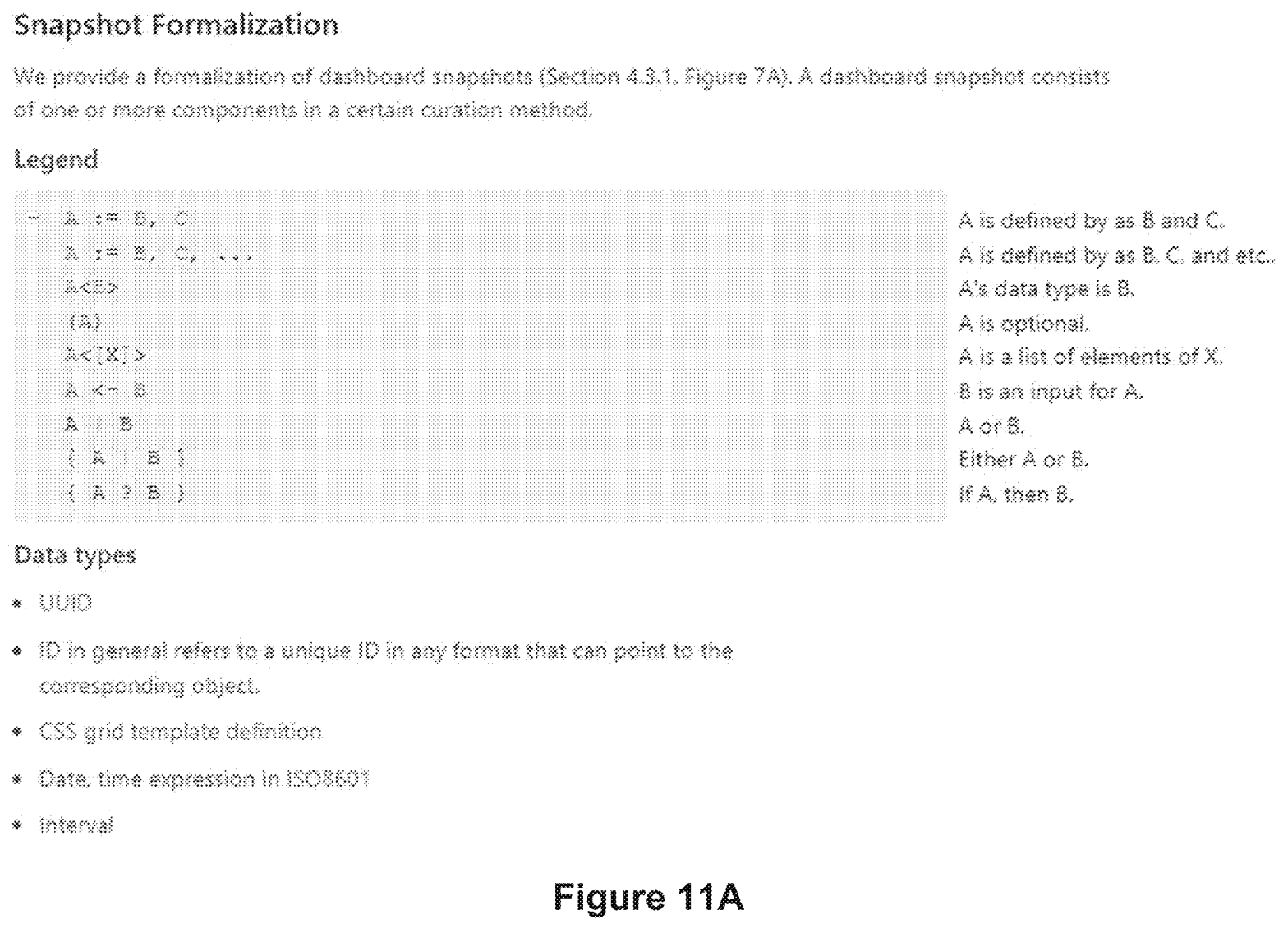

Snapshot Formalization

We provide a formalization of dashboard snapshots (Section 4.3.1, Figure 7A). A dashboard snapshot consists of one or more components in a certain curation method.

Legend

| | |
|---|---|
| A ::= B, C | A is defined by as B and C. |
| A ::= B, C, ... | A is defined by as B, C, and etc.. |
| A<=> | A's data type is B. |
| (A) | A is optional. |
| K<[X]> | A is a list of elements of X. |
| A <- B | B is an input for A. |
| A \| B | A or B. |
| [ A \| B ] | Either A or B. |
| ( A ? B ) | If A, then B. |

Data types

* UUID

* ID in general refers to a unique ID in any format that can point to the corresponding object.

* CSS grid template definition

* Date, time expression in ISO8601

* Interval

Figure 11A

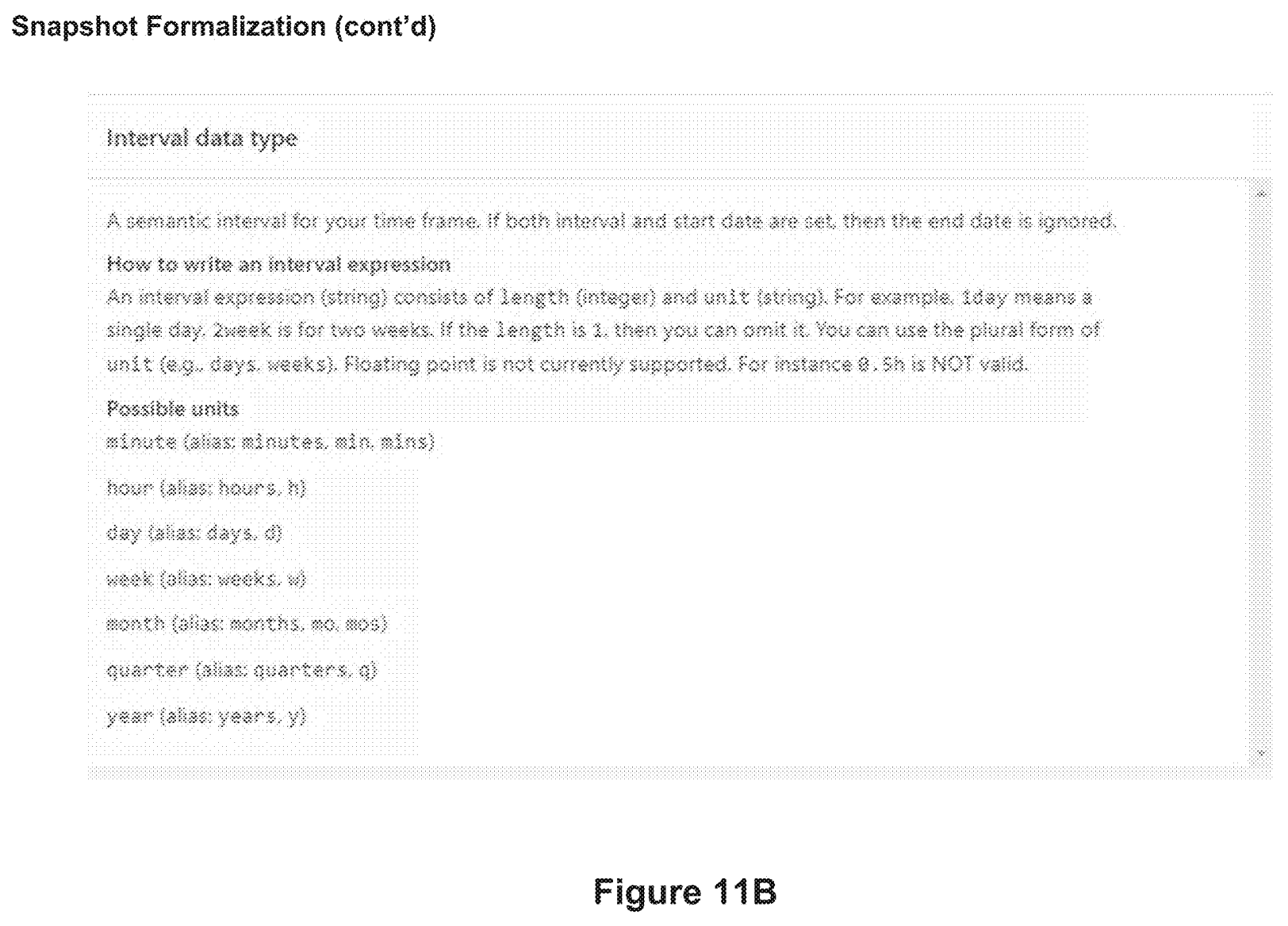

Snapshot Formalization (cont'd)

Interval data type

A semantic interval for your time frame if both interval and start date are set, then the end date is ignored.

How to write an interval expression

An interval expression (string) consists of length (integer) and unit (string). For example, 1day means a single day, 2week is for two weeks. If the length is 1, then you can omit it. You can use the plural form of unit (e.g. days, weeks). Floating point is not currently supported. For instance 0.5h is NOT valid.

Possible units minute (alias: minutes, min, mins)

hour (alias: hours, h)

day (alias: days, d)

week (alias: weeks, w)

month (alias: months, mo, mos)

quarter (alias: quarters, q)

year (alias: years, y)

Figure 11B

Snapshot Formalization (cont'd)

Formal definition

Figure 11C

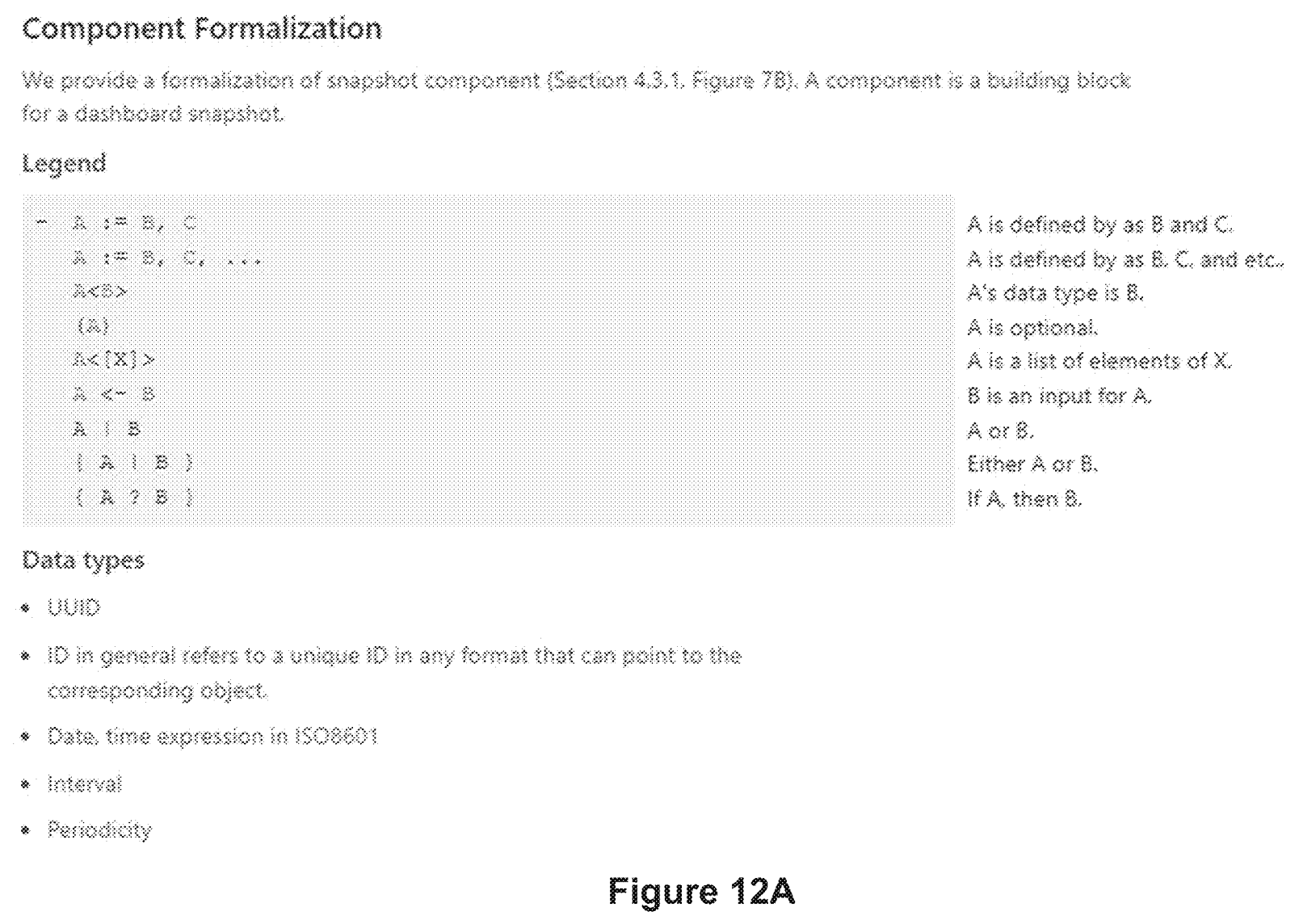

Component Formalization

We provide a formalization of snapshot component (Section 4.3.1, Figure 7B). A component is a building block for a dashboard snapshot.

Legend

- A := B, C              A is defined by as B and C.
  A := B, C, ...         A is defined by as B, C, and etc..
  X<B>                   X's data type is B.
  (A)                    A is optional.
  X<[X]>                 A is a list of elements of X.
  A <- B                 B is an input for A.
  A | B                  A or B.
  { A | B }              Either A or B.
  ( A ? B )              If A, then B.

Data types

* UUID

* ID in general refers to a unique ID in any format that can point to the corresponding object.

* Date, time expression in ISO8601

* Interval

* Periodicity

Figure 12A

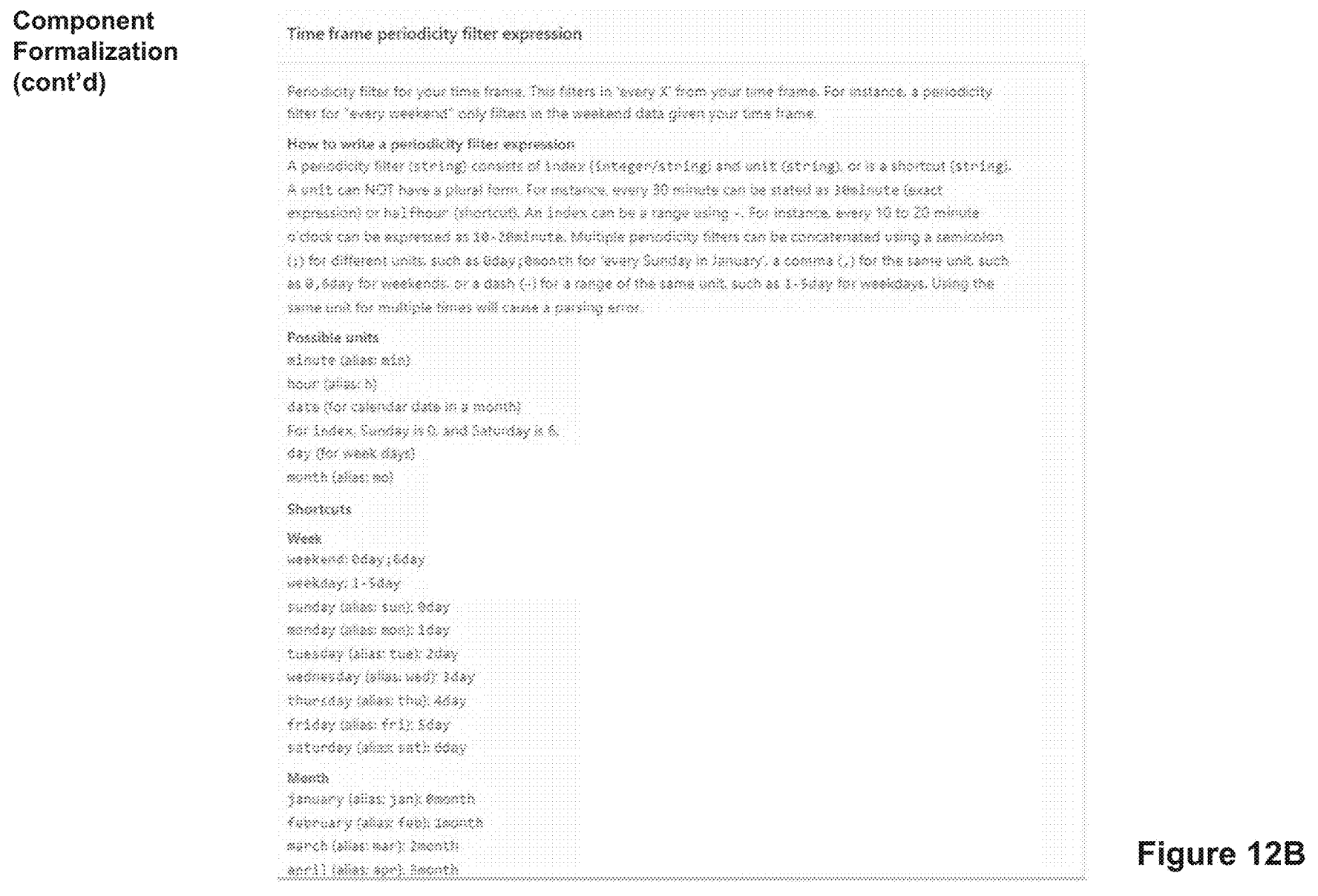

Component
Formalization
(cont'd)

Time frame periodicity filter expression

Periodicity filter for your time frame. This filters in 'every X' from your time frame. For instance, a periodicity filter for "every weekend" only filters in the weekend data given your time frame.

How to write a periodicity filter expression

A periodicity filter string consists of a value (integer/string) and unit (string), or is a shortcut (string).

A unit can NOT have a plural form. For instance, every 20 minutes can be stated as 20minute (exact expression) or 1m (macro) (shortcut). An 1 week can be a range using - for instance, every 10 to 20 minute expression) or 1w (shortcut).

c clock can be expressed as 10:30&minute. Multiple periodicity filters can be concatenated using a semicolon (,) for different units, such as &day ;&week for 'every Sunday in January; a comma (,) for the same unit, such as 0 &day for weekends, or a dash (-) for a range of the same unit, such as 1-5day for weekdays. Using the same unit for multiple times will cause a parsing error.

Possible units
&minute (alias: min)
hour (alias: h)
date (for calendar date in a month)
for Sunday, Tuesday is 0, and Saturday is 6,
day (for week days)
week (alias: w)

Shortcuts
week
weekend: &day ;&day
weekday: 1-5day

Sunday (alias: su): 0day
monday (alias: mon): 1day
tuesday (alias: tue): 2day
wednesday (alias: wed): 3day
thursday (alias: thu): 4day
friday (alias: fri): 5day
saturday (alias: sat): 6day Month
January (alias: jan) &month
February (alias: feb): &month
march (alias: mar): &month
april (alias: apr): &month

Figure 12B

Component Formalization (cont'd)

Formal definition

Figure 12C

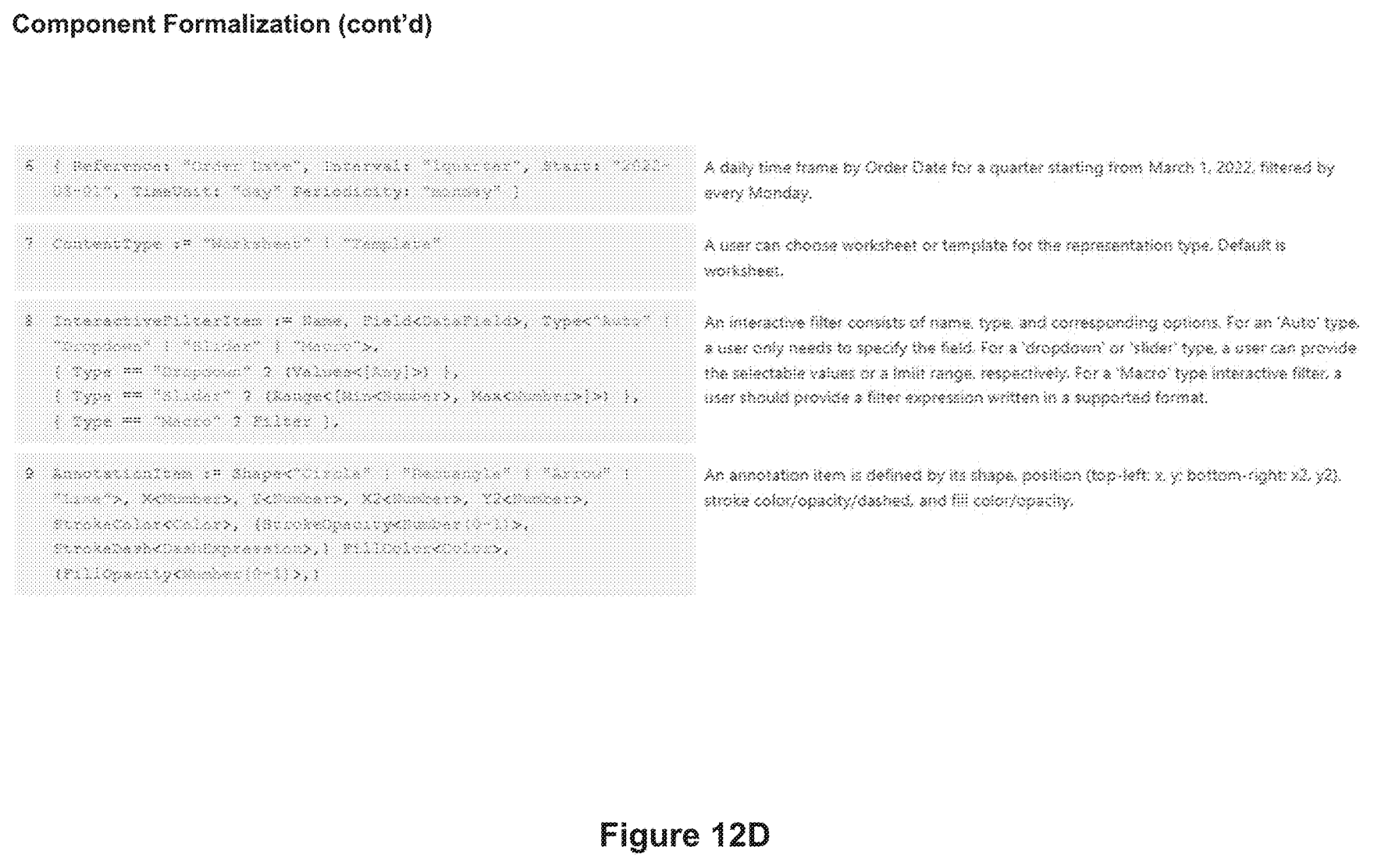

Component Formalization (cont'd)

A daily time frame by Order Date for a quarter starting from March 1, 2022, filtered by every Monday.

A user can choose worksheet or template for the representation type. Default is worksheet.

An interactive filter consists of name, type, and corresponding options. For an 'Auto' type, a user only needs to specify the field. For a 'dropdown' or 'slider' type, a user can provide the selectable values or a limit range, respectively. For a 'Macro' type interactive filter, a user should provide a filter expression written in a supported format.

An annotation item is defined by its shape, position (top-left x, y; bottom-right x2, y2), stroke color/opacity/dashed, and fill color/opacity.

Figure 12D

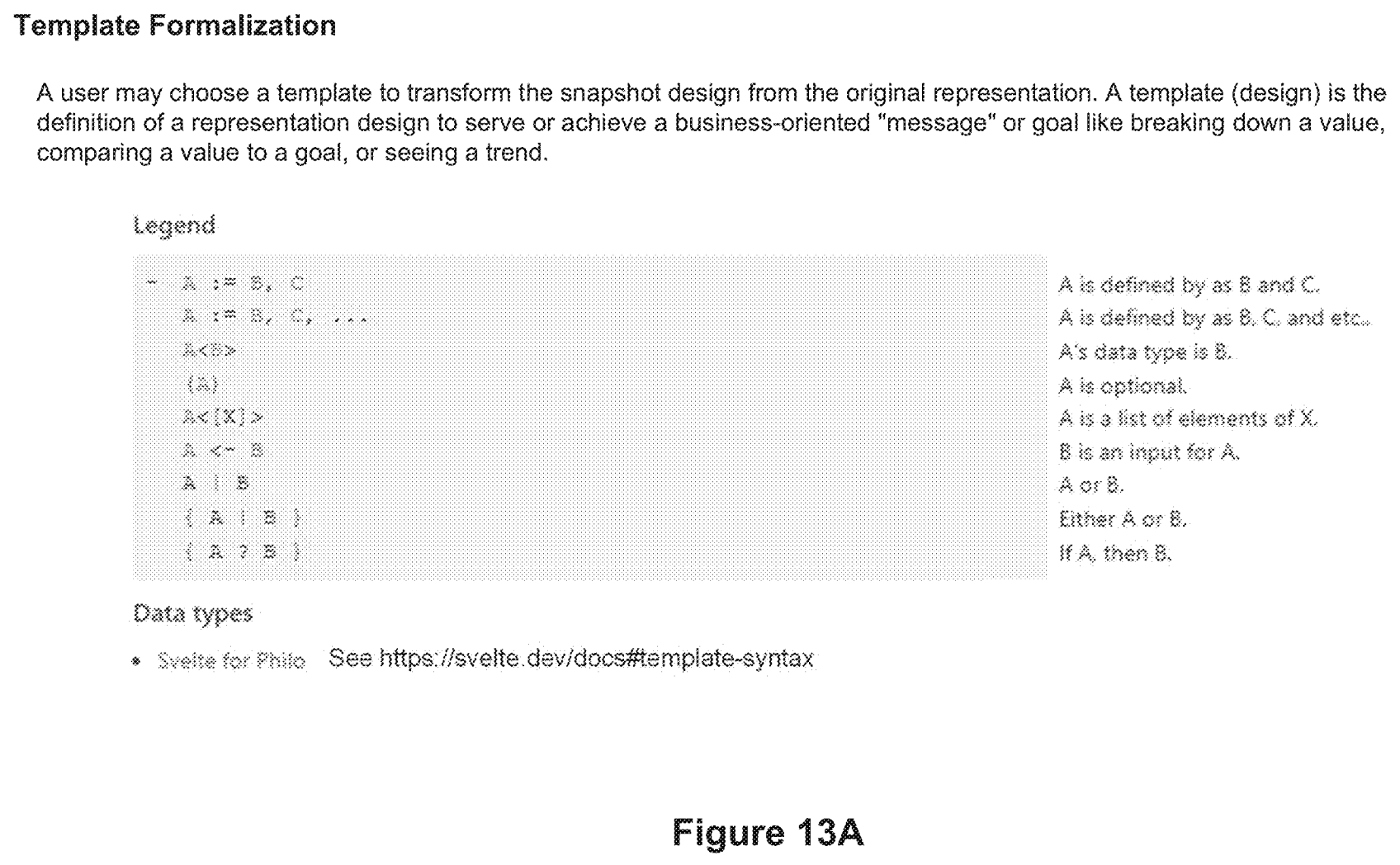

Template Formalization

A user may choose a template to transform the snapshot design from the original representation. A template (design) is the definition of a representation design to serve or achieve a business-oriented "message" or goal like breaking down a value, comparing a value to a goal, or seeing a trend.

Legend

- A := B, C        A is defined by as B and C.
- A := B, C, ...    A is defined by as B, C, and etc.
- A<B>         A's data type is B.
- (A)           A is optional.
- A<[X]>       A is a list of elements of X.
- A <— B       B is an input for A.
- A | B         A or B.
- { A | B }    Either A or B.
- { A ? B }    If A, then B.

Data types

* Svelte for Philo   See https://svelte.dev/docs#template-syntax

Figure 13A

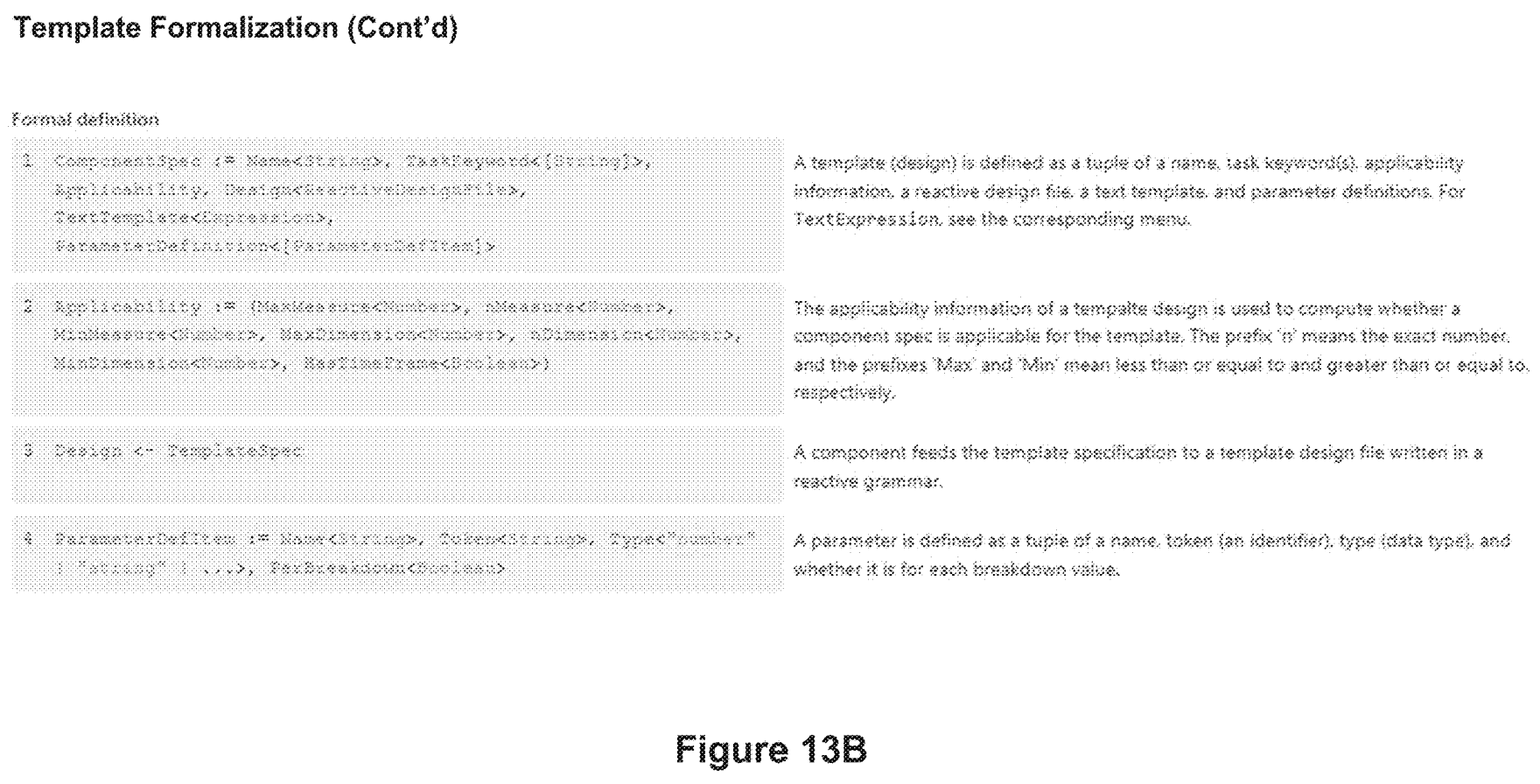

Template Formalization (Cont'd)

*Formal definition*

A template (design) is defined as a tuple of a name, task keyword(s), applicability information, a reactive design file, a text template, and parameter definitions. For TextExpression, see the corresponding menu.

The applicability information of a template design is used to compute whether a component spec is applicable for the template. The prefix 'n' means the exact number, and the prefixes 'Max' and 'Min' mean less than or equal to and greater than or equal to, respectively.

A component feeds the template specification to a template design file written in a reactive grammar.

A parameter is defined as a tuple of a name, token (an identifier), type (data type), and whether it is for each breakdown value.

Figure 13B

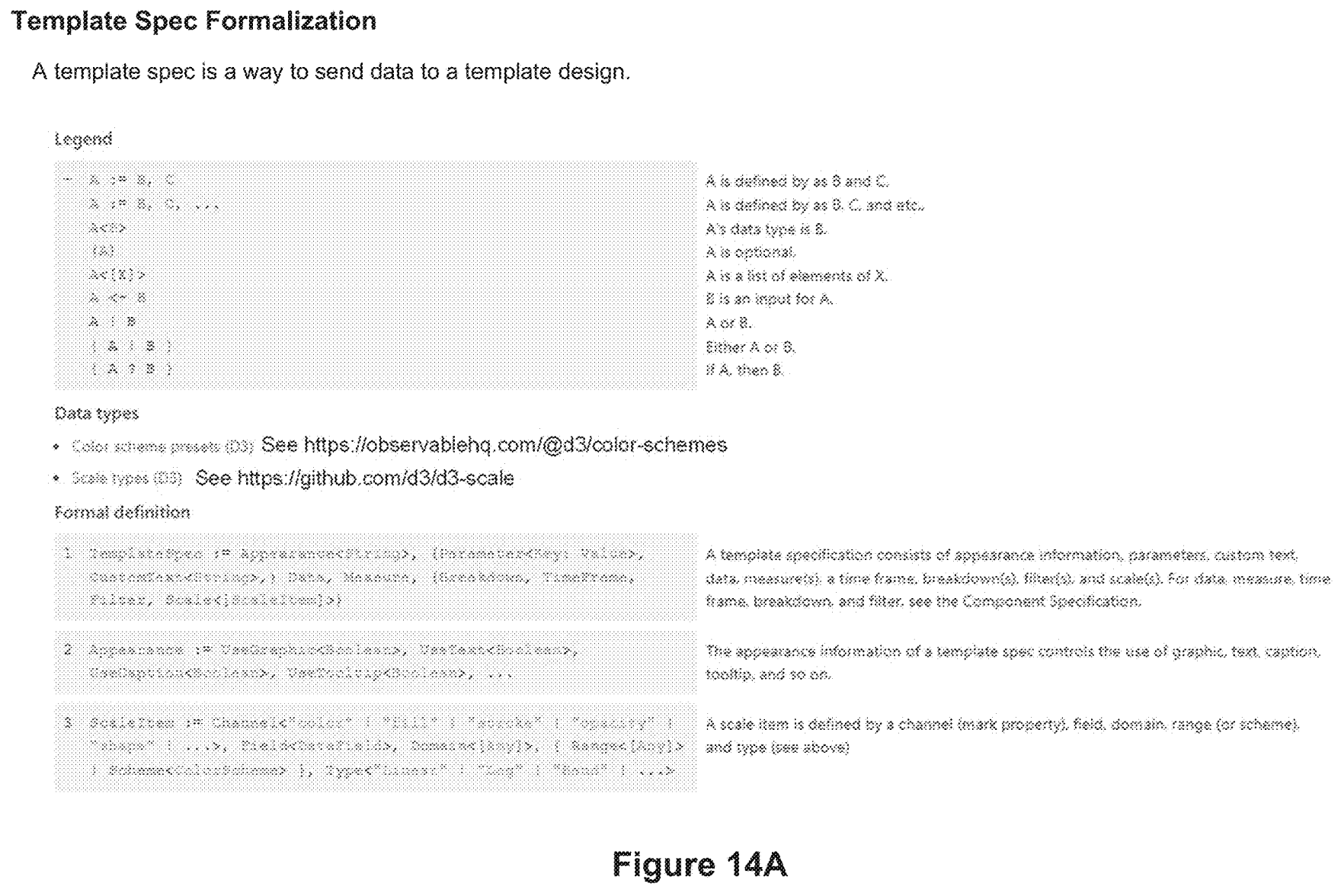

Template Spec Formalization

A template spec is a way to send data to a template design.

Legend

A is defined by as B and C.
A is defined by as B, C, and etc.
A's data type is B.
A is optional.
A is a list of elements of X.
B is an input for A.
A or B.
Either A or B.
If A, then B.

Data types

- Color scheme presets (C): See https://observablehq.com/@d3/color-schemes
- Scale types (S): See https://github.com/d3/d3-scale Formal definition A template specification consists of appearance information, parameters, custom text, data, measure(s), a time frame, breakdown(s), filter(s), and scale(s). For data measure, time frame, breakdown, and filter, see the Component Specification.

The appearance information of a template spec controls the use of graphic, text, caption, tooltip, and so on.

A scale item is defined by a channel (mark property), field, domain, range (or scheme), and type (see above).

Figure 14A

Figure 14B (i) Template Design Usage (ii) Template Design Definition (iii) Template Specification

Template Designs

Overview

| Name | Task keywords | Applicability | | Parameters |
|---|---|---|---|---|
| Simple breakdown | Breakdown, ranking | isMeasure (1), maxBreakdown (1) | None | |
| Ratio and two breakdown | Percentage, proportion, breakdown, ranking | isMeasure (1), maxBreakdown (1), maxBreakdown (2) | None | |
| Change over time | Trend, breakdown, time-series | isMeasure (1), hasTimeFrame (true), maxBreakdown (1) | None | |
| Time difference | Time delta, time difference | isMeasure (1), hasTimeFrame (true), maxBreakdown (1) | None | |
| Comparison to the last time | Time comparison | isMeasure (1), hasTimeFrame (true), maxBreakdown (1) | None | |
| Breakdown and goal | Threshold, goal, progress | isMeasure (1), maxBreakdown (1) | Goal (number), goal name (string) | |
| Simple threshold | Indicator, safety | isMeasure (1), maxBreakdown (1) | Threshold range (min and max number), threshold name (string) | |
| Time-series and threshold | Indicator, safety, confidence | isMeasure (1), maxBreakdown (1) | Threshold range (min and max number), threshold name (string), per-breakdown, threshold ranges (min and max numbers) | |
| Trend or correlation | Trend, correlation, bivariate | isMeasure (2), maxBreakdown (1) | None | |

Figure 15A

Template Designs
Simple Breakdown:
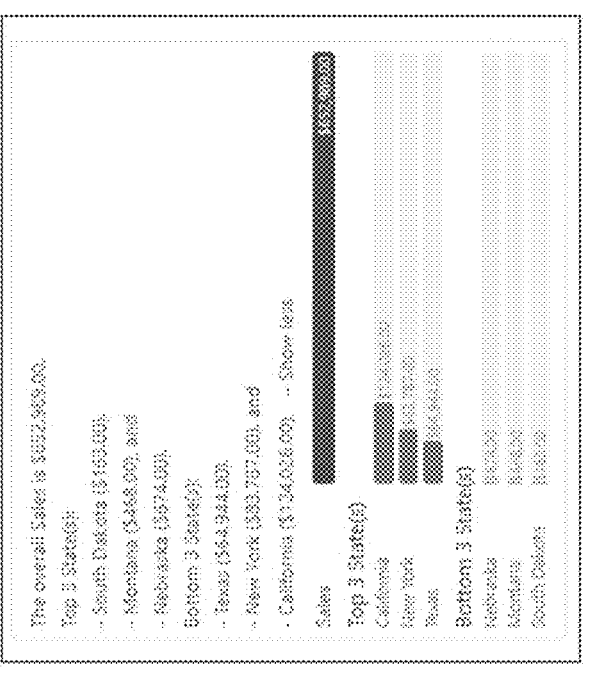
Template
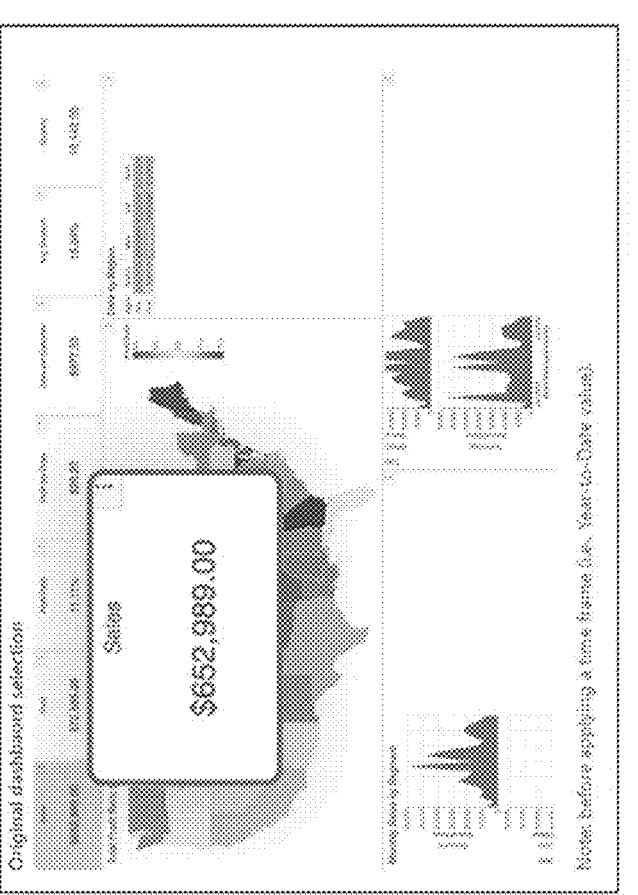
Original dashboard selection
Figure 15B

Template Designs

Ratio and two Breakdowns:

Template Designs

Change over time:

Template

Original dashboard selection

Template Designs
Breakdown and goal:
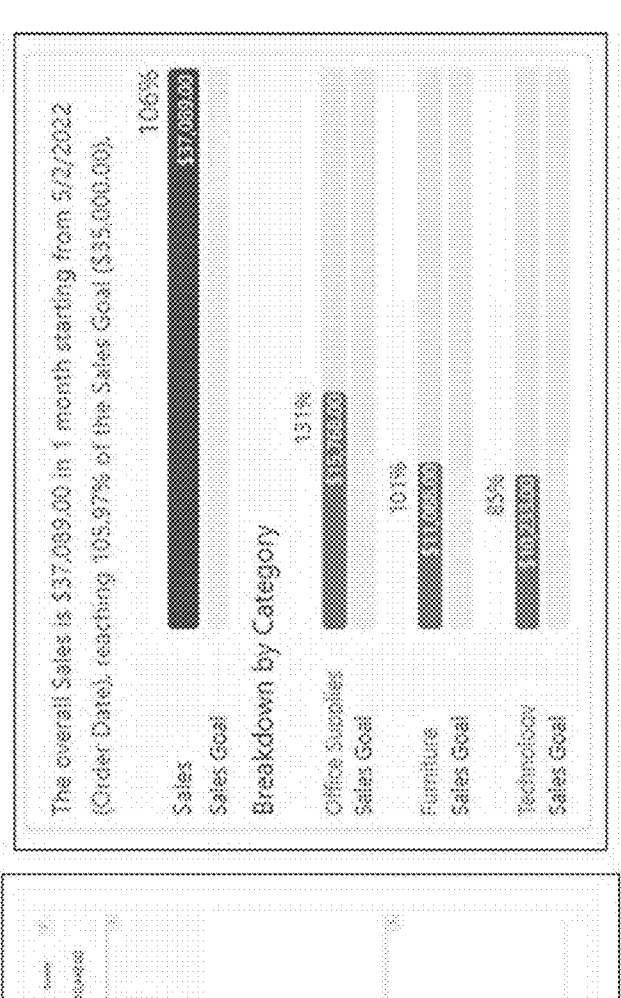
Template
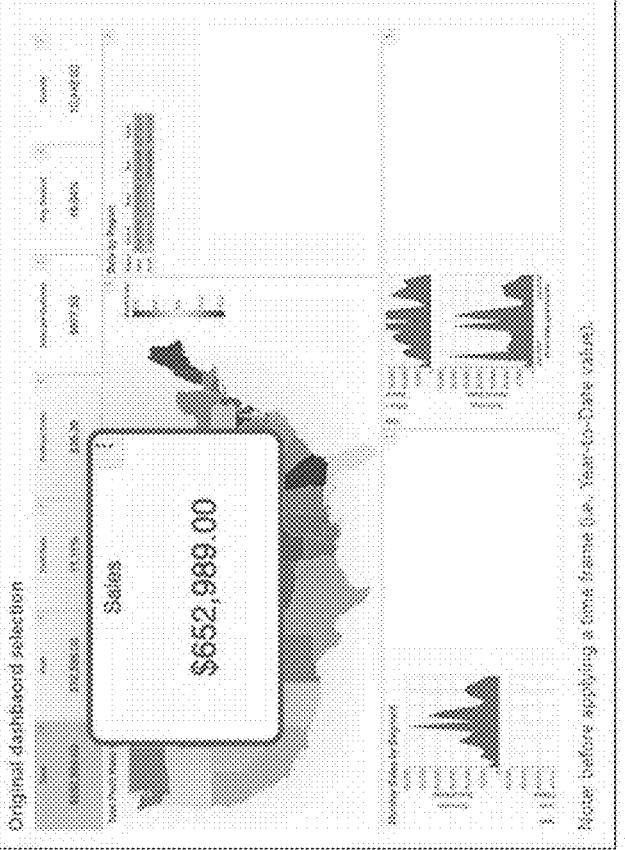
Original dashboard selection
Figure 15G Template Designs
Simple threshold:
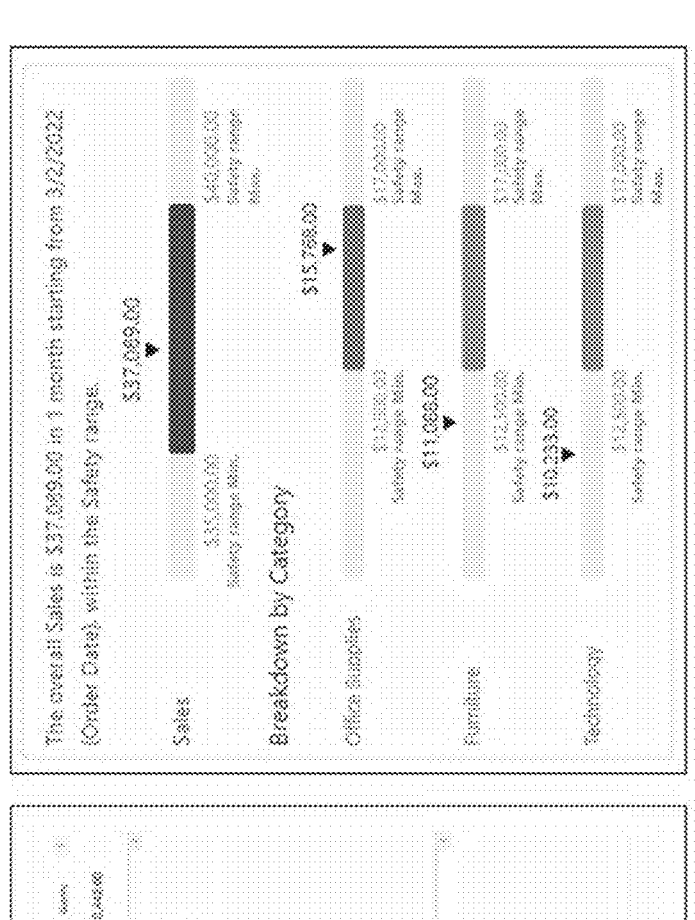
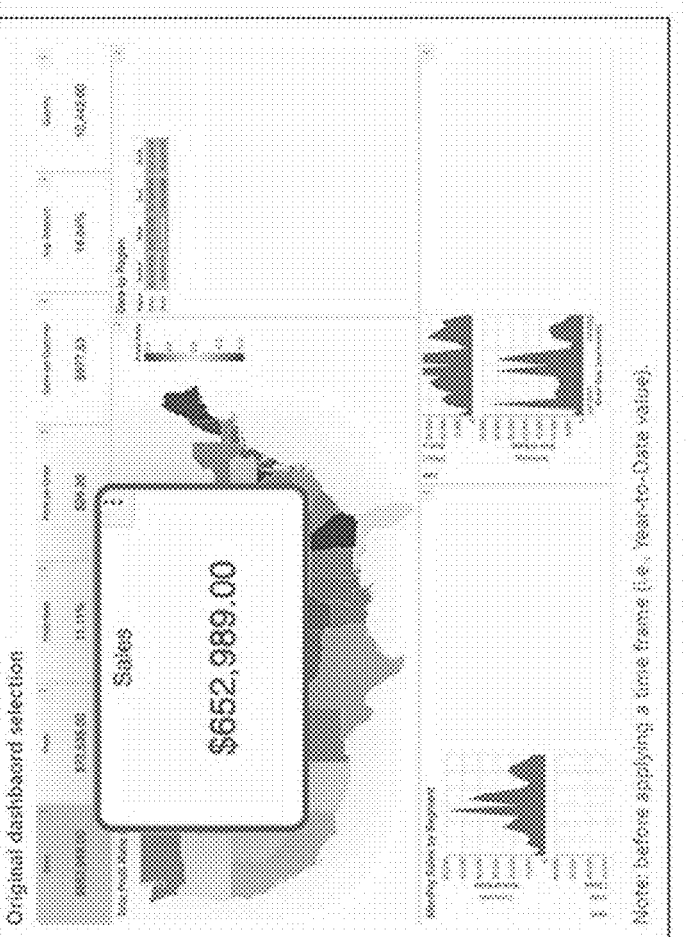
Figure 15H Template Designs
Time-series and threshold:
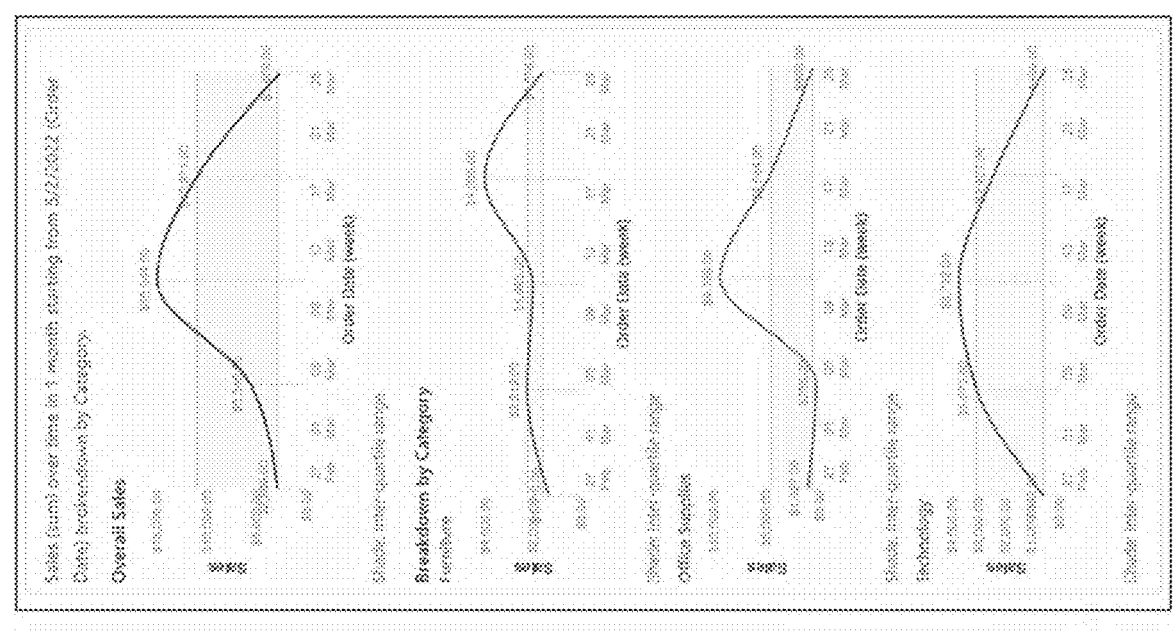
Template
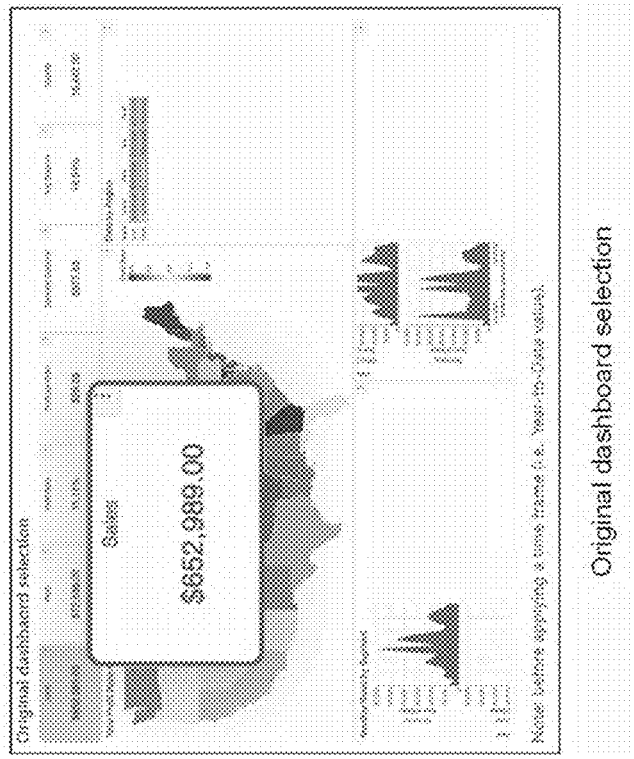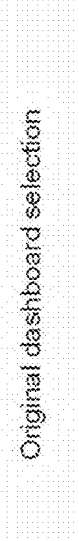
Original dashboard selection
Figure 15I

1800

1802 A method is performed at a computing device having a display, one or more processors, and memory.

1804 The memory stores one or more programs configured for execution by the one or more processors.

1806 Receive user selection of a first data element from a first data dashboard that is displayed on the computing device. The user selection designates the first data element as a first snapshot component of a first snapshot.

1808 In accordance with receiving the user selection designating the first data element as the first snapshot component, generate a first component specification corresponding to the first snapshot component. The first component specification includes a plurality of component properties.

1810 Populate the first component specification with first values in accordance with user specification of the first values for at least the subset of the component properties.

1812 The first data element is a data value of a measure data field. The data value is determined via a first aggregation type.

1814 The first data element comprises a data mark of a data visualization on the first dashboard.

1816 The first data element is a data visualization on the first dashboard.

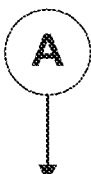

1818 In response to receiving the user selection of the first data element from the first data dashboard, display, in a first user interface, the plurality of component properties for the first snapshot component.

1820 Display, via the first user interface, a plurality of template icons corresponding to a plurality of templates.

1822 In response to the user selection of the first data element from the first data dashboard, replace the display of the first data dashboard with a view of the first user interface.

1824 The first data dashboard is displayed in a data visualization application and the first user interface is a user interface of the data visualization application.

1826 The first data dashboard is displayed in a data visualization application and the first user interface is a user interface of a collaboration platform.

1828 The first data dashboard is displayed in a data visualization application and the first user interface is a user interface of an application that is distinct from the data visualization application and distinct from the collaboration platform.

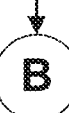

Figure 18B

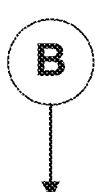

1830 Receive, via the first user interface, user specification of first values for at least a first subset of component properties of the plurality of component properties.

1831 Receive, via the first user interface, user selection a measure data field, a number format, and an aggregation method.

1832 Receive, via the first user interface, user selection of a dimension data field and a sorting order.

1834 Receive, via the first user interface, user specification of a temporal data field and a date/time range for filtering the first data element.

1836 Receive, via the first user interface, user selection of a first template icon of the plurality of template icons. The first template icon corresponds to a first template of the plurality of templates.

1838 Receive user specification of one or more parameters for the first template.

1840 In accordance with receiving the user specification of the first values for at least the first subset of component properties, update the first snapshot component according to the first values.

Figure 18C

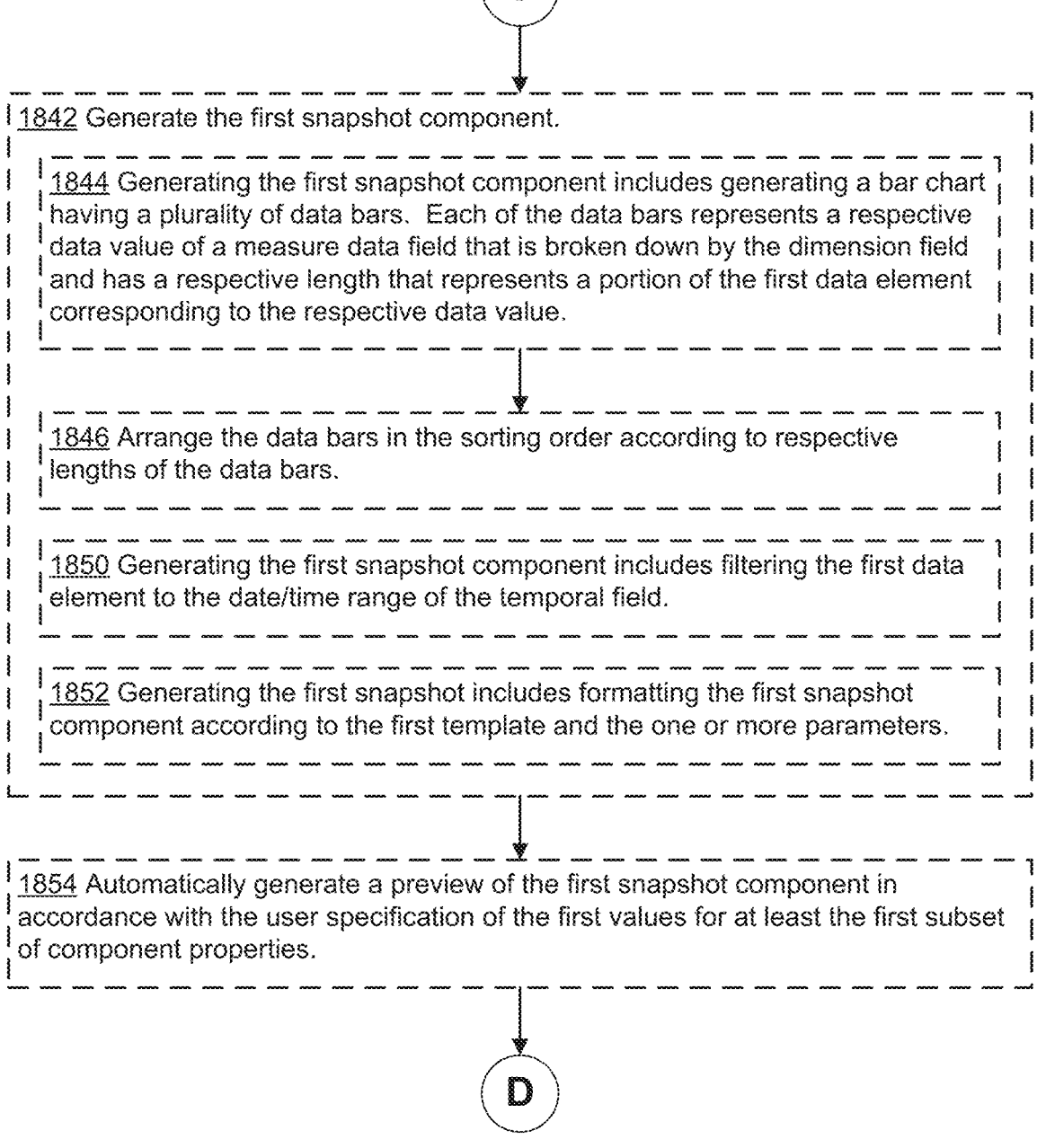

C

1842 Generate the first snapshot component.

1844 Generating the first snapshot component includes generating a bar chart having a plurality of data bars. Each of the data bars represents a respective data value of a measure data field that is broken down by the dimension field and has a respective length that represents a portion of the first data element corresponding to the respective data value.

1846 Arrange the data bars in the sorting order according to respective lengths of the data bars.

1850 Generating the first snapshot component includes filtering the first data element to the date/time range of the temporal field.

1852 Generating the first snapshot includes formatting the first snapshot component according to the first template and the one or more parameters.

1854 Automatically generate a preview of the first snapshot component in accordance with the user specification of the first values for at least the first subset of component properties.

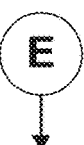

E

1864 Generate a first snapshot that includes the first snapshot component.

1866 The first snapshot includes a second snapshot component that is distinct from the first snapshot component. After generating the first snapshot component, receive user selection of a second data element. The user selection designates the second data element as the second snapshot component for a first snapshot.

1868 Receive the user selection of the second data element from the first data dashboard that is displayed on the computing device.

1870 Receive user selection of the second data element from a second data dashboard, distinct from the first data dashboard, that is displayed on the computing device.

1872 The first data element is derived from a first data source and the second data element is derived from a second data source that is distinct from the first data source.

1874 In accordance with receiving the user selection, generate a second component specification corresponding to the second snapshot component. The second component specification includes the plurality of component properties.

1876 The first snapshot is specified by a plurality of snapshot properties. Generating the first snapshot includes receiving user specification of second values corresponding to the plurality of snapshot properties, including a first date/time until which data in the first snapshot is valid and an identification of the collaboration platform to which the first snapshot is to be exported.

1878 The plurality of snapshot properties includes metadata properties, including: a first metadata property that specifies an identifier of the first snapshot; a second metadata property that specifies an owner of the first snapshot; and a third metadata property that specifies a pointer to the first chat message that displays the first snapshot.

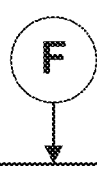

1864

1880 Display a second user interface that includes a plurality of panes. Each pane of the plurality of panes corresponds to a respective snapshot property of a plurality of snapshot properties of the first snapshot. User selection of a field in a pane, of the plurality of panes. specifies a respective value for a respective corresponding snapshot property.

1881 After updating the first snapshot component according to the first values, replace display of the first user interface with a view of the first data dashboard. The second user interface is displayed in response to user selection of an affordance from the view of the first data dashboard.

1882 The first data dashboard is displayed in a data visualization application and the second user interface is a user interface of the data visualization application.

1883 The first data dashboard is displayed in a data visualization application and the second user interface is a user interface of the collaboration platform.

1884 The first data dashboard is displayed in a data visualization application and the second user interface is a user interface of an application that is distinct from the data visualization application and distinct from the collaboration platform.

1885 The first user interface and the second user interface are both interfaces of the same application.

1902 A method is performed at a computer system having one or more processors and memory.

> 1904 The memory stores one or more programs configured for execution by the one or more processors.

1906 Receive user specification of values for a plurality of snapshot properties of a first snapshot.

> 1908 The first snapshot includes one or more snapshot components, including a first snapshot component that is extracted from a first data dashboard. The first data dashboard is associated with a first data source. The user specification includes a first date/time for which data in the first snapshot is valid and a first collaboration platform to which the first snapshot is to be exported.
>
> > 1910 The first snapshot component is generated according to a first snapshot component specification, the first snapshot component specification including a plurality of component properties having a plurality of corresponding property values.
> >
> > > 1912 The first snapshot component specification is stored on the computer system.
>
> > 1914 The one or more snapshot components comprise a plurality of snapshot components. Each snapshot component of the plurality of snapshot components corresponds to a respective data element from a respective data dashboard.
> >
> > > 1916 The respective data element is one of: one or more data cells from the respective data dashboard; one or more data values of a data field from the respective data dashboard; one or more data fields from the respective data dashboard; one or more data marks of a data visualization from the respective dashboard; or one or more data visualizations from the respective dashboard.

Figure 19A

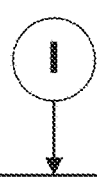

1906

1908

1918 The one or more snapshot components include a second snapshot component that is extracted from a second data dashboard.

1920 The second data dashboard is associated with the first data source.

1922 The second data dashboard is associated with a second data source that is distinct from the first data source.

1924 Receive user specification of a plurality of first values corresponding to an automatic recurrence property of the first snapshot. The plurality of first values includes at least two of: a recurrence frequency; a recurrence expiration date; and a time of day at which a recurrence of the first snapshot is caused to be displayed on the messaging application.

1926 Receive user specification of a layout type for the first snapshot.

1928 The layout type is one of: a single view, a view stack, a carousel layout, a slideshow, a mini-dashboard, or an animation layout.

1930 The user specification is received via a computing device that is communicatively connected with, and distinct from, the computer system.

1932 In accordance with receiving the user specification of the values for the plurality of snapshot properties of the first snapshot, cause a rendering of the first snapshot to be displayed in a simulated chat interface in the computing device.

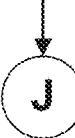

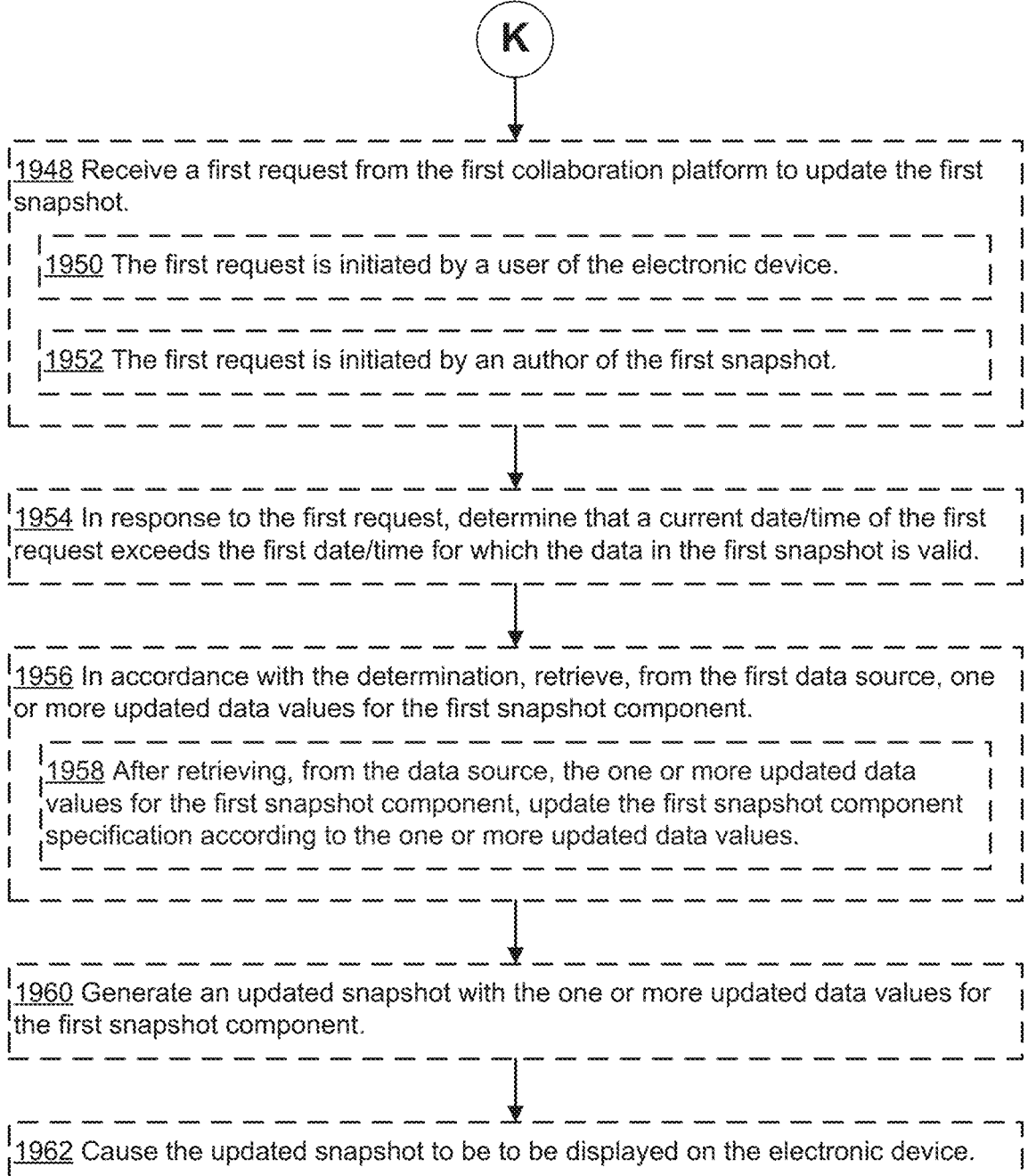

1948 Receive a first request from the first collaboration platform to update the first snapshot.

1950 The first request is initiated by a user of the electronic device.

1952 The first request is initiated by an author of the first snapshot.

1954 In response to the first request, determine that a current date/time of the first request exceeds the first date/time for which the data in the first snapshot is valid.

1956 In accordance with the determination, retrieve, from the first data source, one or more updated data values for the first snapshot component.

1958 After retrieving, from the data source, the one or more updated data values for the first snapshot component, update the first snapshot component specification according to the one or more updated data values.

1960 Generate an updated snapshot with the one or more updated data values for the first snapshot component.

1962 Cause the updated snapshot to be to be displayed on the electronic device.

Figure 19D

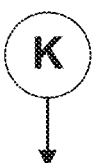

1966 Subsequent to causing the first snapshot to be displayed as a message on the messaging application, in accordance with a determination by the computer system that the plurality of first values corresponding to the automatic recurrence property are satisfied, retrieve, from one or more data sources corresponding to the one or more snapshot components of the first snapshot, current data values for the one or more snapshot components.

1968 Generate a first recurring version of the first snapshot.

1970 Cause the first recurring version of the first snapshot to be displayed on the messaging application of the electronic device.

1972 The plurality of values includes the time of day at which a recurrence of the first snapshot is caused to be displayed on the messaging application. Causing the first recurring version of the first snapshot to be displayed on the messaging application of the electronic device includes causing the first recurring version of the first snapshot to be displayed at the time of day specified in the automatic recurrence property.

1974 Update the first snapshot specification according to the current data values for the one or more snapshot components.

2002 A method is performed at a computing device having a display, one or more processors, and memory.

2004 The memory stores one or more programs configured for execution by the one or more processors.

2006 Display a user interface that includes a plurality of panes corresponding to a plurality of snapshots (i) authored by a user of the computing device and (ii) displayed on a messaging application of a collaboration platform.

2008 Each pane, of the plurality of panes, includes a respective view of the respective snapshot.

2010 The plurality of snapshots includes a first snapshot having one or more snapshot components. Each of the snapshot components is generated from a respective data element of a respective data dashboard.

2012 The user interface is an interface of the collaboration platform.

2014 The user interface is part of the same application displaying the respective data dashboard.

2016 Each data element is one of: one or more data cells from the respective data dashboard; one or more data values of a data field from the respective data dashboard; one or more data marks of a data visualization from the respective dashboard; or one or more data visualizations from the respective dashboard.

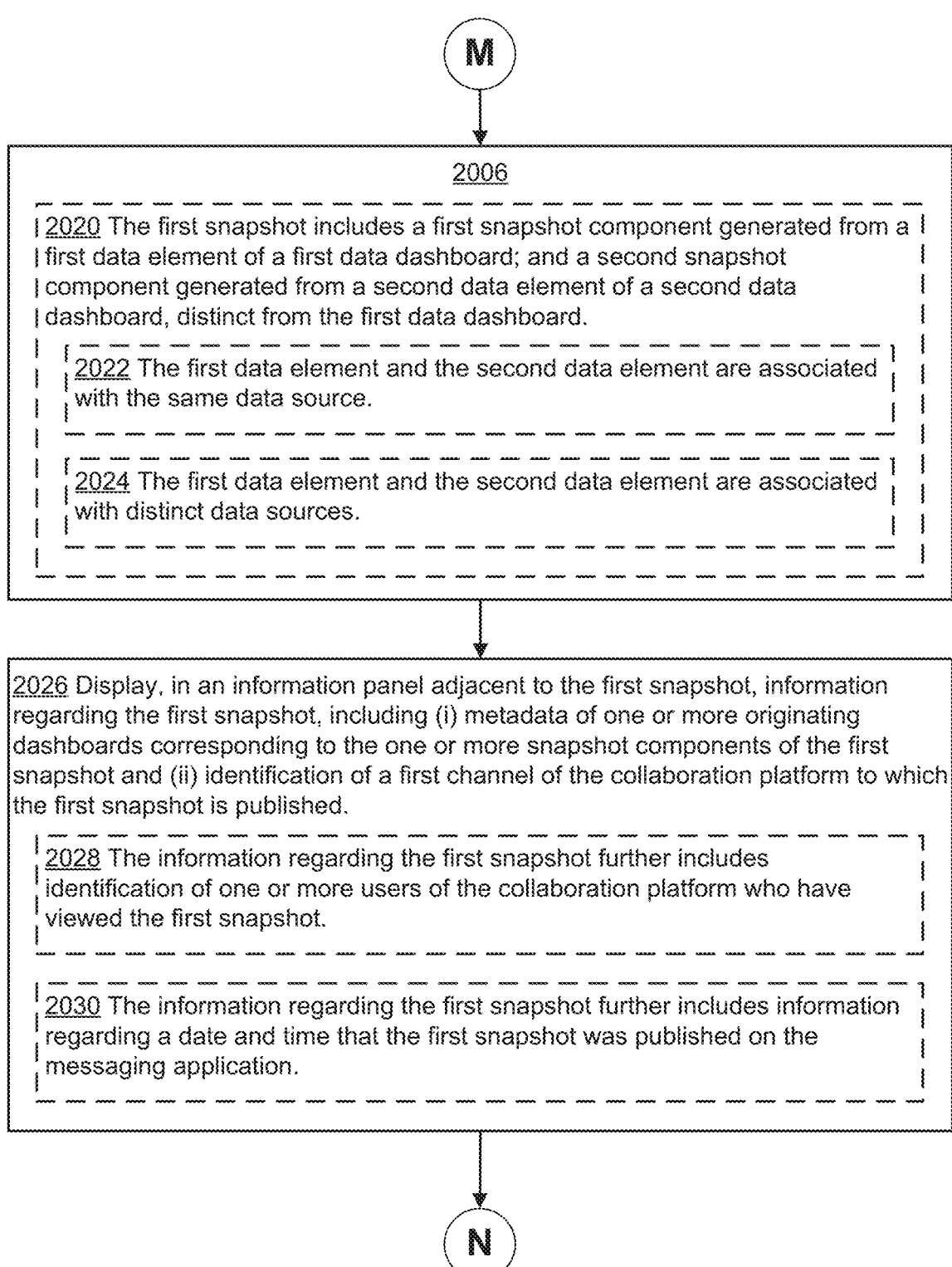

M

2006

2020 The first snapshot includes a first snapshot component generated from a first data element of a first data dashboard; and a second snapshot component generated from a second data element of a second data dashboard, distinct from the first data dashboard.

2022 The first data element and the second data element are associated with the same data source.

2024 The first data element and the second data element are associated with distinct data sources.

2026 Display, in an information panel adjacent to the first snapshot, information regarding the first snapshot, including (i) metadata of one or more originating dashboards corresponding to the one or more snapshot components of the first snapshot and (ii) identification of a first channel of the collaboration platform to which the first snapshot is published.

2028 The information regarding the first snapshot further includes identification of one or more users of the collaboration platform who have viewed the first snapshot.

2030 The information regarding the first snapshot further includes information regarding a date and time that the first snapshot was published on the messaging application.

USER INTERFACE FOR MANAGING RETARGETING OF DASHBOARD CONTENT

RELATED APPLICATIONS

This application claims priority to the following U.S. provisional patent applications, each of which is hereby incorporated by reference in its entirety:

(i) U.S. Provisional Application No. 63/403,167, filed Sep. 1, 2022, entitled "Retargeting Dashboard Content as Data Snapshots for Users on Collaboration Platforms";

(ii) U.S. Provisional Application No. 63/404,518, filed Sep. 7, 2022, entitled "Retargeting Dashboard Content as Data Snapshots for Users on Collaboration Platforms";

(iii) U.S. Provisional Application No. 63/407,986, filed Sep. 19, 2022, entitled "Philo: Retargeting Enterprise Dashboard Content as Interactive Snapshots for Collaboration Platforms"; and (iv) U.S. Provisional Application No. 63/409,165, filed Sep. 22, 2022, entitled "Philo: Retargeting Enterprise Dashboard Content as Interactive Snapshots for Collaboration Platforms."

This application is related to the following U.S. patent applications, each of which is hereby incorporated by reference in its entirety:

(i) U.S. patent application Ser. No. 18/240,322, entitled "Retargeting Dashboard Content as Interactive Data Snapshots for Collaboration Platforms," filed on Aug. 30, 2023; and (ii) U.S. patent application Ser. No. 18/240,340, entitled "Infrastructure for Retargeting Dashboard Content as Interactive Data Snapshots," filed on Aug. 30, 2023.

TECHNICAL FIELD

The disclosed implementations relate generally to data visualization and more specifically to systems, methods, and user interfaces that enable users to share selections from data dashboards as interactive snapshots on collaboration platforms and track usage of the snapshots on collaboration platforms.

BACKGROUND

Across enterprise organizations, people use data to support conversations and inform decisions. Communication "with and around data" often involves stakeholders in roles beyond data scientists or analysts. Data professionals are those who tend to have relatively stronger data analytic skills, and whose roles include sharing data artifacts with other team members through various communication channels (e.g., e-mail or cloud storage). On the other hand, business users tend to consume data artifacts, ask follow-up questions, initiate discussions, and make decisions. Many business users are in management or communication-based roles and tend to have shallow and brief engagement with data artifacts.

While data dashboards are a useful tool for analyzing and displaying data, they may not be ready for sharing with audiences such as business users because they often contain a large amount of information with higher complexity.

In practice, temporality plays a critical role when communicating with data, particularly as people discuss and make decisions with valid and up-to-date evidence.

SUMMARY

Many enterprise organizations are in the process of shifting their cultures to promote data-driven approaches to communication and decision making. Recently, this shift has been accompanied by another transformation of workplace culture: a shift to distributed and asynchronous modes of working. To communicate across groups spanning time zones and locations, collaboration platforms like Slack™ and Teams' have been playing increasingly important roles within organizations. However, in organizations where business intelligence dashboards are in regular use, data professionals often need to share dashboard snapshots via collaboration platforms to communicate with an audience of business users and others who do not occupy data analyst roles.

A data snapshot is a form of data report that refers to states of data at a specific point in time, and is intended to communicate the status quo. In some instances, "data snapshot" is a term that is invoked when referring to large-scale data (e.g., cloud platforms or organization data centers), and a snapshot may manifest as a set of charts or spreadsheets. Given that business intelligence dashboards remain in popular use within organizations, the term "dashboard snapshot" as used herein refers to the state of dashboard at a certain point in time.

The sharing of data artifacts such as dashboard snapshots is frequent, routine work and often entails some back-and-forth communication between those who share and their audiences. Data professionals need to keep updating their reports when new data arrives, when their analytic goals change, when they observe important anomalies or deviations from the status quo, or when they receive feedback from business users. In doing so, data professionals need to adopt different techniques (e.g., filtering, summarizing, or formatting), often achieved by switching between different tools.

Current strategies to share dashboard snapshots on collaboration platforms include taking screenshots, reconstructing a dashboard so as to reduce its complexity, and sending a link to the dashboard with some filter options. However, these techniques do not adequately and effectively support dashboard users for sharing dashboard snapshots. For example, static screenshots are limited because (i) they can become stale at any time as updated data becomes available, (ii) they do not support format changes and may not be appropriate for viewers' device or screen contexts (e.g., mobile, full-screen, or a window relegated to a peripheral display), and (iii) they are difficult to easily track and almost impossible to update after they proliferate across the channels of a collaboration platform. Re-creating a dashboard can impose extra workload, not only on dashboard authors, but also on those inclined to share insights from dashboards that they themselves did not create. Simply providing a link to a dashboard on a collaboration platform is unlikely to lead to fruitful conversations, as many viewers have difficulty accessing or orienting themselves within a complex dashboard.

To empower data professionals with an effective means of communicating dashboard content to their colleagues, improved methods, systems, and user interfaces are needed that facilitate retargeting of dashboard content.

Visualization retargeting commonly refers to transforming a chart to accommodate different contexts, including audiences, device sizes and screen types, and style guides.

Disclosed herein are methods, user interfaces, and systems for retargeting dashboard content as interactive data snapshots for collaboration platforms. The disclosed system and user interfaces—also referred to herein as "Philo"—support authoring and composing dashboard snapshots as well as sharing and monitoring them on a collaboration platform. Philo also supports template-based visualization design transformations, simple interactivity to support predictable questions, flexible time filtering, annotations and captions, snapshot status indicators, snapshot update management, and the monitoring of snapshot telemetry.

The present disclosure includes design guidelines for sharing dashboard snapshots on collaboration platforms, distilled from a co-design workshop. These guidelines outline support for conversations around data, for flexible authoring, and for the post-sharing lifecycle of snapshots.

The present disclosure also presents a formalization of dashboard snapshots, defining components as building blocks and snapshots as compositions of components.

In accordance with some implementations, a method of retargeting dashboard content as data snapshots for collaboration platforms is performed at a computing device having a display, one or more processors, and memory storing one or more programs configured for execution by the one or more processors. The method includes receiving user selection of a first data element from a first data dashboard that is displayed on the computing device. The user selection designates the first data element as a first snapshot component of a first snapshot. The method includes, in response to receiving the user selection of the first data element from the first data dashboard, displaying, in a first user interface, a plurality of component properties for the first snapshot component. The method includes receiving, via the first user interface, user specification of respective first values for at least a first subset of component properties of the plurality of component properties. The method includes, in accordance with receiving the user specification of the respective first values for at least the first subset of component properties: (i) updating the first snapshot component according to the respective first values; (ii) generating a first snapshot that includes the first snapshot component; and (iii) causing the first snapshot to be displayed as a message on a messaging application executed by an electronic device. The messaging application is associated with a collaboration platform.

In some implementations, the first data element is one of: one or more data cells from the first data dashboard; one or more data values of a data field from the first data dashboard; one or more data marks of a data visualization from the first data dashboard; or one or more data visualizations from the first data dashboard.

In some implementations, the method further includes, in accordance with receiving the user selection designating the first data element as the first snapshot component: generating a first component specification corresponding to the first snapshot component. The first component specification includes the plurality of component properties. The method populates the first component specification with the respective first values in accordance with the user specification of the respective first values for at least the subset of the properties.

In some implementations, the method includes receiving, via the first user interface, user selection of a dimension data field and a sorting order. Generating the first snapshot component includes (1) generating a bar chart having a plurality of data bars, each of the data bars representing a respective data value of the dimension field and having a respective length that represents a portion of the first data element corresponding to the respective data value and (2)

arranging the data bars in the sorting order according to respective lengths of the data bars.

In some implementations, the first snapshot includes a second snapshot component that is distinct from the first snapshot component. The method further comprises after generating the first snapshot component and prior to generating the second snapshot component: receiving user selection of a second data element, the user selection designating the second data element as the second snapshot component for a first snapshot. The method includes, in accordance with receiving the user selection, generating a second component specification corresponding to the second snapshot component. The second component specification includes the plurality of component properties.

In accordance with some implementations, a method of generating data snapshots for collaboration platforms is performed at a computer system having one or more processors, and memory storing one or more programs configured for execution by the one or more processors. The method includes receiving user specification of respective values for a plurality of snapshot properties of a first snapshot. The first snapshot includes one or more snapshot components, including a first snapshot component that is extracted from a first data dashboard. The first data dashboard is associated with a first data source. The user specification includes a first date/time for which data in the first snapshot is valid and a first collaboration platform to which the first snapshot is to be exported. The method includes, in accordance with receiving the user specification: (i) generating a first snapshot specification for the first snapshot according to the respective values for the plurality of snapshot properties; and (ii) generating the first snapshot according to the first snapshot specification. The method includes causing the first snapshot to be displayed as a message on a messaging application of an electronic device. The messaging is application associated with the first collaboration platform.

In some implementations, the method includes receiving a first request from the first collaboration platform to update the first snapshot. The method includes, in response to the first request, determining that the current date/time of the first request exceeds the first date/time for which the data in the first snapshot is valid. The method includes, in accordance with the determination: (i) retrieving, from the first data source, one or more updated data values for the first snapshot component; (ii) generating an updated snapshot with the one or more updated data values for the first snapshot component; and (iii) causing the updated snapshot to be to be displayed on the electronic device.

In some implementations, receiving the user specification of the respective values for the plurality of snapshot properties of the first snapshot includes receiving user specification of a plurality of first values corresponding to an automatic recurrence property of the first snapshot, the plurality of first values including at least two of: a recurrence frequency; a recurrence expiration date; and a time of day at which a recurrence of the first snapshot is caused to be displayed on the messaging application.

In some implementations, the method includes, subsequent to causing the first snapshot to be displayed as a message on the messaging application: in accordance with a determination by the computer system that the plurality of first values corresponding to the automatic recurrence property are satisfied: (i) retrieving, from one or more data sources corresponding to the one or more snapshot components of the first snapshot, respective current data values for the one or more snapshot components; (ii) generating a first recurring version of the first snapshot; and (iii) causing the first recurring version of the first snapshot to be displayed on the messaging application of the electronic device.

In accordance with some implementations, a method of interacting with data snapshots is performed at a computing device that includes a display, one or more processors, and memory storing one or more programs configured for execution by the one or more processors. The method includes displaying a user interface that includes a plurality of panes corresponding to a plurality of snapshots (i) authored by a user of the computing device and (ii) displayed on a messaging application of a collaboration platform. Each pane, of the plurality of panes, includes a respective view of the respective snapshot. The plurality of snapshots includes a first snapshot having one or more snapshot components. Each of the snapshot components is generated from a respective data element of a respective data dashboard. The method includes displaying, in an information panel adjacent to the first snapshot, information regarding the first snapshot, including: (i) metadata of one or more originating dashboards corresponding to the one or more snapshot components of the first snapshot; and (ii) identification of a first channel of the collaboration platform to which the first snapshot is published. The method includes, in response to detecting a first user selection of a notification, displayed in the user interface, indicating that the first snapshot has expired: (i) transmitting one or more identifiers of the one or more originating dashboards to a computer system that is communicatively connected with the computing device; and (ii) receiving, from the computing system, updated data for the one or more snapshot components of the first snapshot. The method includes generating an updated view of the first snapshot according to the received updated data and displaying the updated view of the first snapshot in the user interface.

In some implementations, the first snapshot is generated based on user specification of a first date/time at which a first snapshot component of the first snapshot expires. The notification is displayed in the user interface in response to a determination that the first date/time has expired.

In accordance with some implementations, a computing device includes a display, one or more processors, and memory coupled to the one or more processors. The memory stores one or more programs configured for execution by the one or more processors. The one or more programs include instructions for performing any of the methods disclosed herein.

In accordance with some implementations, a computer system includes a one or more processors and memory coupled to the one or more processors. The memory stores one or more programs configured for execution by the one or more processors. The one or more programs include instructions for performing any of the methods disclosed herein.

In accordance with some implementation, a non-transitory computer readable storage medium stores one or more programs configured for execution by a computer system having one or more processors and memory. The one or more programs include instructions for performing any of the methods disclosed herein.

In accordance with some implementation, a non-transitory computer readable storage medium stores one or more programs configured for execution by a computing device having a display, one or more processors, and memory. The one or more programs include instructions for performing any of the methods disclosed herein.

Thus methods, systems, and graphical user interfaces are disclosed that allow users to efficiently retarget dashboard content as interactive data snapshots for collaboration platforms.

Note that the various implementations described above can be combined with any other implementations described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Detailed Description of Implementations below, in conjunction with the following drawings in which like reference numerals refer to corresponding parts throughout the figures.

FIGS. 2A and 2B provide a block diagram of a computing device, in accordance with some implementations.

FIGS. 3A and 3B provide a block diagram of a data visualization server, in accordance with some implementations.

FIG. 6A to 6D show a component creator user interface, in accordance with some implementations.

FIGS. 9A to 9D show exemplary curation methods, in accordance with some implementations.

FIG. 10 shows a snapshot home user interface, in accordance with some implementations.

FIGS. 11A to 11C collectively provide a formalization for dashboard snapshots, in accordance with some implementations FIGS. 12A to 12D collectively provide a formalization for a snapshot component, in accordance with some implementations.

FIGS. 13A and 13B collectively provide a formalization for a template, in accordance with some implementations.

FIG. 14A provides a formalization for a template specification, in accordance with some implementations. FIG. 14B illustrates an example template design definition and template specification for a "goal" template, in accordance with some implementations.

FIGS. 15A to 15K provide exemplary template designs, in accordance with some implementations.

FIGS. 18A to 18I provide a flowchart of a method of retargeting dashboard content as data snapshots for collaboration platforms, in accordance with some implementations.

FIGS. 19A to 19E provide a flowchart of a method of generating data snapshots for collaboration platforms, in accordance with some implementations.

FIGS. 20A to 20D provide a flowchart of a method of interacting with data snapshots, in accordance with some implementations.

Figure 1A:
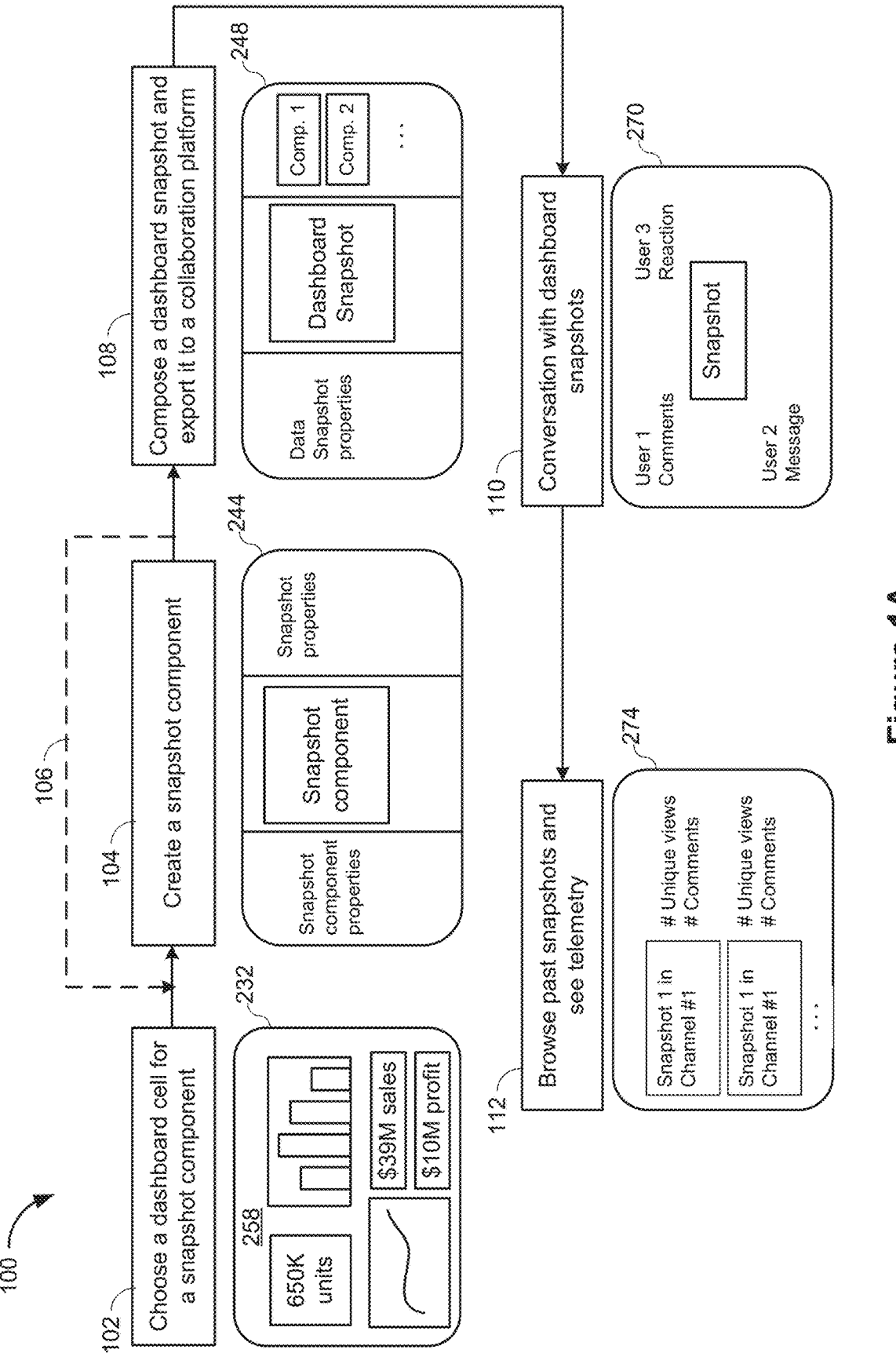
FIG. 1A illustrates an exemplary pipeline for retargeting data dashboard content as data snapshots for users on collaboration platforms, in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DETAILED DESCRIPTION OF IMPLEMENTATIONS

In enterprise organizations, data-driven decision-making processes are currently bifurcated between data dashboards (e.g., business intelligence dashboards) and communication platforms such as Slack™ and Teams. However, apart from those in data analyst roles, there is shallow engagement with dashboard content due to insufficient context, poor representation choices, or a lack of access and guidance.

I. Communicating with Dashboards

Dashboard Use Cases. Dashboards are a popular medium for monitoring and communicating aspects of data, particularly for data professionals having limited programming expertise. Dashboards range from static, magazine-style, and infographic dashboards to analytic, embedded, and repository dashboards. Data professionals tend to use analytic dashboards enabled by business intelligence tools (e.g., Tableau) that often contain a relatively larger number of interactive elements. In order to answer a specific question, one must make selections and adjust parameters or filters.

Case for Retargeting Dashboard Content. Content from analytic dashboards requires modification, or retargeting, before it is to be shared on a collaboration platform. As used herein, retargeting includes transforming a visualization artifact initially designed for one context so that it may suit a different context. This contextual shift may be due to different audience and communication goals, such as when communicating content initially intended for a research audience to the general public. This shift could also be attributed to different device sizes or capabilities, meaning that the term "retargeting" as used herein also encompasses responsive visualization design. Additionally, retargeting may also encompass the imposition of different design guidelines, such as when mandating a new style guide or applying a style transfer. Modifying dashboard content for reporting and sharing with business users often involves changing the size and layout of content, composing elements with a coherent narrative, and adding annotations to provide context.

As business intelligence dashboards are often designed to be consumed as full-screen applications, learnings from prior work can be applied in responsive visualization design when retargeting dashboard content for collaboration platforms, particularly as people interact with these platforms via mobile applications or via a peripheral desktop application. For example, there may be dashboard design trade-off whereupon decreased screen real estate necessitated simpler and more abstract representations, along with additional affordances for interactivity and revealing hidden information. These findings are in keeping with prior work on responsive visualization design. While some commercial business intelligence tools provide a mobile app emulator, it is difficult to simulate how dashboard content may manifest in an embedded context, such as within a collaboration platform.

The sharing of dashboard snapshots also implies the communication of intent and context, whereas responsive design techniques typically assume a continuity of intent and context across devices, particularly in the domain of data journalism. One cannot assume this continuity in an enterprise setting, where the intent and context may vary from one audience to another. There is also a need for breaking down, narrating, and interpreting data content in enterprise communication. In curating content for dashboard snapshots, data professionals should consider that a typical business user audience tends to be more passive with this material. However, this passivity should not be seen as a license to generate static content. While the audience may not interact directly with the content, they may discuss it and pass it on to secondary audiences, so it is critical to keep the content updated and monitor its visibility throughout an organization.

Authoring Tools for Communicative Data Artifacts. In both research and practice, prior work offers several alternative approaches to authoring various forms of artifacts for communicating with data. Irrespective of the involvement of dashboards, a common aspect across prior approaches is that they do not include considerations for how these artifacts are circulated after they are published. Such considerations are a critical aspect of authoring communicative data artifacts such as dashboard snapshots.

The disclosed systems, methods and user interface extend the scope of retargeting to situating content in communication by accounting for the post-sharing lifecycle of dashboard snapshots on collaboration platforms.

II. Design Guidelines

As noted above, Philo refers to a disclosed system and user interface that support creating dashboard snapshots and sharing them on a collaboration platform as disclosed herein.

As disclosed, the inventors have identified three main design guidelines (DG) for snapshot generation systems and interfaces (e.g., Philo), each having several imperatives. These guidelines were developed based on co-design workshop sessions that the inventors conducted with several participants. Details of the workshop sessions are described in priority documents U.S. Provisional Application No. 63/404,518, filed Sep. 7, 2022 and U.S. Provisional Application No. 63/407,986, filed on Sep. 19, 2022, which are incorporated by reference in their entirety. U.S. Provisional Application No. 63/409,165, which is incorporated by reference herein in its entirety, illustrates initial Jamboard setups and prototyping assets that were used during the workshop sessions.

DG1: Design Support conversations around data. This includes using messages or takeaway statements for snapshots to support conversations with their business user audience. In addition to enabling authors to make selections from their dashboards, snapshot creation tools should also provide affordances for authors (i) to highlight where the audience should look first, (ii) state calls to actions motivated by the data, and/or (iii) encourage audience interactions to support simple question answering. In summary, dashboard snapshots must become part of a conversation about data. More than the mere delivery of a chart, they must communicate insights and calls to action.

DG1a: Add context and framing. In some instances, takeaway statements and snapshot content can be framed as status reports (e.g., "We have people in [New York]") and as calls to action. For example, a snapshot can include an informal qualitative interpretation to a status report, such as "Our [server health] is getting hit in the environment [us-west]." with a heatmap showing different server health values (e.g., throughput and delays) of the environment over time. An example of a call to action is: "Please enter your activities on time so leadership understands the impact that we are having." was accompanied by a table for different activity measures by his team members with a highlight on the member whose values were missing.

DG1b: Clearly indicate temporal scope. To avoid misleading the audience, a temporal frame of reference can be used to constrain which data is shared. As one example, a snapshot that was created in mid-June 2022 may want to exclude the data points for June 2022, so as not to give a false impression of a lower-than-typical monthly value. As another example, because weekend data values tend to be lower than typical weekday values, data points can be constrained to Mondays to Fridays only, so that only representative values are shared.

DG1c: Guide viewers' attention. Visual emphasis, such as highlighting or the use of different fonts or color, can be used to indicate important data points, to specify a viewing order, or to aid interpretation. For instance, an arrow can be drawn from one component to another to specify the viewing order. A confidence interval for the usual range of a measure can be added so that a big deviation could "raise eyebrows." A footnote can be included to mention missing data points. In some instances, a macro- or shortcut-based interaction can be used for guiding viewers to specific observations: For example, a snapshot author can add a "See what [author] saw" button on the snapshot that reveals a view of the dashboard with a specific combination of filter settings.

DG1d: Support predictable questions with limited interactivity. In some instances, interactions can be curated so as to allow the audience to see more details and spur further action. For example, a snapshot about "scores broken down by business unit" can include a drop-down filter for selecting different business units. In some instances, besides adding a breakdown option to select a business category, the snapshot can also include follow up questions for the audience.

DG1e: Control who sees what. As data is often a sensitive asset in business contexts, data governance rules and processes may apply to resharing dashboard content as snapshots. Governance for dashboards is often achieved through setting permissions (e.g., who can read, write, and delete). For example, a snapshot author may not be able to share dashboard screenshots on a specific collaboration platform channel if the people in that channel do not have the same permission level. Thus, dashboard snapshots must go beyond static screenshots to include live visualization content through which existing data governance policies can be enforced.

DG2: Support flexible authoring. In some instances, snapshot authors do not always want to be bound by the form of content as it appears in a source dashboard. Thus, snapshot creation tools should support the transformation of the appearance of this content in a flexible way. This can include supplementing the information with additional values and filtering or dis-aggregating existing values, so as to best support the intended message. However, if a system makes such editing difficult by mandating the manual specification of content, this can impose additional burden on authors because authors may not have the time and/or skills to be able to go in and change the content in a particular way.

DG2a: Select dashboard content at varying levels of specificity. In some instances, snapshot authors may want to be able to select a certain portion of their dashboards to share a focused message. For example, widgets that are irrelevant to the message of the snapshot may confuse people who rarely or never visited the dashboard. Snapshot authors should be provided with options to exclude such widgets. Some snapshots may reference content spanning several disparate dashboards. For example, a snapshot author may add a total sales value from one dashboard and add a temporal breakdown to it, informed by another dashboard so as to provide further context. Given these varying levels of specificity, the term "dashboard selection" as used herein refers to dashboard content that snapshot authors select to include in a dashboard snapshot. In some instances, a dashboard selection is a single numeric value. In some instances, a dashboard selection can be a set of charts from one or more dashboards.

DG2b: Transform how data is represented. Some snapshot messages benefit from transformations to how the dashboard content is represented. In some instances, a snapshot author may want to adjust the granularity of the data to simplify the content or to provide additional context for business users. For example, an author may want to include categorical breakdowns for business users "to know what I'm talking about," because the business users would not be likely to visit the dashboard and apply a categorical filter themselves. Another author may like to disaggregate a field with a ranked list of top or bottom performers (e.g., employees or products) to make it "more tangible". Others may want to add information not found in the original dashboard. For example, to show the progress toward a team's goal, a snapshot author may add a value that is not present on a data dashboard.

DG2c: Selectively propagate design choices from the dashboard. While some dashboard content is best communicated once its representation is transformed, it is just as critical in other cases to maintain aspects of the dashboard design. For example, a custom color legend can be included to cater to audiences who "may not be as in tune with this scale." Color legends/scales can be specifically selected for other reasons, such as "because there is someone in in our team who is colorblind, and the colors are picked so that they have different [meanings], and so we can't change the colors."

DG2d: Enable multi-component snapshots. A snapshot author may want to design a multi-component snapshot, including choosing how to present multiple components. This can include arranging the components either in a layout that mirrored the original dashboard, using animation to show temporal change, in a vertical stack, or as an interactive carousel of components. In some instances, a snapshot author may decide whether to use animation after assessing their viewers' impressions.

DG3: Support the lifecycle of snapshots. After sharing a snapshot, authors need to track and monitor engagement with their snapshots, so as to adjust the scope and design of their future snapshots and to assess how their snapshots are circulated across an organization. Furthermore, as dashboard snapshots become stale over time, authors need to manage outdated snapshots and retrieve updated versions.

DG3a: Browse past snapshots. Dashboard snapshots on a collaboration platform channel become stale over time because the data sources can be updated at any time. A dedicated channel or tab can be used to browse past dashboard snapshots from different collaboration platform channels. For example, past and current snapshots can be displayed via a side-by-side view, where one side displays a reference dashboard snapshot while the other shows all of the other dashboard snapshots. Preferably, a snapshot author should not apply changes to past snapshots because, for example, changes to past snapshots may prevent people from understanding their history. A visual indicator, such as grayscale indicator or visual de-emphasis can be applied to past snapshots to indicate that data in the past snapshots are stale or expired, without limiting people from going back and looking at the past data.

DG3b: Track snapshot telemetry. Types of snapshot telemetry that may be useful to a snapshot author include: (unique) view counts, names of viewers, up/down votes, interaction logs, and comments. In some instances, a snapshot author may be interested to know about the spread of the snapshots across an organization. As an example, telemetry information can be useful to a snapshot author when the audience viewers made decisions depending on information the author had provided. The ability to track telemetry information enables the author to adjust the content based the extent of its dissemination. In some instances, a distinction between active and passive telemetry can be made. Active telemetry refers to logs of specific actions that a creator wishes their viewers to achieve, whereas passive telemetry means any kinds of logs that the system automatically records. A "homepage" that summarizes engagement with shared snapshots can be a suitable avenue for viewing telemetry information.

DG3c: Automate snapshot updates. Some dashboard snapshots are intended to be repeatedly shared as a status report. Once initially specified, options should be provided so that these snapshots can be automatically re-shared. For example, automated readouts for important values (e.g., the top 10 customers) can be provided to audiences on a regular basis. In some instances, dashboard snapshots can be combined with an automated alert system that sends out messages when certain predefined conditions are met (e.g., when the server health dips below a certain threshold).

II. Philo

Philo is a system that supports the retargeting of dashboard content as interactive snapshots (e.g., data snapshots) for sharing on collaboration platforms. The snapshots are intended for a business user audience, also referred to as a "viewer." In this disclosure, a dashboard user that creates snapshots is also known as an "author" or a "snapshot author." In accordance with some implementation, Philo was built using Express, Svelte, DynamoDB (NoSQL), d3.js, Vega, Vega-Lite, and Arquero.

FIG. 1A shows an exemplary pipeline 100 for retargeting data dashboard content as data snapshots (e.g., snapshots or dashboard snapshots) for users on collaboration platforms, in accordance with some implementations. A snapshot author selects (102) dashboard content (e.g., data element(s)) from a data dashboard 258 (e.g., that is displayed in a dashboard user interface 232) and creates (104) a snapshot component based on the selection using a component creator user interface 244. The dashboard author can repeat (106) the process of component creation, by selecting other dashboard content either from the same data dashboard or from a different data dashboard, to create one or more other snapshot components for inclusion in the (same) data snapshot. In some implementations, after creating multiple snapshot components, the author consolidates (108) the snapshot components into a single snapshot via a snapshot creator user interface 248, and exports it to a collaboration platform channel (e.g., a messaging application 270). In some instances, a snapshot includes two or more snapshot components. In some instances, a snapshot consists of a single snapshot component. Within the channel, viewers react to and comment on the snapshot (110). The author can also view (112) the dashboard snapshots and related telemetry information (e.g., view counts, comments) via a "My Snapshot Home" user interface 274.

A. Exemplary Operating Environment

Figure 1B:
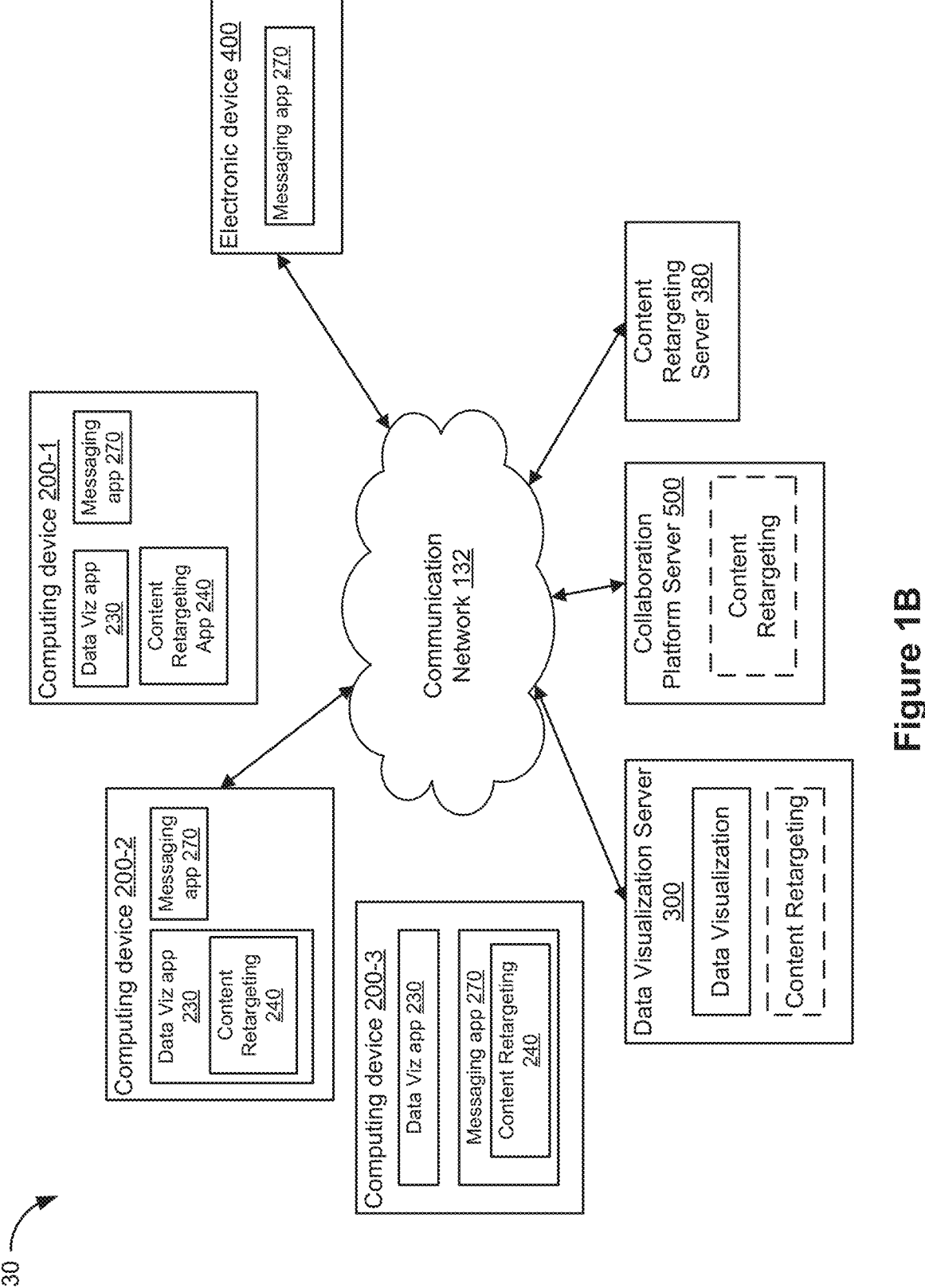
FIG. 1B illustrates an exemplary operating environment, in accordance with some implementations.

FIG. 1B shows an exemplary operating environment 130, in accordance with some implementations. The operating environment 130 includes one or more computing devices 200, such as a first computing device 200-1, a second computing device 200-2, and a third computing device 200-3. In some implementations, each of the computing devices 200 is associated with a respective author of a data snapshot. A computing device includes, and can run, one or more applications, including a data visualization application 230, a content retargeting application 240, and a messaging application 270.

In some implementations, the data visualization application 230, the content retargeting application 240, and the messaging application 270 are three distinct applications. This is illustrated with respect to the first computing device 200-1.

In some implementations, the content retargeting application 240 (and its associated capabilities) are part of the data visualization application 230, and the messaging application 270 is distinct from the data visualization application 230. This is illustrated with respect to the second computing device 200-2.

In some implementations, the content retargeting application 240 (and its associated capabilities) are part of the messaging application 270, and the data visualization application 230 is distinct from the messaging application 270. This is illustrated with respect to the third computing device 200-3.

The operating environment 130 includes an electronic device 400 that is associated with an audience (e.g., a viewer) of a data snapshot. The electronic device 400 includes a messaging application 270.

In some implementations, the data visualization application 230 is communicatively connected with a data visualization server 300 via a communication network 132. The messaging application 270 is communicatively connected with a collaboration platform server 500 (e.g., a messaging server) via the communication network 132.

The content retargeting application 240 can be communicatively connected with (A) a content retargeting server 380, or (B) the data visualization server 300, or (C) the collaboration platform server 500, via the communication network 132, depending on whether it exists as a standalone application (Scenario A), is part of the data visualization application 230 (Scenario B), or is part of the messaging application 270 (Scenario C).

B. Block Diagrams

FIGS. 2A and 2B provide a block diagram of a computing device 200, in accordance with some implementations. In some implementations, the computing device 200 is associated with a snapshot author. The computing device 200 can execute a data visualization application 230 or a data visualization web application to display dashboard(s) 258. In some implementations, the computing device 200 can execute a content retargeting application 240 or a content retargeting web application to generate snapshot component(s) 252 and data snapshot(s) 256 for a collaboration platform. In some implementations, the computing device 200 can execute a messaging application 270 that includes a user interface (e.g., Snapshot Home UI 274) for viewing dashboard snapshots created by a snapshot author and related telemetry information.

The computing device 200 may be a desktop computer, a laptop computer, a tablet computer, or other computing device with a display and a processor capable of running the data visualization application 230, content retargeting application 240, and/or the messaging application 270. The data visualization application 230 may include a data source generator for database organization (e.g., generating object models for databases) as well as generating new data sources using existing databases.

The computing device 200 typically includes one or more processing units/cores (CPUs) 202 for executing modules, programs, and/or instructions stored in the memory 206 and thereby performing processing operations, one or more network or other communications interfaces 204, memory 206, and one or more communication buses 208 for interconnecting these components. The communication buses 208 may include circuitry that interconnects and controls communications between system components.

In some implementations, the computing device 200 includes a user interface 210 comprising a display 212 and one or more input devices or mechanisms 214. In some implementations, the input device/mechanism includes a keyboard. In some implementations, the input device/mechanism includes a "soft" keyboard, which is displayed as needed on the display 212, enabling a user to "press keys" that appear on the display 212. In some implementations, the display 212 and input device/mechanism 214 comprise a touch screen display (also called a touch sensitive display). In some implementations, the display is an integrated part of the computing device 200. In some implementations, the display is a separate display device. Some implementations include an audio input device 216 (e.g., a microphone) and/or an audio output device 218 (e.g., a speaker).

In some implementations, the memory 206 includes high-speed random-access memory, such as DRAM, SRAM, DDR RAM or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the CPUs 202. The memory 206, or alternatively the non-volatile memory devices within the memory 206, comprises a non-transitory computer readable storage medium. In some implementations, the memory 206, or the computer readable storage medium of the memory 206, stores the following programs, modules, and data structures, or a subset thereof:

- an operating system 222, which includes procedures for handling various basic system services and for performing hardware dependent tasks;
- a communication module 224, which is used for connecting the computing device 200 to other computers and devices via the one or more communication network interfaces 204 (wired or wireless) and one or more communication networks, such as the Internet, other wide area networks, local area networks, metropolitan area networks, and so on;

- a web browser 226 (or other client application), which enables a user to communicate over a network with remote computers or devices;
- an audio input module 228 (e.g., a microphone module) for processing audio captured by the audio input device 216. The captured audio may be sent to a remote server and/or processed by an application executing on the computing device 200 (e.g., by the data visualization application 230, the content retargeting application 240, or the messaging application 270);
- a data visualization application 230, which provides a dashboard user interface 232 and (e.g., graphical user interface) and a dashboard generator 234 for a user to perform data analysis, including constructing databases, constructing object models, and constructing visual graphics (e.g., an individual data visualization or a dashboard with one or more related data visualizations). In some implementations, the data visualization application 230 executes as a standalone application (e.g., a desktop application). In some implementations, the data visualization application 230 executes within the web browser 220 (e.g., as a web application). The data visualization application 230 includes:
  - a dashboard user interface 232, which enables a user to access or build object models and data sources, and also provides a graphical view to build data dashboards (e.g., data visualizations) by specifying elements visually; and
  - a dashboard generator 234 for generating data visualizations and/or data dashboards;
- a content retargeting application 240 (e.g., Philo) for retargeting dashboard content as interactive snapshots for collaboration platforms (e.g., the messaging application 270 and the collaboration platform server 500). The content retargeting application 240 includes:
  - a component generator 242, which enables a user (e.g., a snapshot author) to create a snapshot component from a selected data element of a data dashboard via a component creator user interface 244. In some implementations, a snapshot author can specify respective values for respective component properties such as measures, filters, a time frame, breakdowns, and optional parameters via the component creator user interface 244. In some implementations, an author can modify the respective values as needed (e.g., via the component creator user interface 244 or the data visualization server 300) without altering the source dashboard; and
  - a snapshot generator 246, which enables a snapshot author to compose a snapshot (e.g., by consolidating one or more snapshot components) via a snapshot creator user interface 270. In addition to enabling multi-component snapshots, the snapshot generator 246 accommodates selections across multiple dashboards using a snapshot generator user interface 248;
- a messaging application 270 for communicating with other users via direct messaging, file sharing, snapshot sharing, live streaming, and/or participation in chat rooms (e.g., channels) organized by topics and/or groups). In some implementations, the messaging application 270 executes as a standalone application (e.g., as an application designed to run on the computing device 200 or on other mobile devices). In some implementations, the messaging application 270 executes within the web browser 226 or another application using web pages provided by a web server. In some implementations, the messaging application 270 includes a messaging user interface 272. In some implementations, the messaging application 270 includes a snapshot home user interface 274 that enables a user to view dashboard snapshots authored by the user and telemetry information related to the dashboard snapshots;

APIs 280 for receiving API calls from one or more applications (e.g., the web browser 222, the data visualization application 230, the content retargeting application 240, and/or the messaging application 270), translating the API calls into appropriate actions, and performing one or more actions;

component specifications 250 (or snapshot component specifications) for snapshot components 252, including a first component specification 250-1 corresponding to a first snapshot component 252-1 and a second component specification 250-2 corresponding to a second snapshot component 252-2. Component specifications 250 are used to define characteristics of a desired snapshot component. In some implementations, the information provided by the computing device 200 or an electronic device 400 (e.g., via user input) is stored as a component specification;

snapshot components 252, including a first snapshot component 252-1 and a second snapshot component 252-2. In some implementations, the snapshot components 252 are generated and stored in the memory of the computing device 200. In some implementations, the snapshot components 252 are generated by the computing device 200 on-the-fly in accordance with the component specifications 250. In some implementations, the computing device 200 creates a placeholder for a snapshot component (e.g., based on coordinates of a data element of a data dashboard selected by a user), creates a component specification corresponding to a snapshot component, and populates the component specification with values for respective properties according to the data provided by the computing device 200 or an electronic device 400 (e.g., via user input);

snapshot specifications 254 (or data snapshot specifications) for data snapshots 256 (or simply "snapshots"), including a first snapshot specification 254-1 corresponding to a first data snapshot 256-1 and a second snapshot specification 254-6 corresponding to a second data snapshot 256-2;

data snapshots 256, including a first data snapshot 256-1 and a second data snapshot 256-2. In some implementations, the data snapshots 256 are generated and stored in the memory of the computing device 200. In some implementations, the data snapshots 256 are generated by the computing device 200 on-the-fly in accordance with the snapshot specifications 254;

data dashboards 258, including a first data dashboard 258-1 having one or more dashboard elements 260-1, and a second data dashboard 258-2 having one or more dashboard elements 260-2;

templates 262 (or template designs). Philo allows authors to apply design transformations to snapshot components via templates. Collectively, the templates 262 correspond to a set of communicative intents (e.g., breakdown of a value by a categorical data field or discretized bin, elicit a comparison between a value and a goal, support a call to action, or communicate a trend in reference to a threshold). Templates inherit several properties, such as data and measures from a component, and the worksheet property, which retains a dashboard selection's scale mappings, thereby allowing authors to selectively preserve some dashboard design choices after applying a template-based transformation to the content;

template specifications 264; and one or more databases/data sources 266, including a first data source 266-1 and a second data source 266-2. In some implementations, the data sources are stored as spreadsheet files, CSV files, XML files, flat files, or JSON files, or stored in a relational database. For example, a user selects one or more databases or data sources 266 (which may be stored on the computing device 200 or stored remotely), selects data fields from the data sources 266, and uses the selected fields to define a visual graphic.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. In some implementations, the memory 206 stores additional modules or data structures not described above. For example, in some implementations, the computing device 200 includes a natural language processing interface, which receives and parses queries that includes natural language input functionality. In some implementations, some of the modules or applications described in FIG. 2 can be implemented on other devices and/or systems, such as a data visualization server 300, an electronic device 400, or a collaboration platform server 500.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

FIGS. 3A and 3B illustrate a block diagram of a data visualization server 300, in accordance with some implementations. A server system 300 may host one or more databases 360 or may provide various executable applications or modules. The data visualization server 300 typically includes one or more processing units/cores (CPUs) 302, one or more network interfaces 304, memory 314, and one or more communication buses 312 for interconnecting these components. In some implementations, the server 300 includes a user interface 306, which includes a display 308 and one or more input devices 310, such as a keyboard and a mouse. In some implementations, the communication buses 312 include circuitry (sometimes called a chipset) that interconnects and controls communications between system components.

In some implementations, the memory 314 includes high-speed random-access memory, such as DRAM, SRAM, DDR RAM, or other random-access solid-state memory devices. In some implementations, the memory includes non-volatile memory, such as one or more magnetic disk storage devices, optical disk storage devices, flash memory devices, or other non-volatile solid-state storage devices. In some implementations, the memory 314 includes one or more storage devices remotely located from the CPU(s) 302. The memory 314, or alternatively the non-volatile memory devices within the memory 314, comprises a non-transitory computer readable storage medium.

In some implementations, the memory 314, or the computer readable storage medium of the memory 314, stores the following programs, modules, and data structures, or a subset thereof:

- an operating system 316, which includes procedures for handling various basic system services and for performing hardware dependent tasks;
- a network communication module 318, which is used for connecting the server 300 to other computers via the one or more communication network interfaces 304 (wired or wireless) and one or more communication networks, such as the Internet, other wide area networks, local area networks, metropolitan area networks, and so on;
- a web server 320 (such as an HTTP server), which receives web requests from users and responds by providing responsive web pages or other resources;
- a data visualization web application 330, which may be downloaded and executed by a web browser 220 on a user's computing device 200. In general, a data visualization web application 330 has the same functionality as a desktop data visualization application 230, but provides the flexibility of access from any device at any location with network connectivity, and does not require installation and maintenance. In some implementations, the data visualization web application 330 includes various software modules to perform certain tasks. In some implementations, the data visualization web application 330 includes a dashboard user interface module 332, which provides the user interface for all aspects of the data visualization web application 330. In some implementations, the data visualization web application 330 includes dashboard generator module 340 for data analysis, including constructing databases, constructing object models, and constructing visual graphics (e.g., individual data visualizations or dashboards each having one or more related data visualizations);
- a data retrieval module 336, which builds and executes queries to retrieve data from one or more databases 360. The databases 360 be stored locally on the server 300 or stored at an external database system. For example, the data retrieval module 336 may retrieve a database 360 that stores one or more data sources 266 such that data tables and data fields from the data source 266 can be used to build a data visualization or a data dashboard having one or more data visualizations;
- a content retargeting web application 340, which includes:
  - a component generator module 342, which receives and processes selections of data elements from dashboards (provided by a computer system or a computer device 200) and generates respective snapshot components. In some implementations, the component generator module 342 includes a component generator user interface module 344, which provides the user interface for all aspects of the content retargeting web application 340 associated with generating snapshot components;

- a snapshot generator module 346, which generates data snapshots by consolidating one or more snapshot components from one or more respective data dashboards;
- APIs 350 for receiving API calls, translating the API calls into appropriate actions, and performing one or more actions;
- one or more databases 260, which store data used or created by the data visualization web application 330, the data visualization application 230, the content retargeting web application 340, the content retargeting application 240, or the messaging application 270 including:
  - component specifications 250;
  - snapshot components 252;
  - snapshot specifications 254;
  - data snapshots 256;
  - data dashboards 258 and data dashboard elements 260;
  - templates 262; template specifications 264;
  - data sources 266; and
  - user preferences 362

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. In some implementations, the memory 314 stores additional modules or data structures not described above.

Although FIG. 3 shows a server system 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200, or an electronic device 400, or a collaboration platform server 500. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world).

Figure 4:
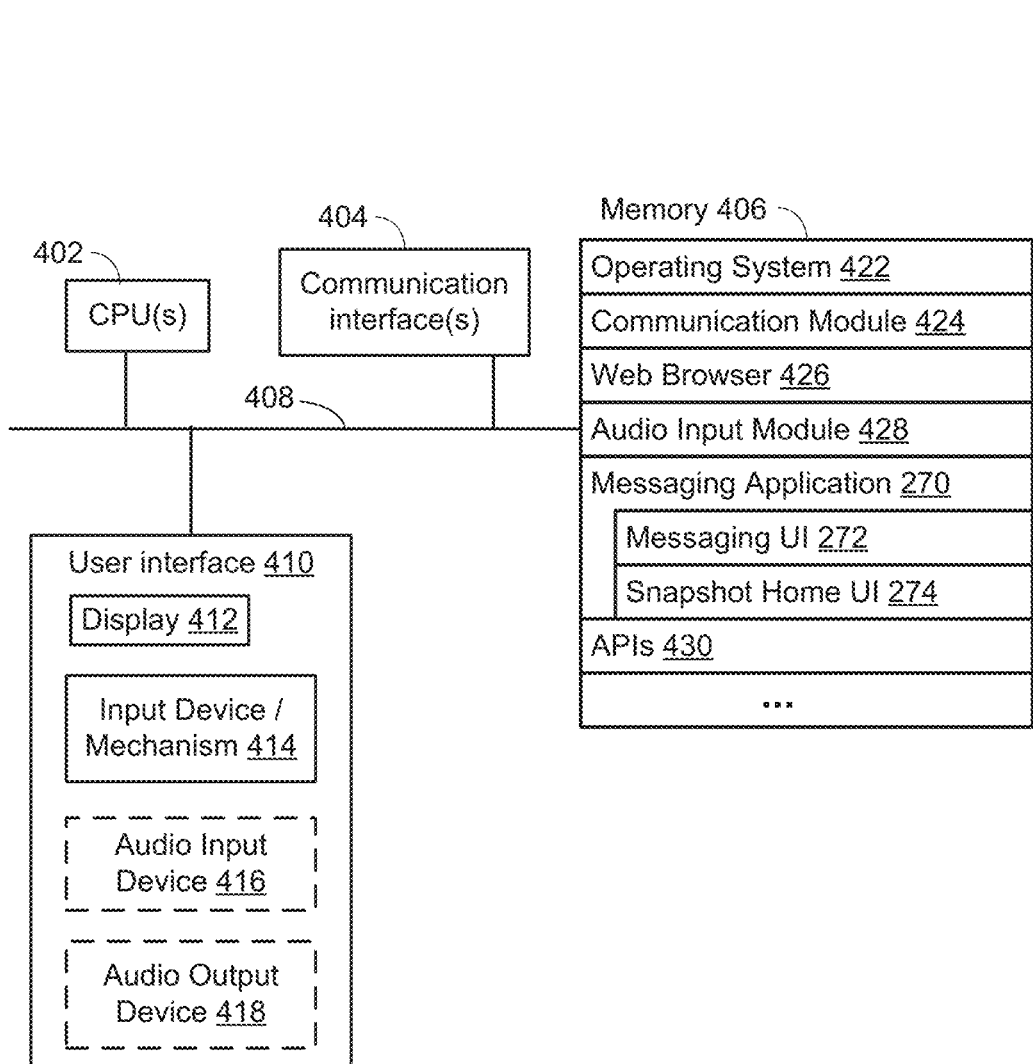
FIG. 4 is a block diagram illustrating an electronic device, in accordance with some implementations.

FIG. 4 is a block diagram illustrating an electronic device 400, in accordance with some implementations. In some implementations, the electronic device 400 is also known as a computing device. Various examples of the electronic device 400 include a desktop computer, a laptop computer, a tablet computer, a display assistant device, a mobile phone, a voice assistant device, or other computing device with a display and a processor capable of running a messaging application 270.

The electronic device 400 typically includes one or more processing units/cores (CPUs) 402 for executing modules, programs, and/or instructions stored in the memory 406 and thereby performing processing operations, one or more network or other communications interfaces 404, memory 406, and one or more communication buses 408 for interconnecting these components. The communication buses 408 may include circuitry that interconnects and controls communications between system components.

In some implementations, the electronic device 400 includes a user interface 410 comprising a display 412 and one or more input devices or mechanisms 414. In some implementations, the input device/mechanism includes a keyboard. In some implementations, the input device/mechanism includes a "soft" keyboard, which is displayed as needed on the display 412, enabling a user to "press keys" that appear on the display 412. In some implementations, the display 412 and input device/mechanism 414 comprise a touch screen display (also called a touch sensitive display). In some implementations, the display is an integrated part of the electronic device 400. In some implementations, the display is a separate display device.

In some implementations, the memory 406 includes high-speed random-access memory, such as DRAM, SRAM, DDR RAM or other random-access solid-state memory devices. In some implementations, the memory 406 includes non-volatile memory, such as one or more magnetic disk storage devices, optical disk storage devices, flash memory devices, or other non-volatile solid-state storage devices. In some implementations, the memory 406 includes one or more storage devices remotely located from the CPUs 402. The memory 406, or alternatively the non-volatile memory devices within the memory 406, comprises a non-transitory computer readable storage medium. In some implementations, the memory 406, or the computer readable storage medium of the memory 406, stores the following programs, modules, and data structures, or a subset thereof:

- an operating system 422, which includes procedures for handling various basic system services and for performing hardware dependent tasks;
- a communication module 424, which is used for connecting the electronic device 400 to other computers and devices via the one or more communication network interfaces 404 (wired or wireless) and one or more communication networks, such as the Internet, other wide area networks, local area networks, metropolitan area networks, and so on;
- a web browser 426 (or other client application), which enables a user to communicate over a network with remote computers or devices;
- an audio input module 428 (e.g., a microphone module) for processing audio captured by the audio input device 416. The captured audio may be sent to a remote server and/or processed by an application executing on the electronic device 400 (e.g., messaging application 270);
- a messaging application 270 for communicating with other users via direct messaging, file sharing, snapshot sharing, live streaming, and/or participation in chat rooms (e.g., channels) organized by topics and/or groups). In some implementations, the messaging application 270 executes as a standalone application (e.g., as an application designed to run on the electronic device 400 or on other mobile devices). In some implementations, the messaging application 270 executes within the web browser 226 or another application using web pages provided by a web server. In some implementations, the messaging application 270 includes a messaging user interface 272. In some implementations, the messaging application 270 includes a snapshot home user interface 274; and
- APIs 430 for receiving API calls from one or more applications (e.g., web browser 222 and messaging application 270), translating the API calls into appropriate actions, and performing one or more actions.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 406 stores a subset of the modules and data structures identified above. In some implementations, the memory 406 stores additional modules or data structures not described above. In some implementations, some of the modules or applications described in FIG. 4 can be implemented on other devices and/or systems, such as computing device 200 or collaboration platform server 500.

Although FIG. 4 shows an electronic device 400, FIG. 4 is intended more as a functional description of the various features that may be present rather than as a structural schematic of the implementations described herein. In practice, and as recognized by those of ordinary skill in the art, items shown separately could be combined and some items could be separated.

FIG. 4 is a block diagram illustrating an example collaboration platform server 500, in accordance with some implementations.

The server 500 typically includes one or more processing units (processors or cores, CPUs) 502, one or more network or other communication interfaces 504, memory 514, and one or more communication buses 512 for interconnecting these components (sometimes called a chipset). The server 500 may optionally include a user interface 506. The user interface 506 may include a display 508 and one or more input devices 510 such as a keyboard, mouse, and/or other input buttons.

The memory 514 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 514 optionally includes one or more storage devices remotely located from one or more processing units. The memory 314, or alternatively the non-volatile memory within the memory 514, includes a non-transitory computer readable storage medium. In some implementations, the memory 514, or the non-transitory computer readable storage medium of the memory 514, stores the following programs, modules, and data structures, or a subset or superset thereof:

- operating system 516 including procedures for handling various basic system services and for performing hardware dependent tasks;
- network communication module 518 for connecting the server 500 to other devices and systems (e.g., computing device 200, data visualization server 300, and electronic device 400) via one or more network interfaces 504 (wired or wireless) and the communication network 132, such as the Internet, other wide area networks, local area networks, metropolitan area networks, and so on;

APIs 520 for receiving API calls, translating the API calls into appropriate actions, and performing one or more actions;

messaging interfaces 522 for communications (e.g., interactions or events) between the server 500 and messaging services;

a snapshot home web interface 524, which has the same functionality the snapshot home user interface 272, but provides the flexibility of access from any device at any location with network connectivity, and does not require installation and maintenance; and a conversations store 530, for storing interaction states and data between the collaboration platform server 500 and the messaging services. In some implementations, the data is grouped by user identifiers (e.g., user accounts) of the messaging application, and within each user identifier, the data is further organized by interaction states, 534, snapshots 536 (e.g., a first snapshot 536-1-1 corresponding to a first user identifier 532-1, and a second snapshot 536-2-2 corresponding to a second user identifier 532-2), and user queries 538. In some implementations, a respective 536 further includes: identification of one or more snapshot components of the respective snapshot, which can in turn be traced back to the data source(s), data field(s) in the data source(s), and data value(s) of the data field(s).

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 514 stores a subset of the modules and data structures identified above. In some implementations, the memory 514 stores additional modules or data structures not described above.

Figure 5:
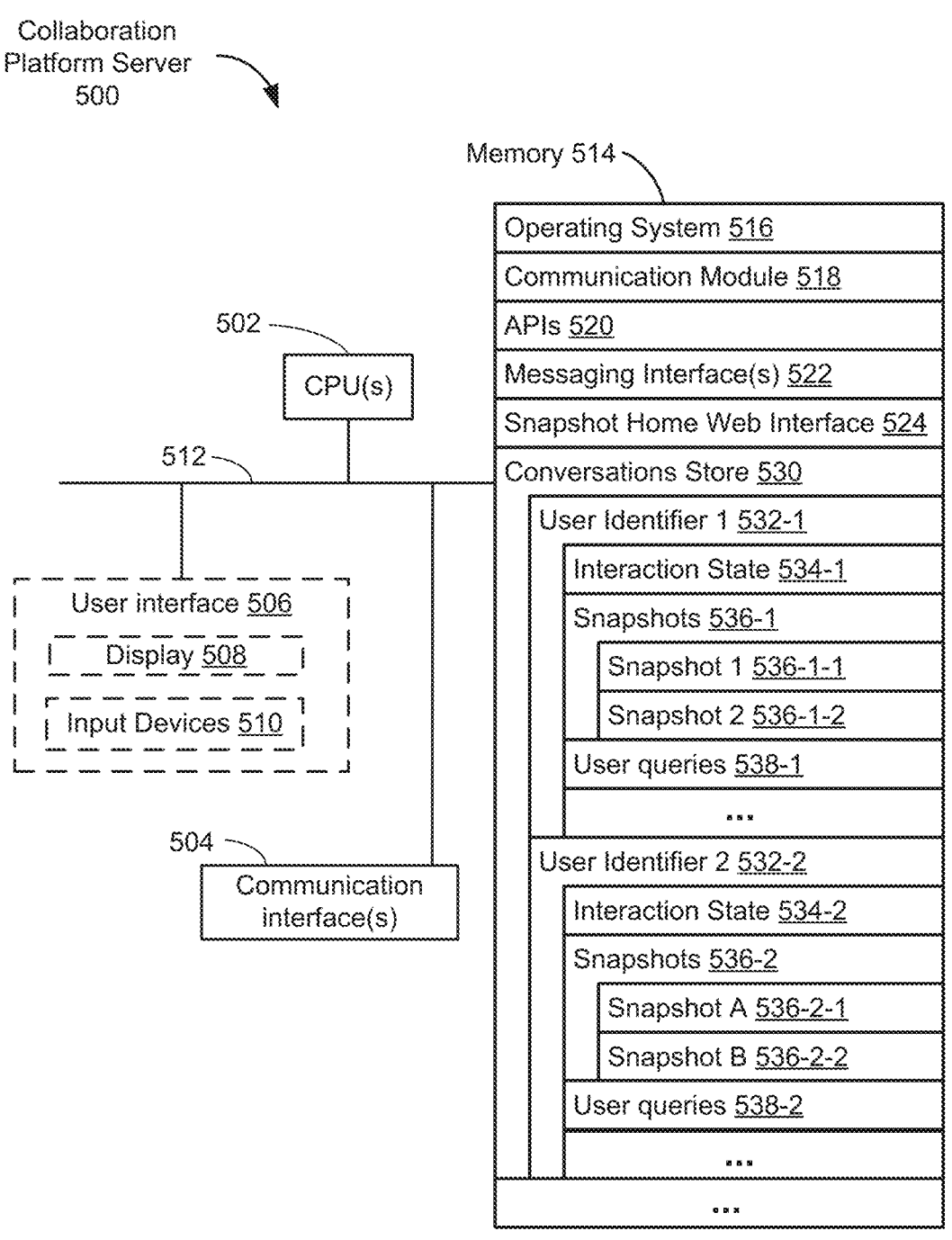
FIG. 5 a block diagram illustrating a collaboration platform server, in accordance with some implementations.

Although FIG. 5 shows a server system 500, FIG. 5 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 500 may be stored or executed on a computing device 200, or an electronic device 400, or a data visualization server 300. In some implementations, the functionality and/or data may be allocated between a computing device 200, an electronic device 400, and one or more servers 500. Furthermore, one of skill in the art recognizes that FIG. 5 need not represent a single physical device. In some implementations, the server functionality is allocated across multiple physical devices that comprise a server system. As used herein, references to a "server" or "collaboration platform server" include various groups, collections, or arrays of servers that provide the described functionality, and the physical servers need not be physically collocated (e.g., the individual physical devices could be spread throughout the United States or throughout the world).

C. Philo Interfaces

Component Creator

Figure 6A:
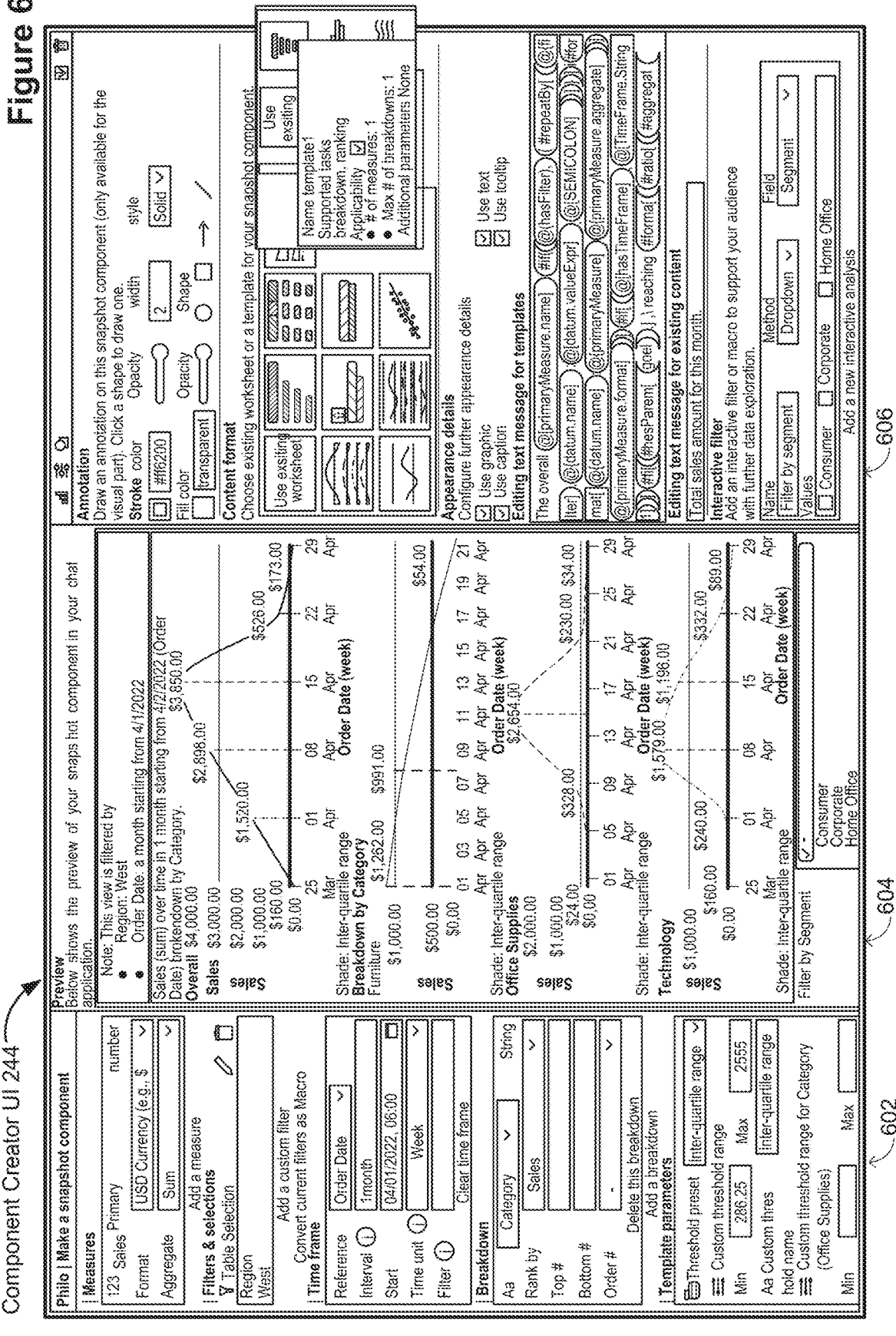

FIG. 6A illustrates a component creator user interface 244, in accordance with some implementations. According to some implementations of the present disclosure, the component creator user interface 244 enables snapshot authors to specify the scope and format of the selected dashboard content that will appear in a snapshot component.

Figure 6C:
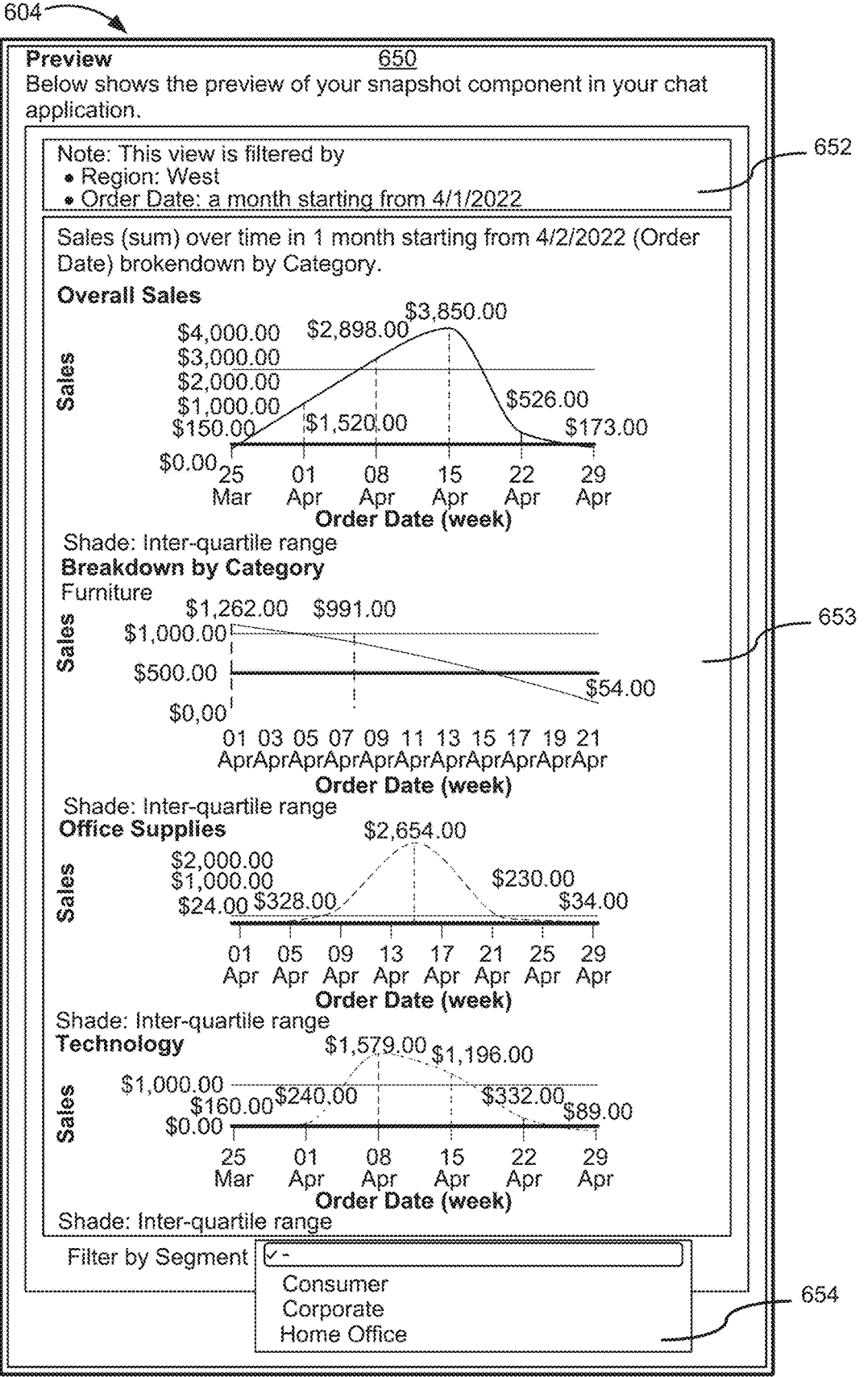

In some implementations, the component creator user interface 244 includes a data column 602, a preview column 604, and a content column 606. FIGS. 6B to 6D are higher-magnification views of the data column 602, the preview column 604, and the content column 606, respectively. Some of the controls in the component creator user interface 244 and their associated concepts are inherited from business intelligence dashboard applications, including quantitative measures, filters, and breakdowns by categorical dimension, rank, or discretized bin. Other controls are novel to this interface, including those associated with template-based transformations and time frames.

Figure 7A:
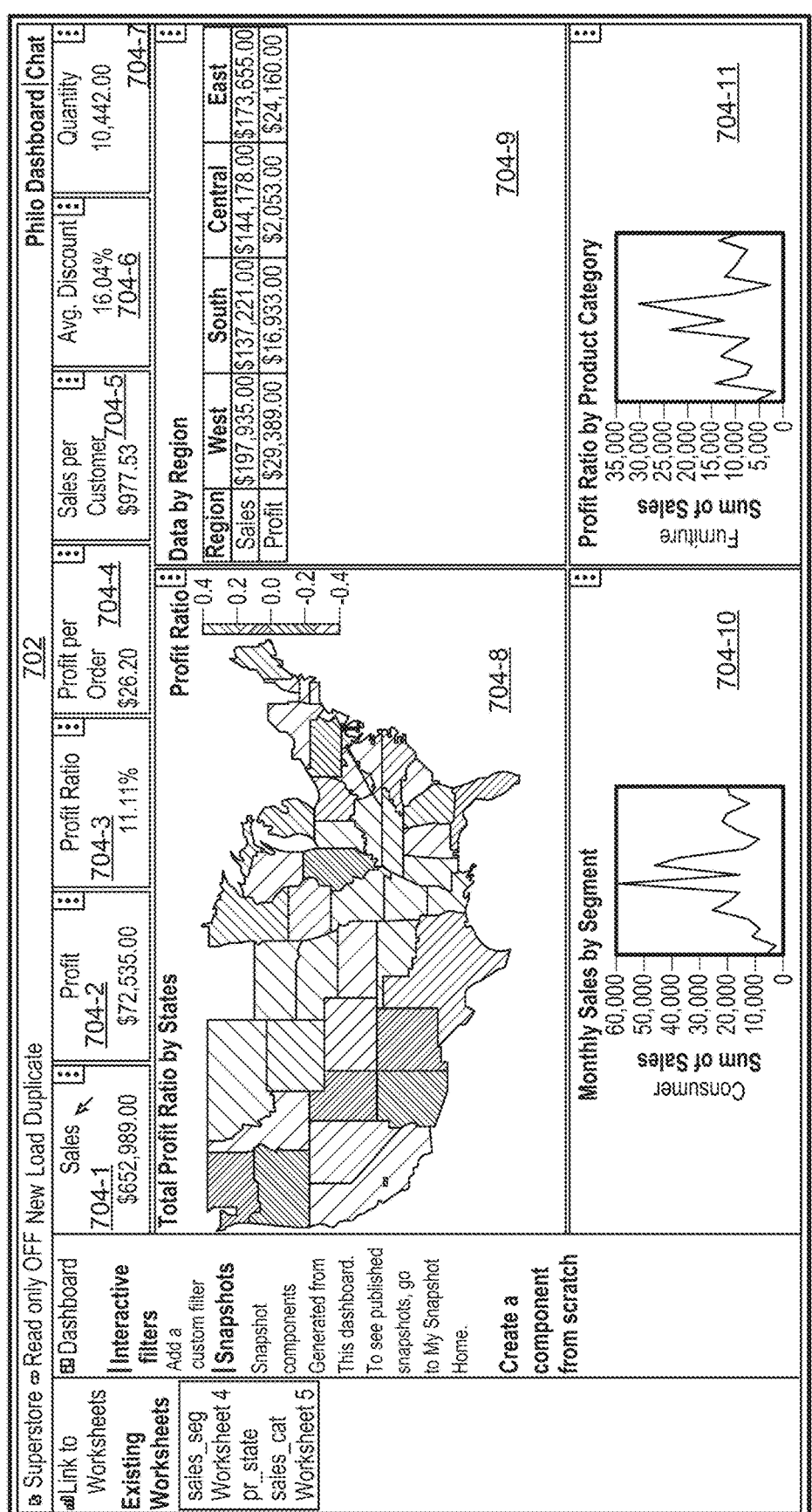
FIGS. 7A to 7C show a dashboard user interface, in accordance with some implementations.
Figure 7B:
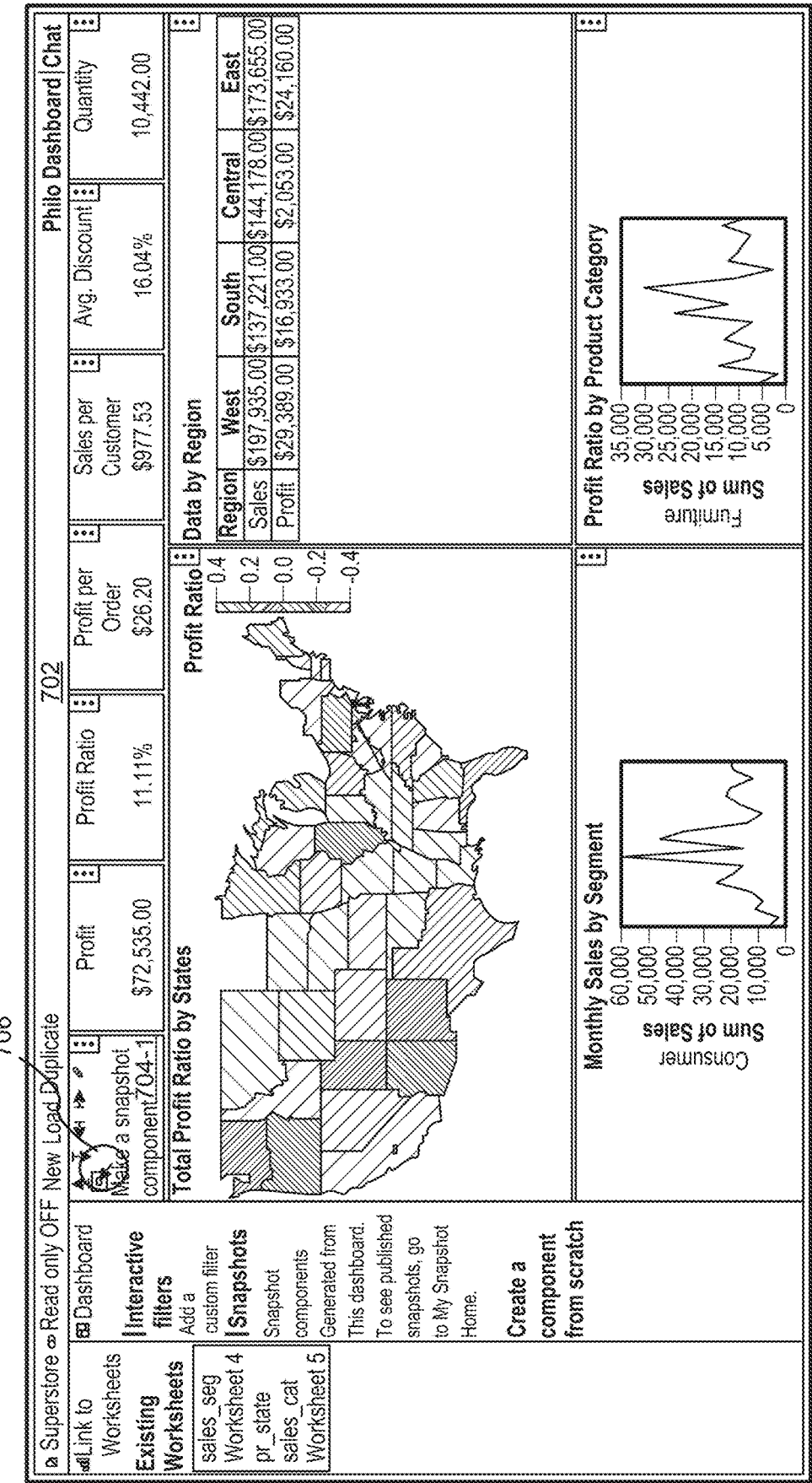

In some implementations, a computing device (e.g., computing device 200) displays the component creator user interface 244 in accordance with (e.g., in response to) user selection of a data element from a data dashboard. This is illustrated in FIGS. 7A and 7B. FIG. 7A shows a data dashboard 702 that is displayed (e.g., as a tab) in a dashboard user interface 232 of a computing device. A data dashboard can include one or more data visualizations. For example, the data dashboard 702 in FIG. 7A includes data visualization 704-1 to 704-10. In FIG. 7B, a user selects a data element 704-1 in the data dashboard 702 (e.g., the measure data field "Sales", or a data value (e.g., "$652,989.00") corresponding to a measure data field "Sales", or a data visualization 704-1), and selects an affordance 706 (e.g., user-selectable icon) designating the data element "Sales" as a snapshot component of a data snapshot.

In some implementations, a data element can be one or more data cells of a data dashboard. In some implementations, a data element can be one or more data values of a data field from a data dashboard. In some implementations, a data element can be one or more data marks of a data visualization in a data dashboard. In some implementations, a data element can be one or more data visualizations from a data dashboard.

Referring to FIG. 6B, in some implementations, the data column 602 includes a measures panel 612, a filters panel 614 (e.g., filters and selections panel) (e.g., static filters), a time frame panel 616, a breakdown panel 618, and a template parameters panel 620. The measures panel 612 includes measure data field(s) 622 (e.g., quantitative data fields). In some implementations, the measure data field(s) 622 are metrics for a snapshot component and are linked to data source(s). In some implementations, the measures panel 612 includes a number format 624 (e.g., currency or percent) corresponding to the measure data field 622 and an aggregate method 626 (e.g., sum or average) that is applied to data values of the measure data field 622.

In some implementations, Philo retrieves an initial configuration that includes data values, measure data fields, filters, and/or breakdowns (e.g., categorial data fields that break down data values of a measure data fields) from the data dashboard and propagates the initial configuration onto the measures panel 612, the filters panel 614, and the breakdown panel 616 of the component creator user interface 244. Referring back to the example of FIG. 7B, in which a user selected the metric "Sales" (e.g., a measure data field) (e.g., a data element 704-1) from the data dashboard 702, FIG. 6B illustrates that shows that in accordance with the user selection of the metric, the component creator user interface 244 pre-populates the measures panel 612 with the measure data field "Sales," and identifies a format 624 (e.g., USD currency) and an aggregation type (e.g., Sum) corresponding to "Sales." In situations where a user does not wish to be bound by the content as it appears in a source dashboard, the user can modify the pre-populated fields on the component creator user interface 244 as needed without altering the source dashboard. Thus, the disclosed system and user interfaces makes the user-device operation more efficient by pre-populating dashboard selections on the component creator user interface 244 while concurrently supporting flexible authoring (DG2).

FIG. 6B illustrates that, in some implementations, the data column 602 includes an affordance 613 (e.g., a user-selectable icon) (e.g., a "Add a measure" affordance) that, when selected by a user, enables the user to add one or more measure data fields and create one or more snapshot components based on the added measure data fields (e.g., without having to select the measure data fields from a data dashboard). Continuing with the example of the measure data field "Sales" (e. g., and its corresponding data value) from the previous paragraph, suppose that a user wants to compare "Sales" and "Profit" values. In this scenario, the user can either go back to the data dashboard 702 in FIG. 7A to select data element 704-2, corresponding to the measure data field "Profit" (e.g., and its corresponding data value), or the user can select the affordance 613 to add the measure data field "Profit" and generate a comparison using a suitable template.

In some implementations, Philo also loads filters from the original dashboard onto the filters and selections 614 panel. A user can convert a set of filters as a macro-type interactive filter.

FIG. 6B also illustrates that, in some implementations, the data column 602 includes a time frame panel 616 that reflects the temporality of a component. The time frame panel 616 includes an option to specify a time dimension data field 628 (e.g., a reference data field such as "Order Date") of a component with optional attributes such as a semantic time interval filter 630 with a start date 632 (e.g., 1 week from May 1), a time unit 634 (e.g., monthly, weekly, or daily), and a periodicity filter 636 (e.g., every Monday). The input fields specified by the time frame panel 616 determine both the behavior of snapshot updates (DG 3: post-sharing life cycle and DG3c: automate updates) as well as precise temporal filtering (DG1b: temporal scope). In some implementations, when a filter or a time frame is applied to a snapshot component (e.g., via specification of the fields 628, 630, 632, 634, or 636), a filter note 652 appears above the main content in the preview column 604, as illustrated in FIG. 6C.

In some implementations, the component creator user interface 244 includes a breakdown panel 618 that enables a user to specify one or more breakdown fields 638 (e.g., a categorial data field, a dimension data field. or nominal and ordinal fields). Each breakdown field 638 allows for disaggregating measures with sorting. For example, a user can specify a measure data field as a ranking field 640, a number of top items 641, a number of bottom items 642, and ordering 643 (e.g., a sorting order, such as a descending or an ascending order).

FIG. 6B illustrates that, in some implementations, the data column 602 includes an affordance 645 (e.g., a user-selectable icon) (e.g., a "Add a breakdown" affordance) that, when selected by a user, enables the user to add one or more dimension data fields and create one or more snapshot components based on the added dimension data fields (e.g., without having to select the dimension data fields from a data dashboard). For an example of the dimension data field "Category" (e. g., and its corresponding disaggregation), suppose that a user wants to add another breakdown "Region". In this scenario, the user can either go back to the data dashboard 702 in FIG. 7A to select data element 704-9, corresponding to the dimension data field "Region" (e.g., and its corresponding disaggregation), or the user can select the affordance 645 to add the dimension data field "Region" and generate a comparison using a suitable template.

In some implementations, the data column 603 includes an affordance 644 (e.g., a user-selectable icon) (e.g., a "Delete this breakdown" affordance) that, when selected by a user, enables the user to delete a corresponding dimension data field and create one or more snapshot components based on the removed dimension data fields (e.g., without having to move back to a data dashboard). Continuing with the example of the dimension data field "Category" (e. g., and its corresponding disaggregation) and the measure data field "Sales" (e.g., and its corresponding data values) from the previous paragraphs, suppose that a user wants to aggregate "Sales" values to a single value. In this scenario, the user can select the affordance 644 to remove the dimension data field "Category."

In some implementations, the data column 602 also includes a template parameters field panel 620, which enables a snapshot author to set parameter values, such as a threshold preset value, and a minimum and/or maximum value for a threshold range, as required by template-based components, as will be described in further detail below. Parameter values are values that do not appear in the original dashboard selection. In some implementations, for template-based components, a user can elect to rank disaggregated items in terms of the sorting order and the number of top and bottom items.

FIG. 6C illustrates a view of the preview column 604, in accordance with some implementations. In some implementations, the preview column 604 renders a preview 650 (e.g., a view) of a snapshot component. In some implementations, the snapshot component can include a filter note 652, main content 653, and interactive filter(s) 654.

FIG. 6D shows a view of the content column 606, in accordance with some implementations. In the content column, an author can annotate (672) and format (674) the snapshot component, optionally apply a template transformation (e.g., via selection of template icons 676), edit captions (678, 680, and 682), and add interactive filters (684).

In some implementations, with respect to annotation (672), an author can free-draw (e.g., on the preview 650 of the snapshot component) to visually emphasize content or indicate a viewing order. The ability to annotate on a snapshot improves user communication about data and guides a viewer to portions of a component that requires the viewer's attention.

In some implementations, a user can opt to retain the existing appearance of the dashboard selection or apply a template-based transformation (674 and 676) (DG2c: design preservation, DG2b: design transformation). Philo suggests templates using heuristic-based applicability, considering the number of measures and dimensions associated with a dashboard selection (see, discussion below, and FIGS. 15A to 15L). As described above, some templates require authors to specify parameter values in the template parameters 620 input field. For component captions, an author can edit the provided text expression associated with a template (680) or add their own text (682). A user can add one or more interactive filters (684) that will allow their viewers to answer simple predefined questions (DG1d: interactivity for predictable questions); any filters added are appended below the main component content (e.g., as interactive filter(s) 654), as illustrated in FIG. 6C.

Figure 7C:
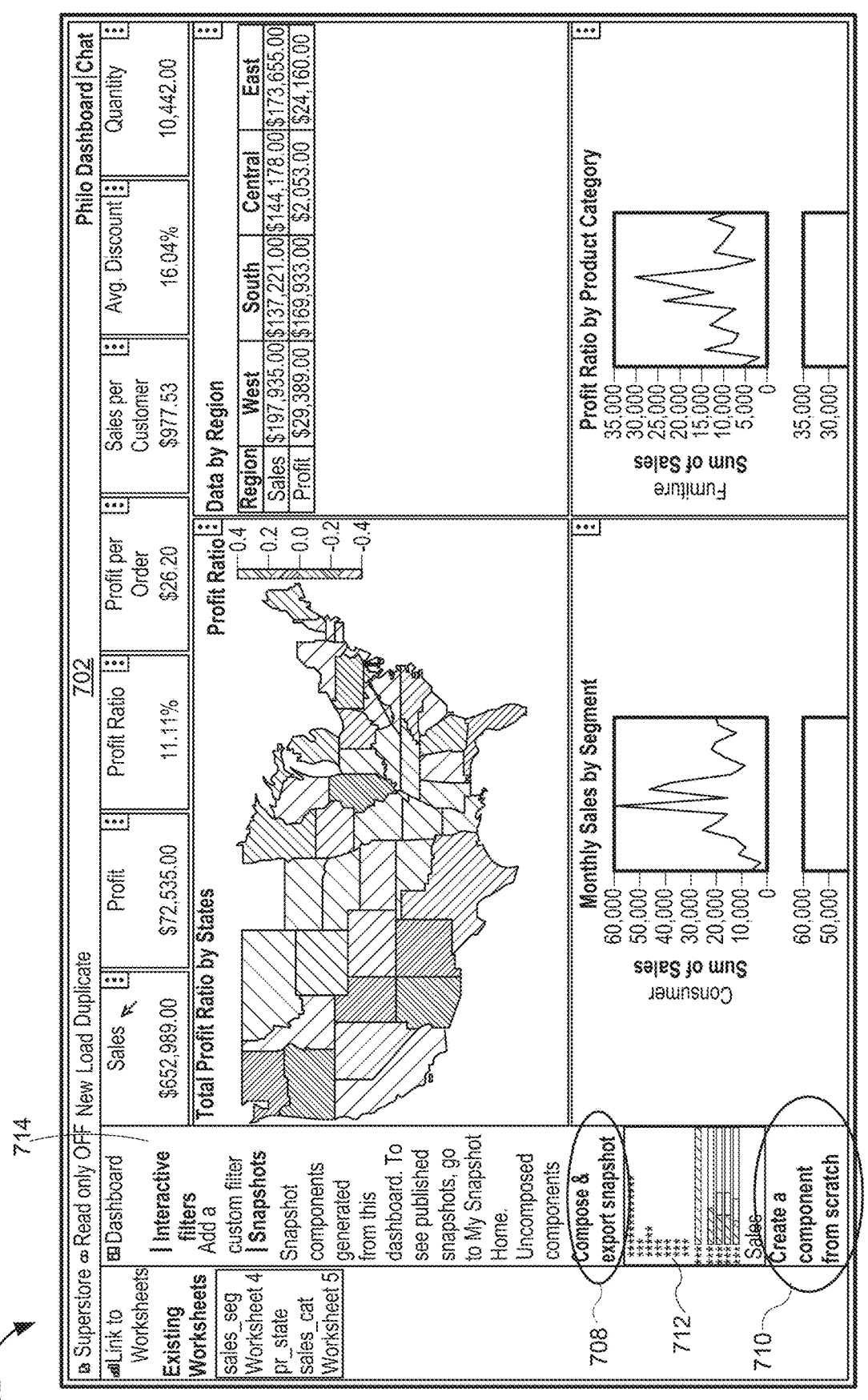

In some implementations, the snapshot creator user interface 244 includes an option 686 to save a component. In some implementations, when a component is saved, the dashboard user interface 244 displays a representation 712 of the component (e.g., in a filters and snapshots panel 714) of the dashboard user interface 244, as illustrated in FIG. 7C.

In some implementations, the snapshot creator user interface 244 includes an option 688 to delete a component.

Snapshot Composer

Figure 8:
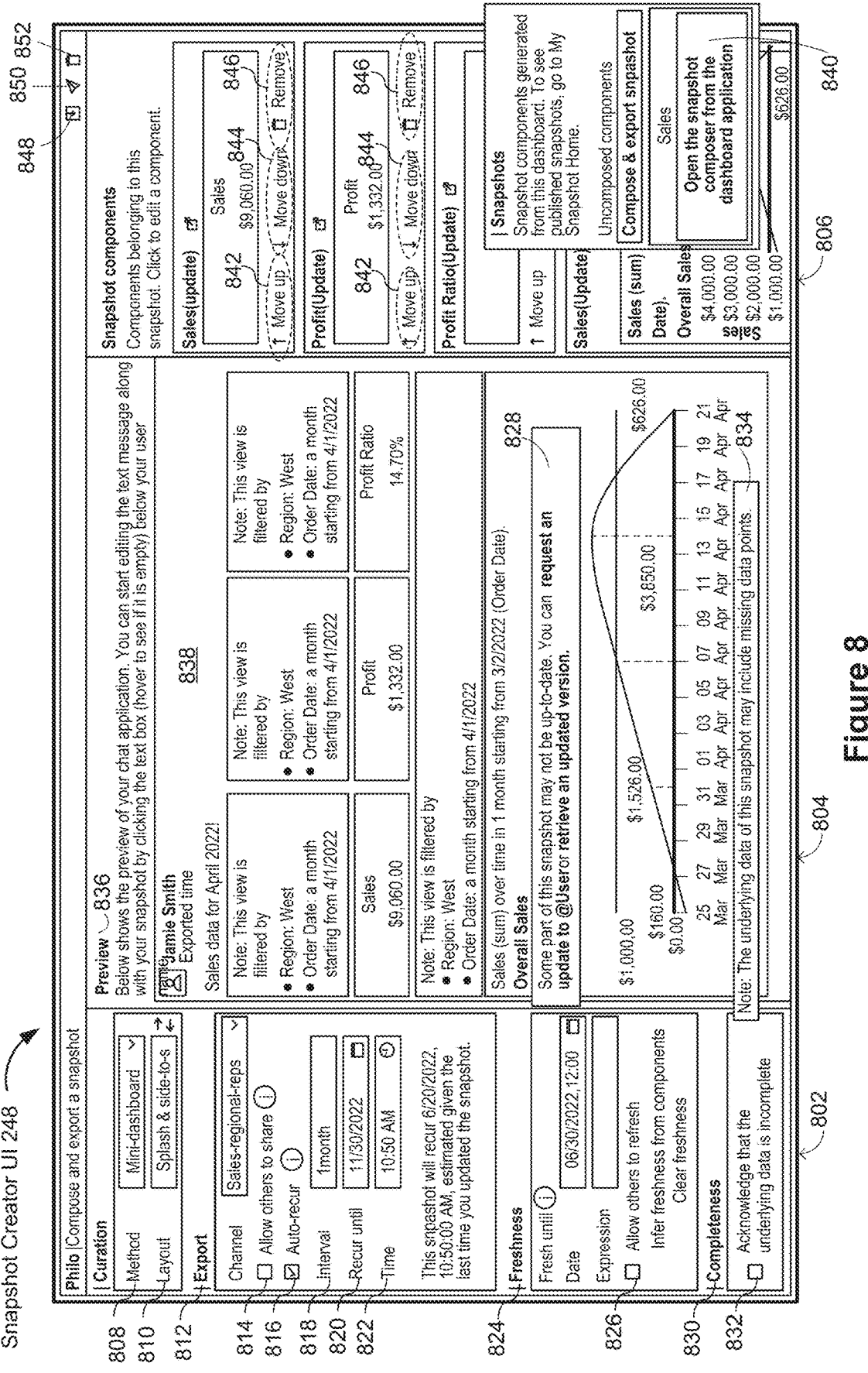
FIG. 8 illustrates a snapshot creator user interface, in accordance with some implementations.

FIG. 8 illustrates a snapshot creator user interface 248 (e.g., snapshot composer), in accordance with some implementations.

In some implementations, to combine multiple snapshot components into a single snapshot, a snapshot author can invoke Philo's snapshot composer from the dashboard user interface 232 (e.g., the data visualization application 230). For example, FIG. 7C illustrates that, in some implementations the dashboard user interface 232 includes an affordance 708 (e.g., a user-selectable icon) that, when selected by a user, enables a user to export a snapshot. User selection of the affordance 708 causes the computing device 200 to display the snapshot creator user interface 248. FIG. 7C illustrates that, in some implementations the dashboard user interface 232 includes an affordance 710 (e.g., a user-selectable icon) that, when selected by a user, enables a user to create a snapshot component from scratch. In some implementations, user selection of the affordance 710 followed by selection of a data element on the data dashboard causes the dashboard to display an option to make a snapshot component of the selected data element.

In addition to enabling multi-component snapshots (DG2d), the snapshot composer accommodates selections across multiple dashboards (DG2a).

In some implementations, the snapshot creator user interface 248 includes a settings column 802, a preview column 804, and a component column 806.

The settings column 802 enables an author to select a curation method 808 (e.g., curation option) and/or a layout type 810. In some implementations, the curation method 810 is one of: a single view, a vertical stack (e.g., a vertical view stack), an interactive carousel, an automated slide show, a mini-dashboard, or a GIF animation. FIG. 9A to 9D illustrate, respectively, an exemplary vertical stack curation method, an exemplary carousel curation method, an exemplary mini-dashboard curation method, and an exemplary automated slideshow curation method, in accordance with some implementations. For each of the curation methods, it is possible adjust the placement or order of the components in the component column 806 (e.g., by dragging and/or arranging the snapshot components in a preferred order.

The export panel 812 enables an author to select a collaboration platform channel on which to post their snapshot. The author can also elect to give viewers the ability to re-share the snapshot to other channels (e.g., by checking the box 814) as well as control whether the snapshot will automatically recur (e.g., by checking the box 816) according to a specified time interval 818 (e.g., a recurrence frequency, such as a month, a week, or every 20 days), a recurrence expiration date 820, and a time of day 822 at which a recurrence of the snapshot will be displayed on the collaboration platform channel (DG3: automated update).

In some implementations, a snapshot author can author dashboard snapshots directly from collaboration platforms. For example, instead of setting the channel to export a snapshot to (e.g., via export panel 812), in some implementations, a snapshot author can copy the URL of a snapshot and paste it in into a draft channel, which may prompt in-situ authoring options presented within a collaboration platform, leveraging tools such as Microsoft Teams' Graph Toolkit or Slack's Block Kit. To this end, a collaboration platform can further integrate Philo's component creator user interface 244 and snapshot creator user interface 248 as embedded applications invoked from within a channel.

The freshness panel 824 enable an author to specify a "fresh-until" (e.g., "best before," expiration period, validity period) for a snapshot (DG3a: past snapshots). Philo can also infer the freshness date from the time frames of its components. In some implementations, by checking a box 826, an author can allow viewers of the snapshot to retrieve or request an updated snapshot when a snapshot becomes stale. For a stale snapshot, Philo will prepend a freshness indicator 828 (e.g., a textbox) in the snapshot. In some implementations, as illustrated in FIG. 8, the freshness indicator 8218 informs an audience that parts of a snapshot may not up to date. In some implementations, the freshness indicator 828 indicates a recurrence schedule and, if enabled (e.g., when the box 826 is selected by the author), presents an option for viewers to retrieve or request an updated snapshot. When viewed as a whole, the freshness indicator 828 improves user trust in the data (e.g., by informing viewers about the validity or timeliness of the data) and minimizes the odds of miscommunication with viewers.

Furthermore, the alternative snapshot update options, such as an option that allows others to share a snapshot (e.g., option 814), an auto-recurrence option (e.g., option 816 (e.g., auto-recurrence), and an option that allows others to refresh a snapshot (e.g., option 826) ensures author agency, supports data conversation, and minimize the odds of miscommunication between an author and their viewers. For example, in some instances, an auto-recurrence feature may be useful where there are goals for certain key performance indicators (KPIs), such as a monthly sales target, that is tracked on a regular basis (e.g., monthly). In this example, setting an auto-recurrence feature for a sales snapshot to be generated and distributed every month will be useful as the audience may like to see how the sales figure is moving along. In another example, an auto-recurrence feature may be useful in brief emergency situations such as cloud service outages and logistical mishaps, whereupon snapshots would need to be updated in short order (e.g., every 5 minutes. In this instance, it may be useful to enable the option 826 that allows viewers to refresh a snapshot; this way the viewers can obtain updated information on their own without having to rely on the author for updates. In some instances, some snapshots require a series of checkups before publishing an update (e.g., they have a large audience or an important executive audience), so authors should retain control over updates (e.g., by de-selecting the option 826 that would allow others to refresh, or de-selecting the option 814 that would allow others to share) to prevent any miscommunication.

In some implementations, the snapshot creator user interface 248 displays a completeness panel 830 that includes an option 832 (e.g., a check box). User selection of the option 832 causes the snapshot to be displayed with an indicator

834 (e.g., a textbox) indicating that the underlying snapshot has data that may be missing and/or incomplete. The presence of the indicator 834 improves communication with viewers by alerting the viewers to the presence of missing data. This in turn leads to improved user trust in the data because the majority of users do not typically spend their time looking for missing data.

In some implementations, the preview column 804 includes a preview panel 836 that displays a rendering 838 of a snapshot, simulating a collaboration platform interface.

In some implementations, in the component column 806, an author can change an order of a respective component (e.g., by selecting a respective "move up" button 842 or a respective "move down" button 844 adjacent to the respective component). In some implementations, in the component column 806, an author can remove a respective component (e.g., by selecting a respective "remove" button 846 adjacent to the respective component). In some implementations, an author also can elect (840) to edit a component in the component creator (e.g., component creator user interface 244).

In some implementations, the snapshot creator user interface 248 includes one or more options (e.g., buttons, affordances, or selectable icons) for an author to save (848), export (850), or delete (852) a snapshot.

In some implementations, the snapshot creator user interface 248 can be invoked from a dashboard user interface (e.g., dashboard user interface 232) (e.g., via user selection of affordance 708).

My Snapshot Home

FIG. 10 illustrates a snapshot home user interface 274 (e.g., a telemetry monitoring interface), in accordance with some implementations.

In accordance with some implementations of the present disclosure, the collaboration platform interface emulates the essential functionality of platforms like Slack™ and Microsoft Team™, meaning that a snapshot can be posted and shared across multiple channels, generate comment threads, and receive emoji-based reactions. These interactions can provide a snapshot author with an impression of the impact of a snapshot after it has been shared.

In some implementations, the snapshot home user interface 274 is a dedicated channel within a collaboration platform that collects an author's dashboard snapshot(s) (1002) and the associated telemetry information (1004) for each of the snapshot(s), thereby relieving authors of the need to search for snapshots and estimate a snapshot's visibility and impact across a platform (DG3b: telemetry).

In some implementations, the snapshot home user interface 274 is part of a messaging application (e.g., messaging application 270) that is associated with a collaboration platform server 500. In some implementations, the collaboration platform server 500 dynamically collects (e.g., in real time, automatically and without user intervention), for each snapshot composed by a snapshot author, the corresponding telemetry information and presents it (e.g., in real time or near real time) on the author's snapshot home user interface 274.

In some implementations, the snapshot home user interface 274 is part of a data visualization application (e.g., data visualization application 230) that is associated with a data visualization server 300. For example, the dashboard user interface 232 can include one or more tabs that each corresponds to a respective data dashboard, and the snapshot home user interface can be implemented as a separate tab in the dashboard user interface 232. In some implementations, the data visualization server 300 dynamically collects (e.g., gathers) (e.g., in real time, automatically and without user intervention), from the collaboration platform server 500, telemetry information associated with each snapshot composed by a snapshot author, and presents it (e.g., in real time or near real time) on the author's snapshot home user interface 274 that is part of the data visualization application.

In some implementations, the snapshot home user interface 274 indicates, for each snapshot, which channel(s) the respective snapshot was shared to, a unique number of views (1006), comments (1008), reaction counts (1010), and interactive views (1012), and identification of viewers (1014) who interacted with the snapshot, with more details provided in hover tooltips (B1, B2). As used herein, an interactive view occurs when a snapshot includes interactive filter(s) 654 that a viewer interacts with (e.g., while viewing the snapshot). In some implementations, the snapshot home user interface 274 also lists any comments that a snapshot received.

In some implementations, the snapshot home user interface 274 indicates, for each snapshot, whether interactive filter(s) have been used.

In some implementations, the snapshot home user interface 274 indicates, for each snapshot, general metadata properties such as a name (e.g., an identifier) of the snapshot, an owner of the snapshot, a date that the snapshot was initially published (or date(s) that the snapshot was re-published), and metadata information of originating (e.g., original) dashboard(s) corresponding to the component(s) of the snapshot.

In some implementations, if a snapshot is indicated to be stale, the snapshot home user interface 274 lists update requests and retrievals (B3), as well as the ability to re-post an updated snapshot directly without returning to Philo's snapshot composer (e.g., snapshot creator user interface 248).

D. Formalization

The inventors took a systematic approach to designing Philo, formalizing how snapshots, snapshot components, and templates are constructed and related, considering how each might be extensible or inter-operable with existing dashboard applications and collaboration platforms.

Snapshot Specification

Figure 11C:
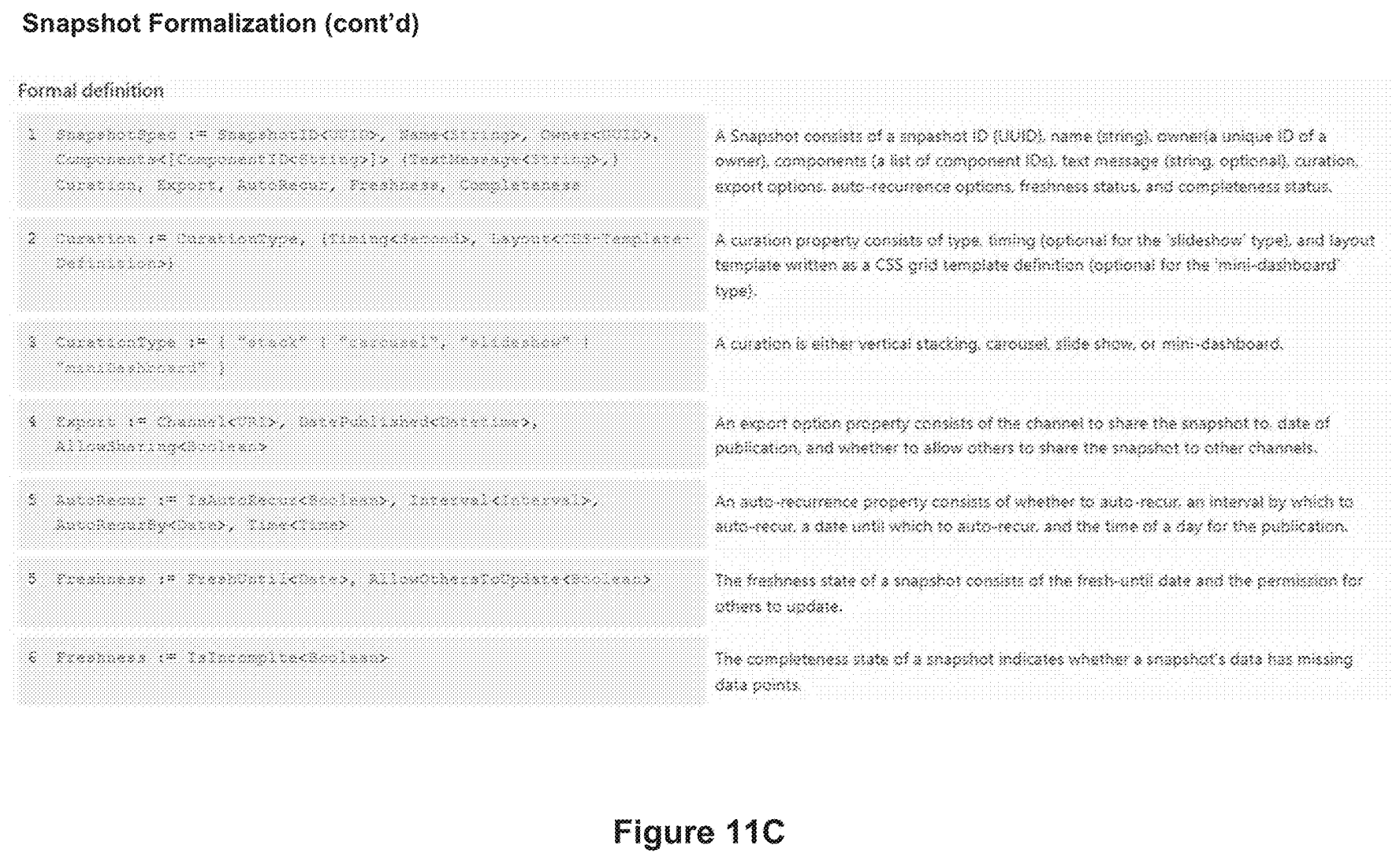

FIGS. 11A to 11C collectively provide a formalization for dashboard snapshots, in accordance with some implementations. A dashboard snapshot consists of one or more components in a certain curation method.

A snapshot (or a dashboard snapshot) is formally declared as a tuple of metadata, components, text message, curation, export, auto-recur, freshness, and completeness (see FIGS. 11A, 11B, 11C, and 16). The metadata property includes the name, identifier (e.g., unique ID), and owner of a snapshot as well as a pointer to the actual chat message for this snapshot. Then, a snapshot needs a list of one or more components and an optional text message encompassing those components. The curation property specifies a curation method and details (e.g., slideshow timing, mini-dashboard layout). The export property contains the published date and time, the originally shared supplemental material channel, the permission to share, and additionally shared channels. The auto-recur property rules whether to auto-recur, the interval by which to retrieve an update, and the time in a day to publish the updated snapshot. Philo uses an interval expression consisting of length and unit (e.g., 1 month, 2 weeks, or 5 days). The freshness property includes the date (or an interval from the published date) until which a snapshot is fresh and the permission for non-owners to retrieve an updated version. The completeness indicates whether a snapshot's underlying data has missing data points.

Component Specification (or Snapshot Component Specification)

Figure 12C:
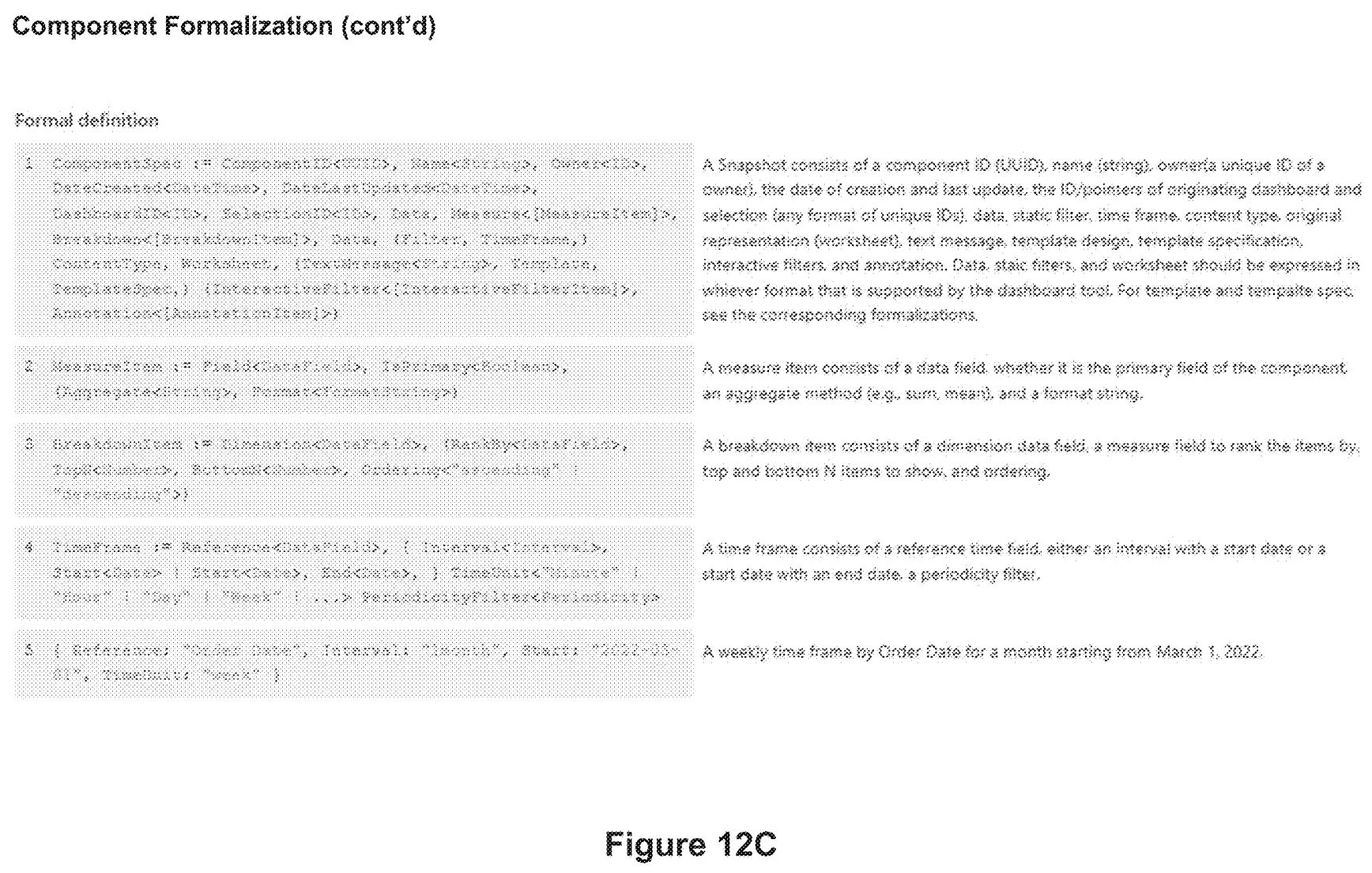

FIGS. 12A to 12D collectively provide a formalization for a snapshot component, in accordance with some implementations. A component is a building block for a dashboard snapshot.

A component (or a snapshot component) is formalized as a tuple of metadata, data, measures, time frame, breakdowns, filters, content type, worksheet, text message, template, template spec, annotations, and interactive filters (see FIGS. 12A, 12B, 12C, 12D, and 16). The metadata property includes the name, identifier, and pointers to the originating dashboard cell. The data property stores the entire data at the time of creation to enable interactive snapshots. Each measure item consists of a measure field, a formatting expression (e.g., $2 for U.S. Dollar), and an aggregation method.

The time frame property contains a reference time field (e.g., a temporal field), a time range, a time unit (e.g., week, month) and a periodicity filter. A time range can be specified using: (i) a start date or end date only, (ii) start and end dates, or (iii) a start date with an interval. A periodicity filter expresses time points to filter in within a time range, consisting of index and unit (e.g., 1-5 day for weekdays).

A breakdown item consists of a dimension data field, a measure data field to rank the items by (e.g., a ranking field), top and bottom N items (topN, bottomN), and ordering (e.g., a sorting order, such as a descending or an ascending order). For instance, a breakdown item with Category dimension and Sales measure sorts the Category items by their Sales values. If topN and bottomN are provided, then the specified number of top- and bottom-ranked items are shown. Each filter item represents a filter expression, such as a field and data values/ranges. Philo loads the data, measures, breakdowns, and filters from the original dashboard cell when a component is initially created.

The content type property defines whether to use the dashboard cell's content (worksheet) or a template. The worksheet property stores the design specification of the original dashboard cell. If the content type is worksheet, then this worksheet property and text message (a string) are rendered.

An annotation item is defined by a shape type (e.g., a circle, a square, an ellipse, or a rectangle), size, position, stroke (e.g., a color, a width, and/or an opacity), and fill (e.g., color and opacity).

An interactive filter includes name, type, and corresponding options. For an "Auto" filter type, a user only needs to specify a filtering data field. For a "dropdown" or "slider" filter type, a user can provide the selectable values or a limit range, respectively. For a "macro" filter type, the user should provide a filter expression written in a supported format. For example, when a viewer interacts with snapshot, the interaction is counted and reflected in the Snapshot Home user interface 274. The purpose is to help a snapshot author understand how their snapshots are used and how they can modify future snapshots to improve data communication with viewers.

Templates

FIGS. 13A and 13B collectively provide a formalization for a template (e.g., a template design), in accordance with some implementations.

Philo allows authors to apply design transformations to snapshot components via templates (DG 2: flexible and easy creation). At a high-level, a template design for a Philo component is defined by supported tasks (task keywords), reactive design (written in Svelte), applicability, text template, and parameter definitions (params) (see FIGS. 13B and 16).

FIG. 14A provides a formalization for a template specification, in accordance with some implementations.

A template specification is distinguished from a template design to ensure the reusability of templates: A component uses a template specification to feed data to a template design.

Figure 14B:
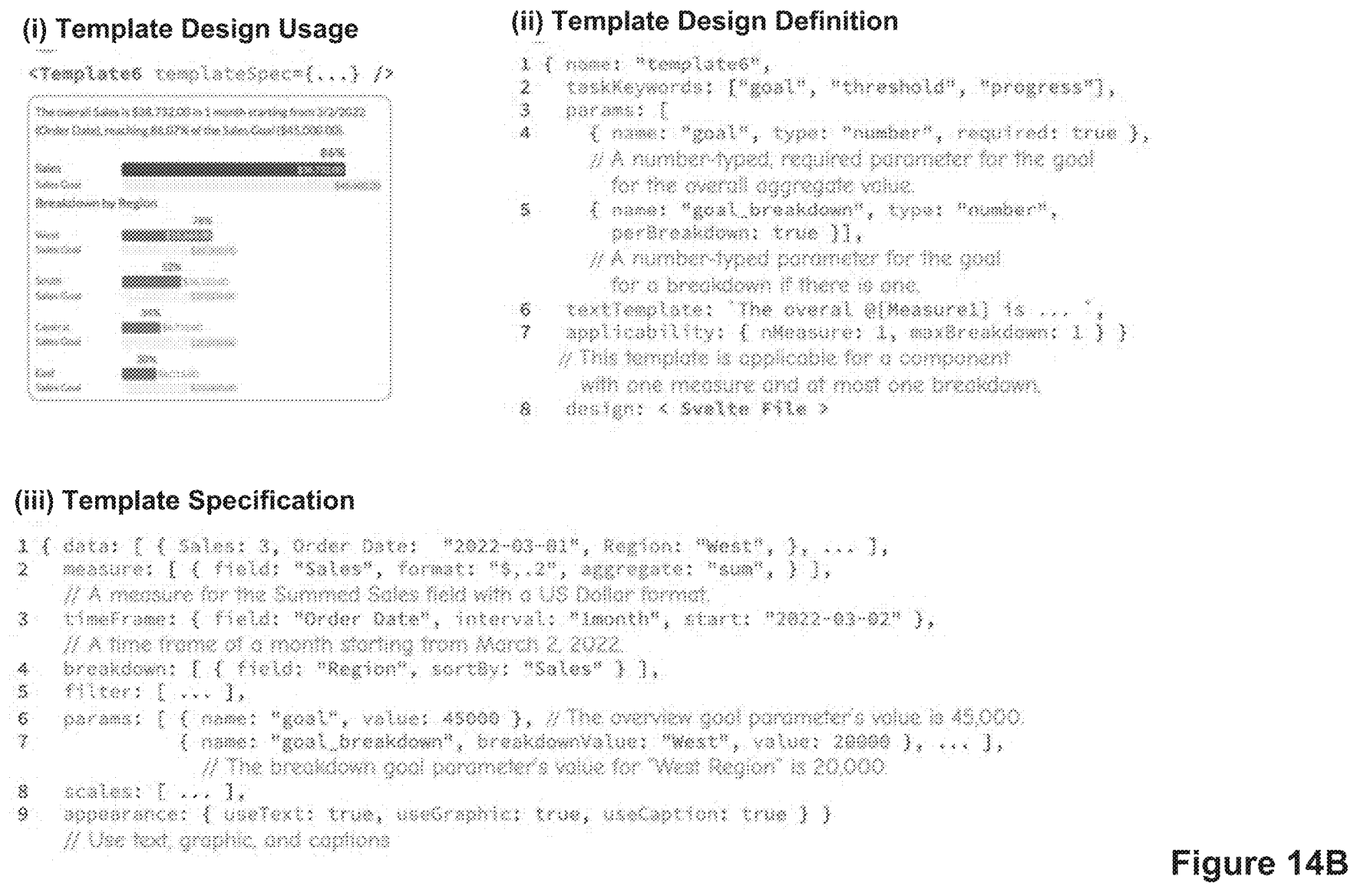

FIG. 14B illustrates an example template design definition and template specification for a "goal" template, in accordance with some implementations.

As outlined in 14B, a template specification is fed to a template. As illustrated in FIG. 14B(iii), a template specification consists of appearance, parameters (params), custom text, data, measures, time frame, breakdowns, filters, and scales (see also FIG. 16). The appearance property declares design details for template, such as use of text, graphic, and captions (FIG. 14B(iii), line 9). The params property contains actual parameter values provided by a user (FIG. 14B(ii), lines 6-8). If provided, the custom text overrides the text template provided by a template design, which can be either static text or an expression string. The data, measures, time frame, breakdowns, filters, and scales are imported from a current component (see FIG. 16).

Figure 15C:
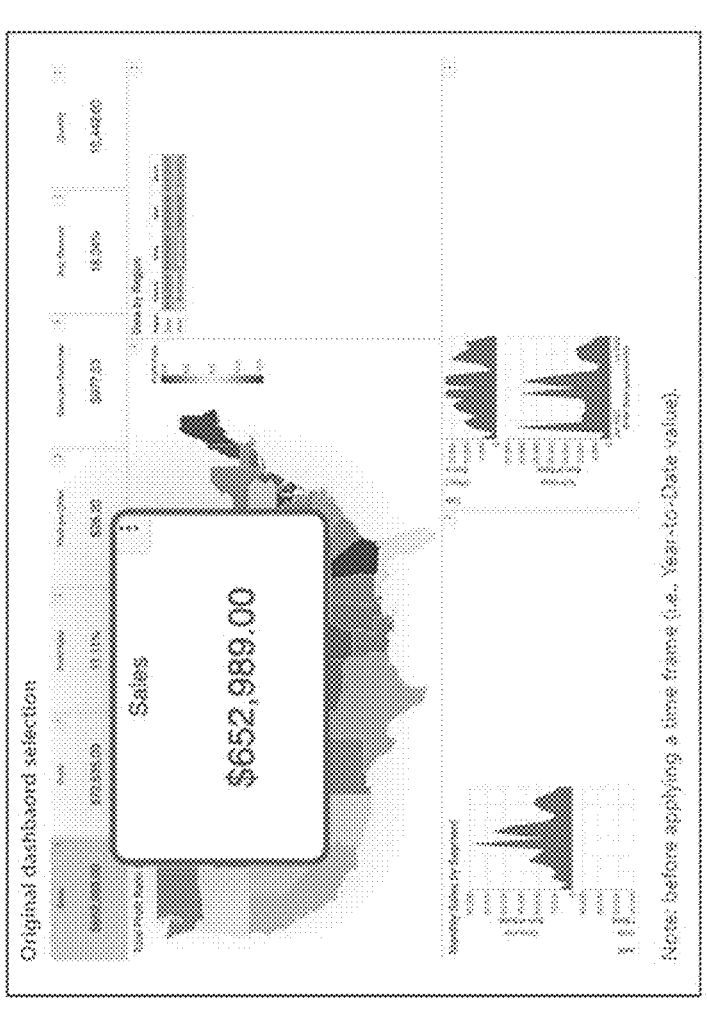
Figure 15D:
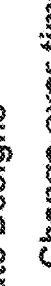
Figure 15E:
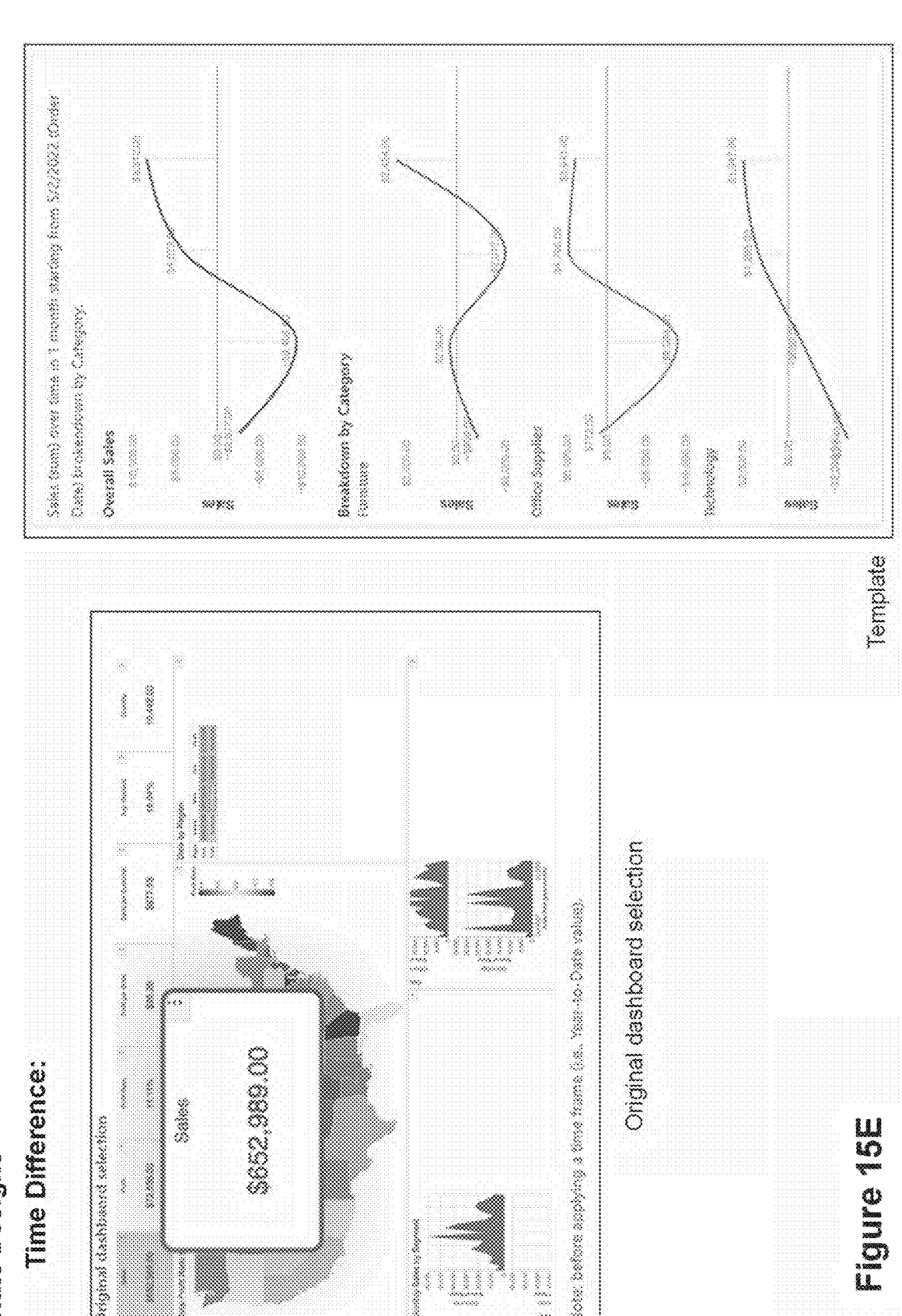
Figure 15F:
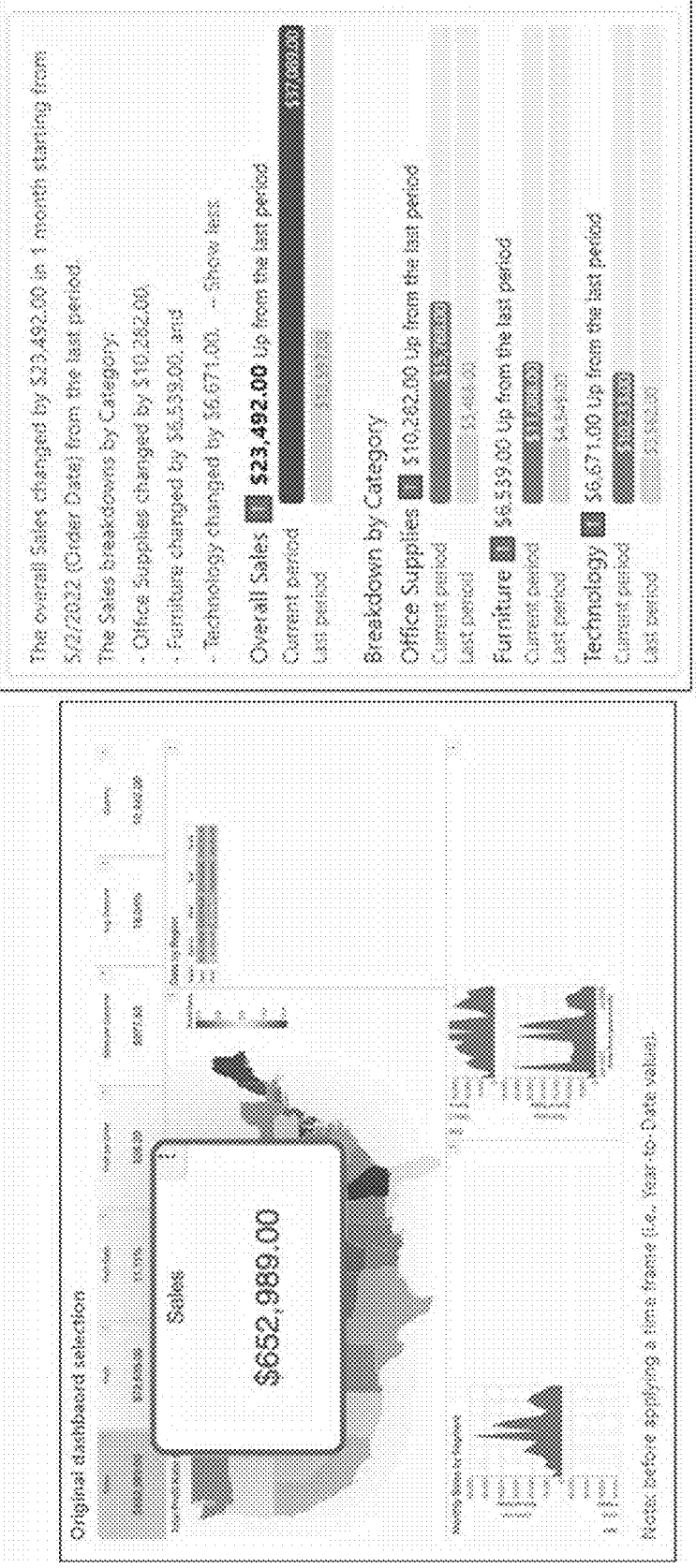
Figure 15J:
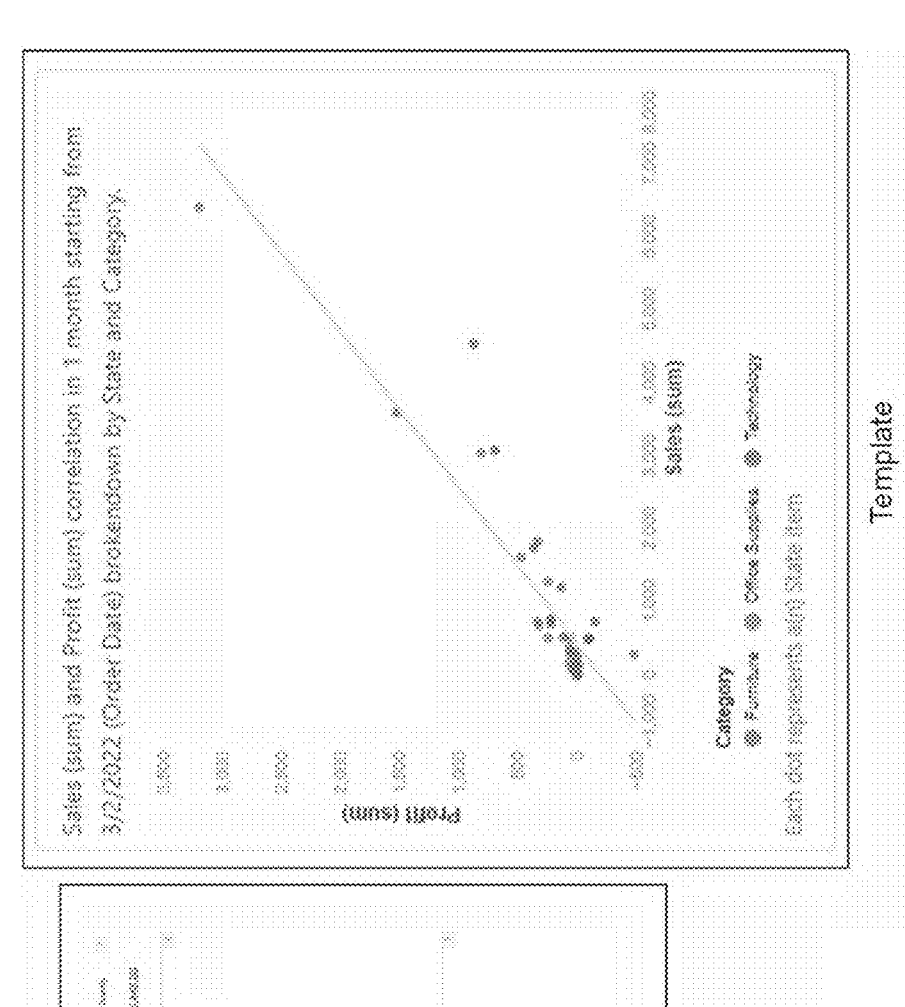
Figure 15K:
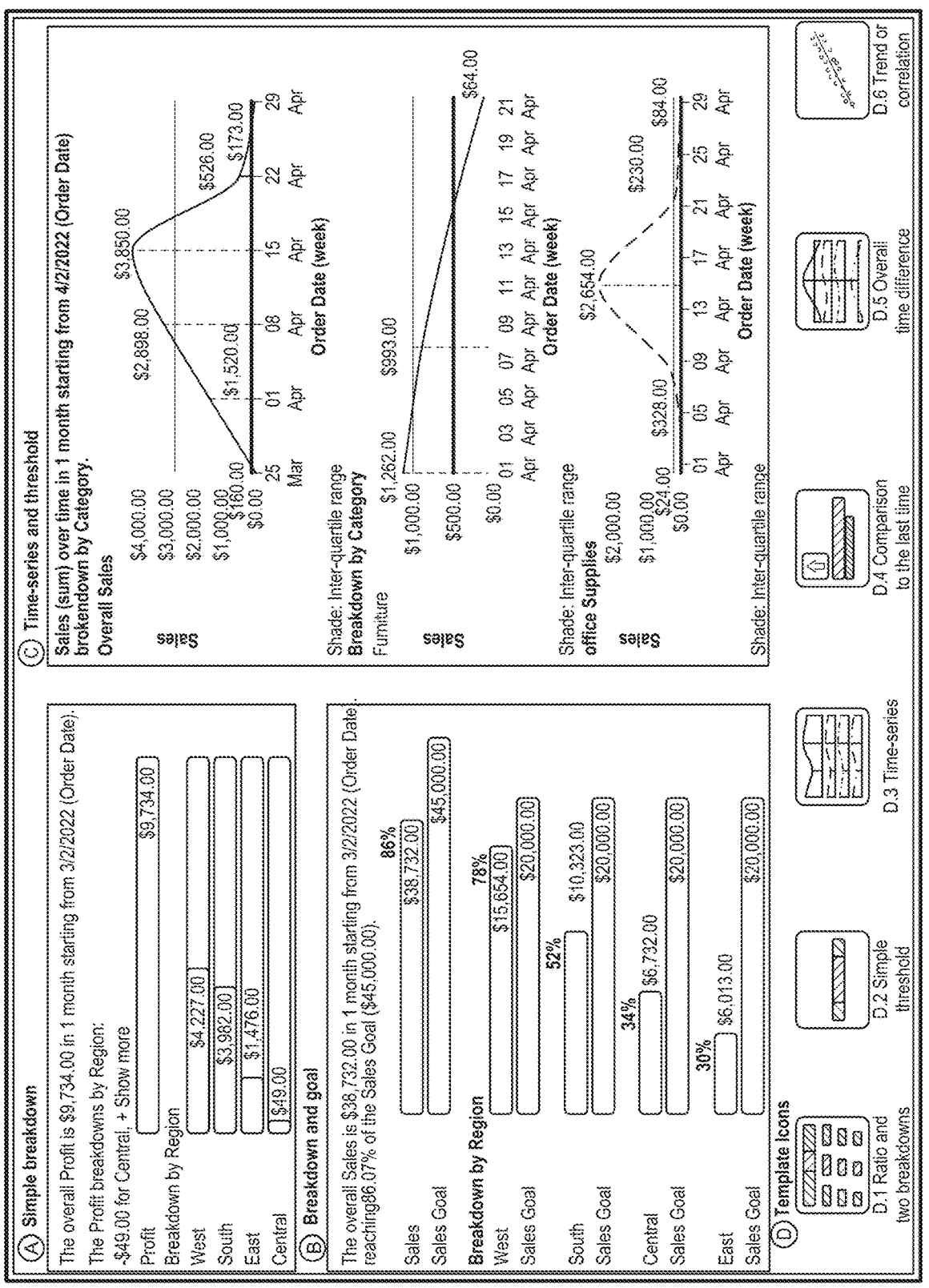

FIGS. 15A to 15K illustrate exemplary template designs, in accordance with some implementations. FIG. 15A shows, for a respective template design (identified by its name), the corresponding task keywords, applicability, and parameters for that template design. Each of FIGS. 15B to 15K illustrates the original dashboard selection (on the left) and the corresponding template design (on the right), in accordance with some implementations. Collectively, the template designs correspond to a small set of communicative intents (DG1: support data conversation) that the inventors derived from their co-design workshop findings. For example, FIG. 15B is intended to communicate a simple breakdown by dimension or discretized bin, while FIG. 15H is designed to elicit a comparison between a value and a goal, so as to support a call to action, and FIG. 15K is designed to communicate a trend in reference to a threshold. For some templates, authors can supply goal or threshold values via parameters (DG2a: transformation).

Figure 16:
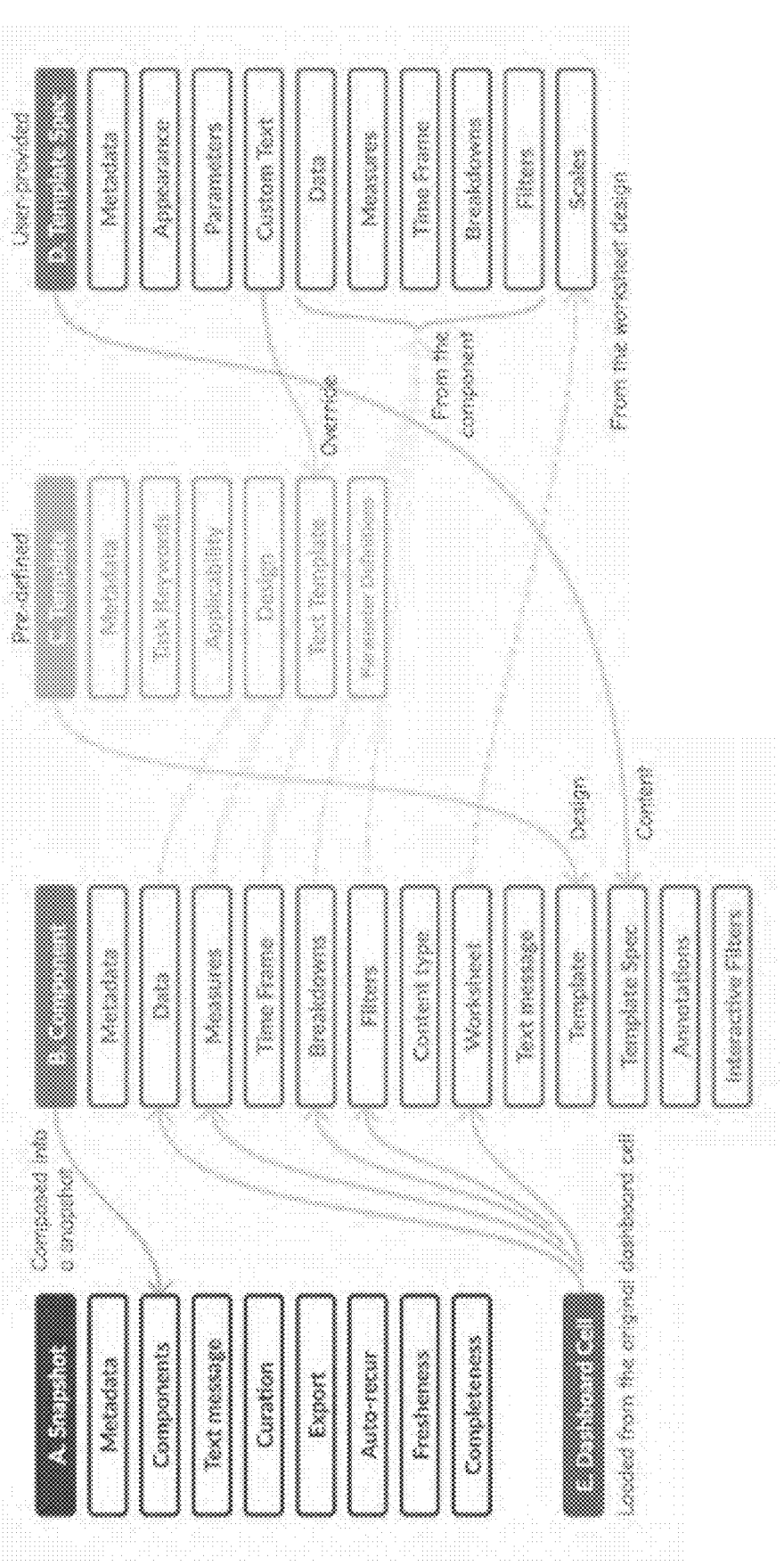
FIG. 16 illustrates the relationships between snapshots, components, templates, template specifications, and dashboard selections, in accordance with some implementations.

FIG. 16 illustrates the relationships between snapshots (A), components (B), templates (C), template specifications (D), and dashboard selections, in accordance with some implementations.

Referring to FIG. 16, snapshot component includes properties such as content type (determining whether to inherit the original representation from a dashboard selection or to a use a template) and interactive filters, as outlined in Column B in FIG. 16. Philo initiates a component by propagating the data, measures, breakdowns, and filters from the original dashboard selection (E B), while the worksheet property stores the design specification of the original dashboard selection to enable interactivity (DG1d) and selective design propagation (DG2c). The template property contains a pointer to a template design choice (C→B), while the template spec property contains the data required by the selected template (D→B). With properties like components and curation, a snapshot specification combines multiple components into a single snapshot to be shared on a collaboration platform (B→A). Components contain content such as data and formatting choices while a snapshot governs how to compose and export those components. For example, the export property declares the channel where a snapshot is to be shared, while freshness and completeness indicate the status of a snapshot. Templates inherit several properties like data and measures from a component (B→D). This includes the worksheet property, which retains a dashboard selection's scale mappings (FIG. 7B-D), thereby allowing authors to selectively preserve some dashboard design choices (DG2c: selective design propagation) after applying a template-based transformation to the content.

Updating a Snapshot

When a snapshot is updated, either via manual retrieval or an automatic recurrence, it references the time frame property of its components. Philo first retrieves the most recent date associated with the data sources of each snapshot component. Next, Philo infers a new time frame of a component at update time, so as to filter the data. As an example, suppose the original time frame is a quarter starting from January 1. If today is May 1, the time frame remains unchanged because the next time frame (a quarter from April 1 to June 30) is not yet complete. However, if today is July 10, then the time frame is updated to reflect a quarter starting from April 1. Once Philo updates component time frames, it applies corresponding data filters and posts an updated snapshot on the collaboration platform channel on which the snapshot was originally shared, along with a visual indication associating it with the earlier snapshot. In some implementations, Philo does not propagate annotations from earlier versions of a snapshot (e.g., Philo by default removes annotations), so as to reduce the likelihood of miscommunication.

In some implementations, if a snapshot author elects to manually update a snapshot, Philo allows them to edit its annotations and captions before sharing the update.

III. Usage Scenario

FIGS. 17A to 17H collectively illustrate a usage scenario for Philo, in accordance with some implementations. Additional details scan also be found in priority application 63/404,518, filed Sep. 7, 2022, which is incorporated by reference herein in its entirety.

Figure 17A:
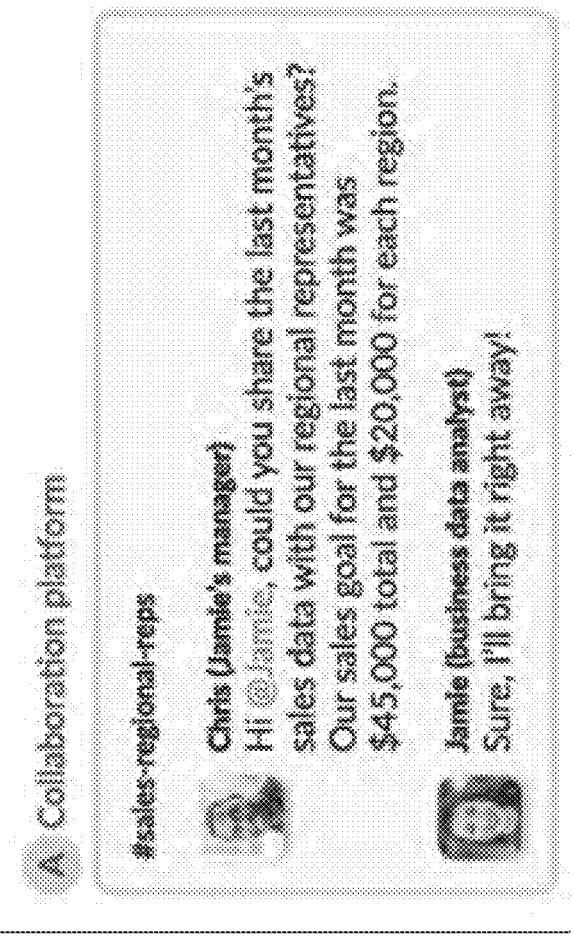
FIGS. 17A to 17H collectively illustrate a usage scenario for Philo, in accordance with some implementations.

In this example, Jamie is a national sales analyst for a large retail company. Jamie's manager, Chris, uses a collaboration platform (e.g., a chat application) to send Jamie a message asking her to share a dashboard snapshot spanning the past month (e.g., March 2022) with regional sales representatives for each U.S. Region (FIG. 17A). Chris's message indicated a sales goal for the past month and a respective sales goal for each region.

Figure 17B:
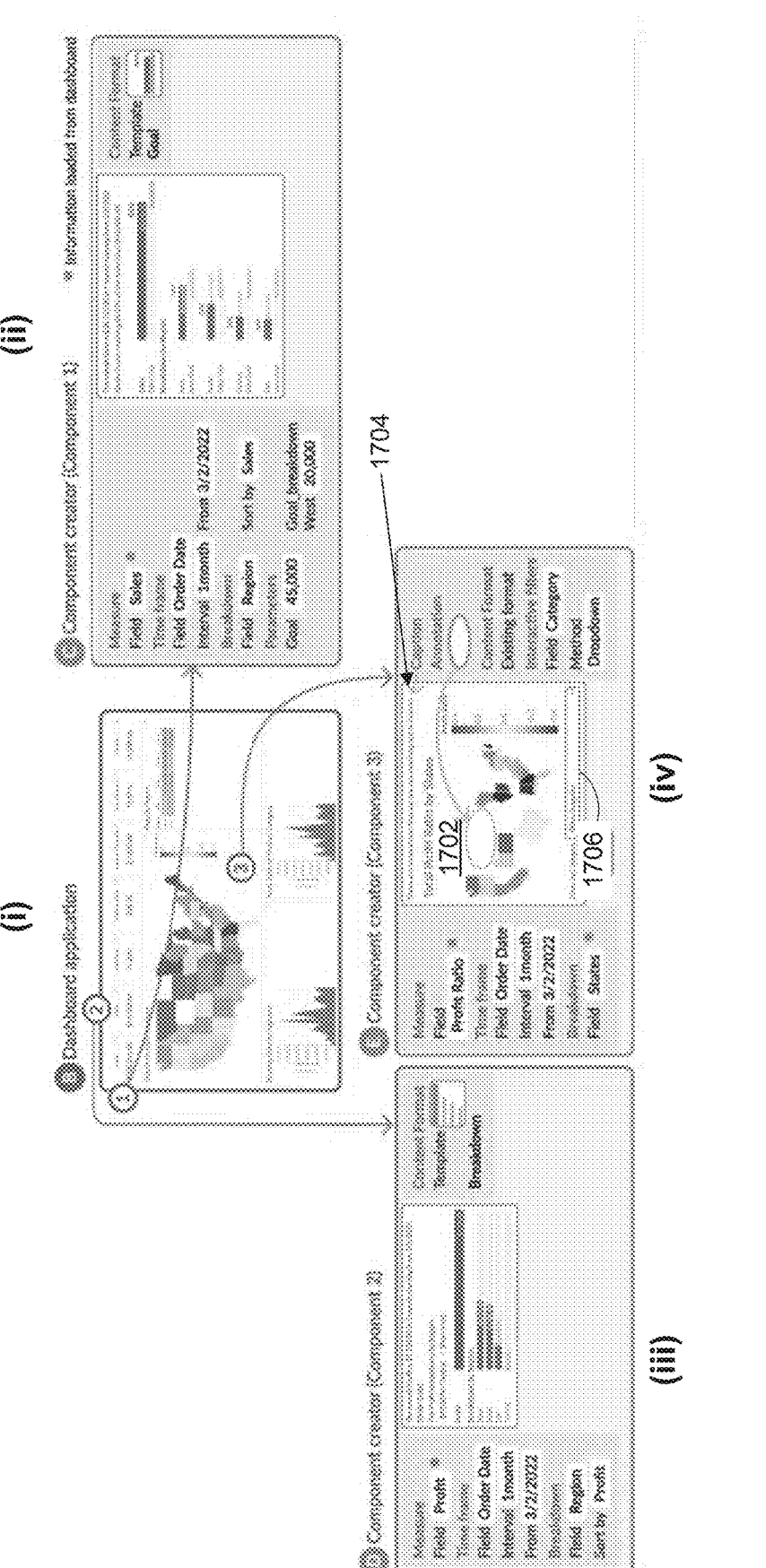

In FIG. 17B, Jamie opens her dashboard (e.g., data visualization application 230, user interface 232) and selects a dashboard element indicating the total sales value, with which she creates an initial snapshot component (FIGS. 17B(i) and 17B(ii)).

In the component creator that is illustrated in FIG. 17B (ii), the measure data field (e.g., sales) is already loaded. Jamie sets the time frame to be a month starting from Mar. 2, 2022. Since her original dashboard selection does not specify any region, Jamie sets a breakdown according to region (e.g., breakdown field 638). Chris has also communicated the team's sales goals for the month, so Jamie chooses a template (e.g., via selection of a template icon 676. See also template designs in FIGS. 15A to 15L) that includes both a breakdown and goal value; she enters the sales goal as a template parameter.

Similarly, she creates another component for the profit measure, as illustrated in FIGS. 17B(i) and 17B(iii). For the third snapshot component, Jamie selects the profit ratio map (FIGS. 17B(i) and 17B(iv)). She opts to maintain this map representation in the snapshot instead of selecting a template. In the example of FIG. 17, the snapshot components are selected from the same data dashboard. In some implementations, the snapshot components can be selected from distinct data dashboards.

Referring back to the example of FIG. 17B(iv), upon specifying the March 2022 time frame for the third component, Jamie notices that there are missing data points in the West region, so she adds an annotation 1702 to emphasize this region and adds a custom component caption 1704. Recalling that regional sales team representatives often ask her about specific product categories, Jamie adds an interactive filter 1706 for the category dimension field.

Figure 17C:
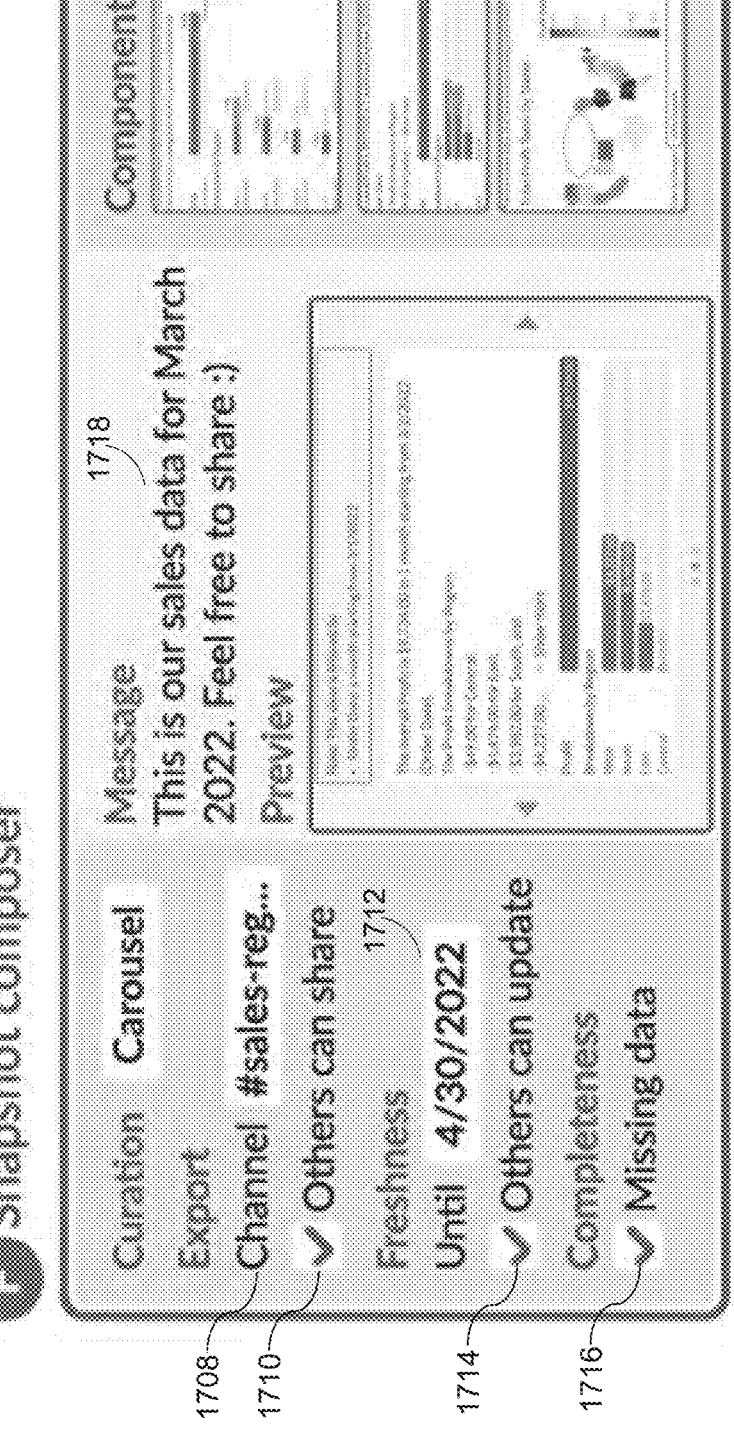

Referring now to FIG. 17C, with these three snapshot components, Jamie invokes the snapshot composer (e.g., snapshot generator 246, snapshot creator user interface 248) from the dashboard application (e.g., data visualization application 230). For example, in some implementations, Jamie can select the affordance 708 to invoke the snapshot composer. In FIG. 17C, Jamie chooses an interactive carousel as a component curation option (e.g., curation method 808). Next, she sets the export controls (e.g., export panel 812), directing the snapshot at the #sales-regional-reps channel (1708), subscribed to by all of the regional sales representatives. She allows viewers to share (1710) this snapshot across other channels so that the regional representatives can communicate with their own regional teams. Cognizant that the snapshot will no longer be fresh by the end of April (e.g., the snapshot will be invalid, or data of the snapshot will have expired), Jamie customizes the inferred date 1712. She also enables other people to retrieve an updated version after the snapshot becomes stale (1714). Recalling the missing data points, Jamie toggles (1716) the completeness to indicate to her viewers that the underlying data is incomplete. After adding a caption 1718, Jamie posts the snapshot on #sales-regional-reps channel, as illustrated in FIG. 17D.

Figure 17D:
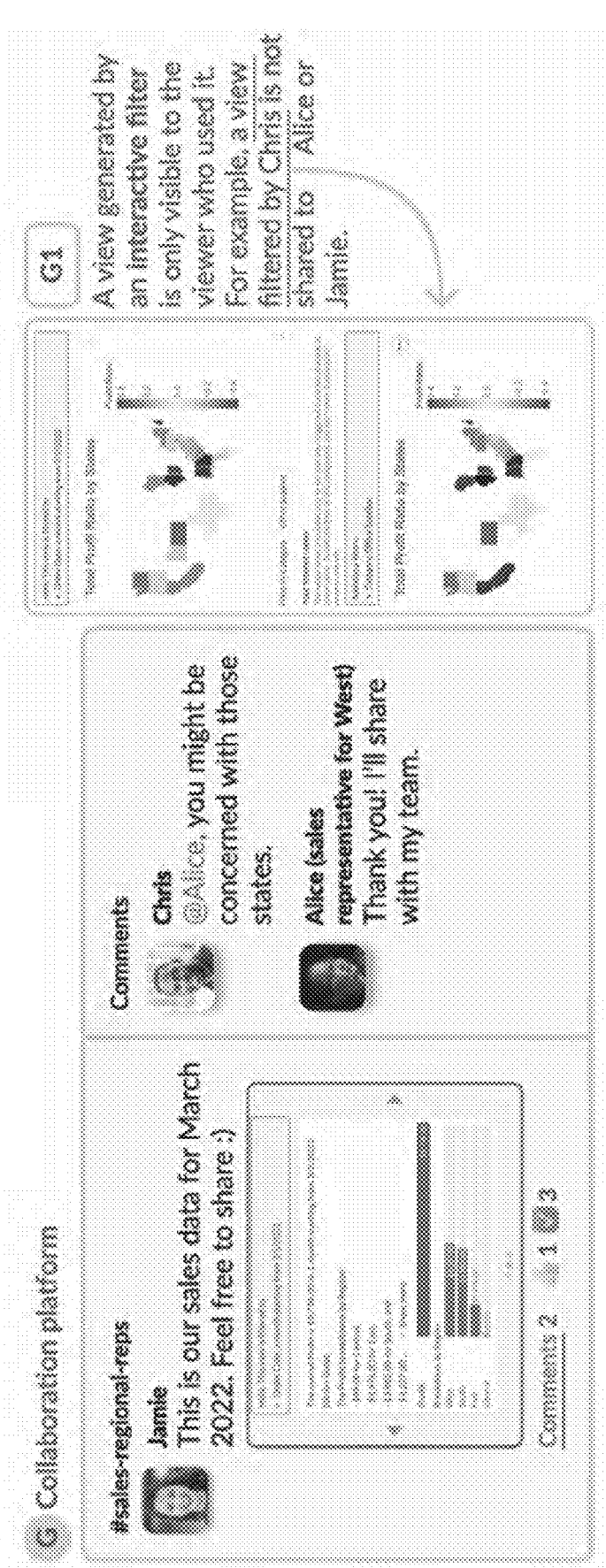

FIG. 17D illustrates that Manager Chris, in response to noticing the snapshot's annotation and completeness indicator, determines that the West region representatives are responsible for those missing data points. Chris points this out to Alice, a sales representative for the West region, in a comment on the collaboration platform. Alice then shares this snapshot with her regional team so that they can investigate and explain.

Figure 17E:
Figure 17F:
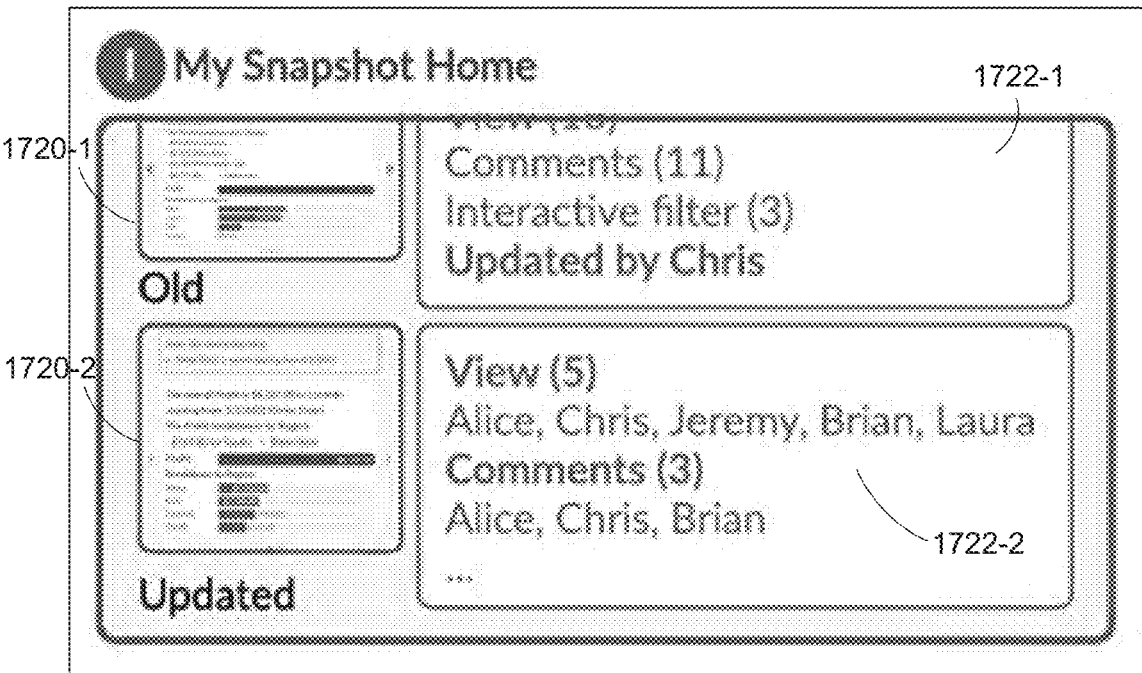
Figure 17G:
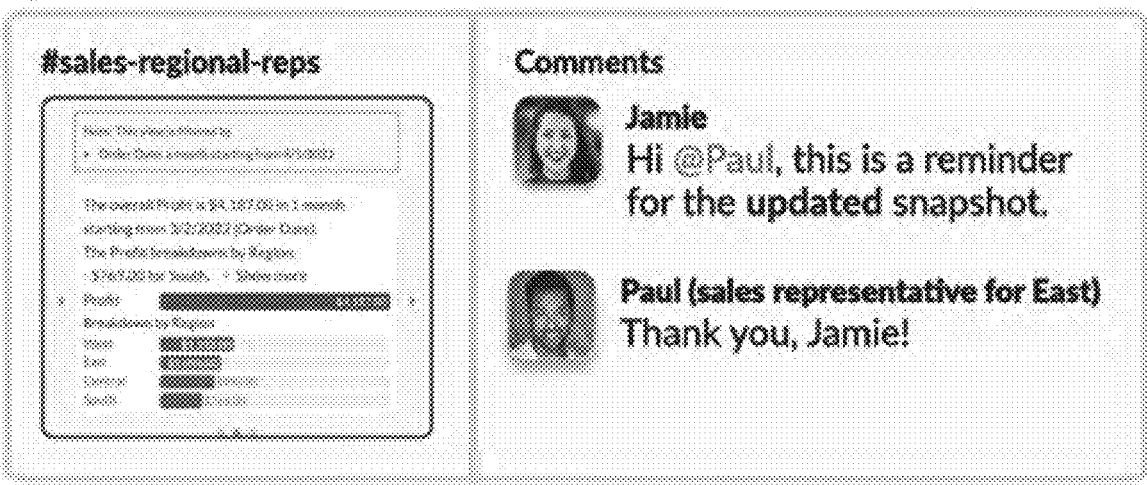
Figure 17H:
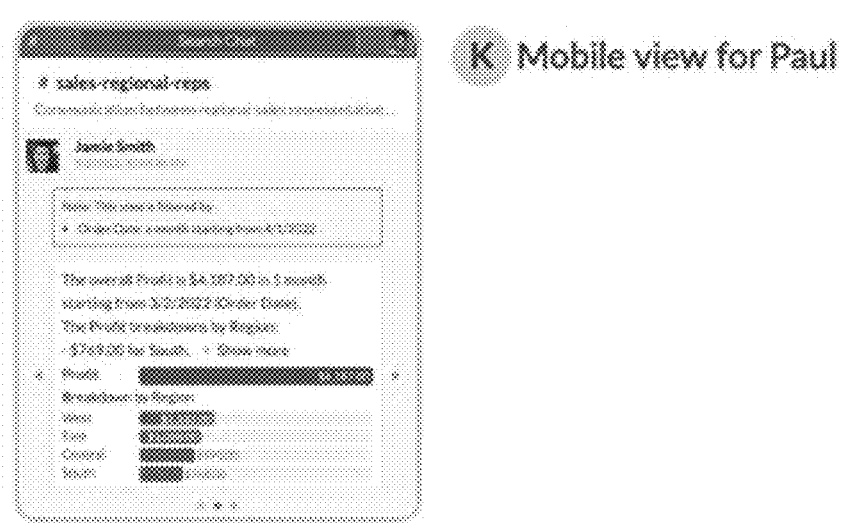
Figure 18E:
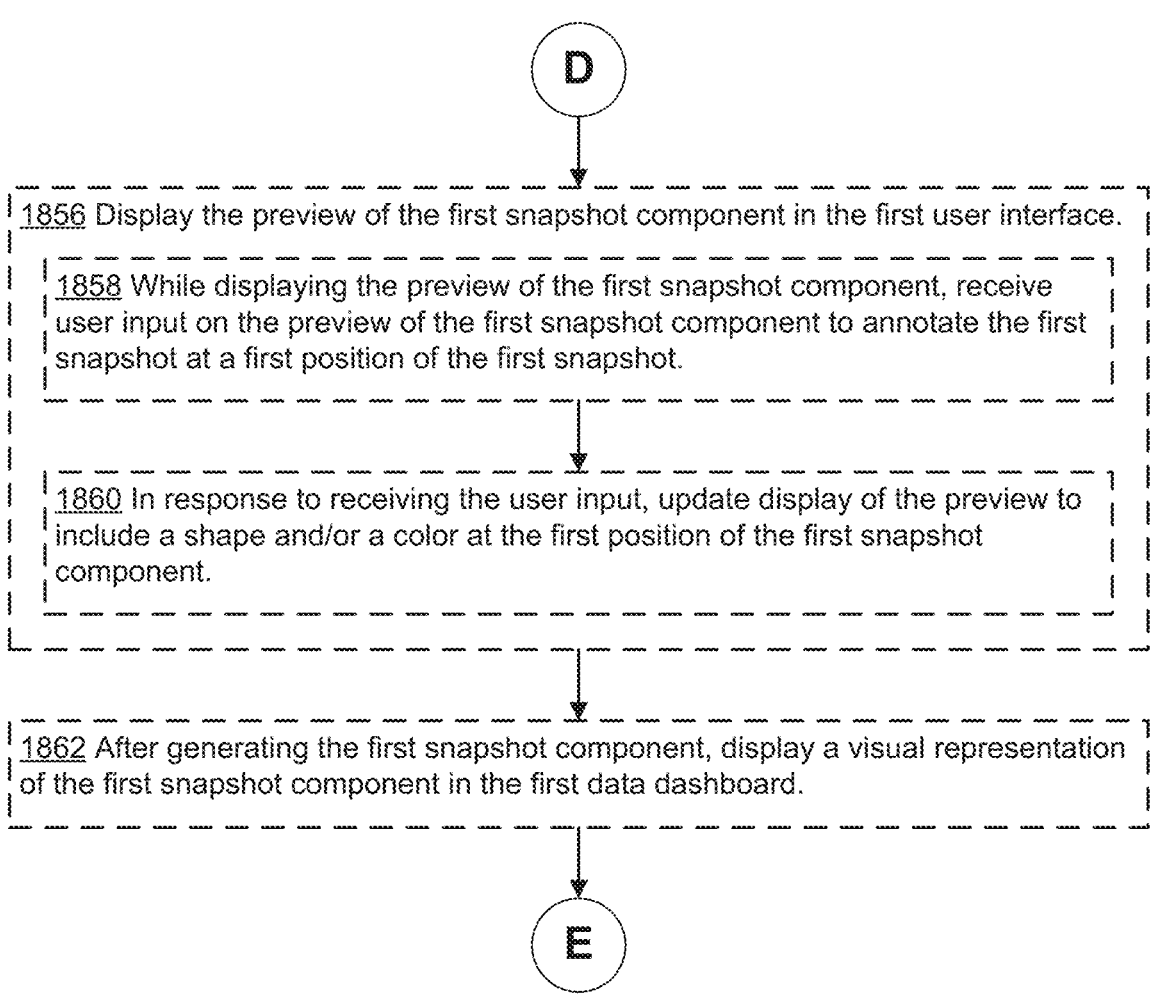
Figure 18H:
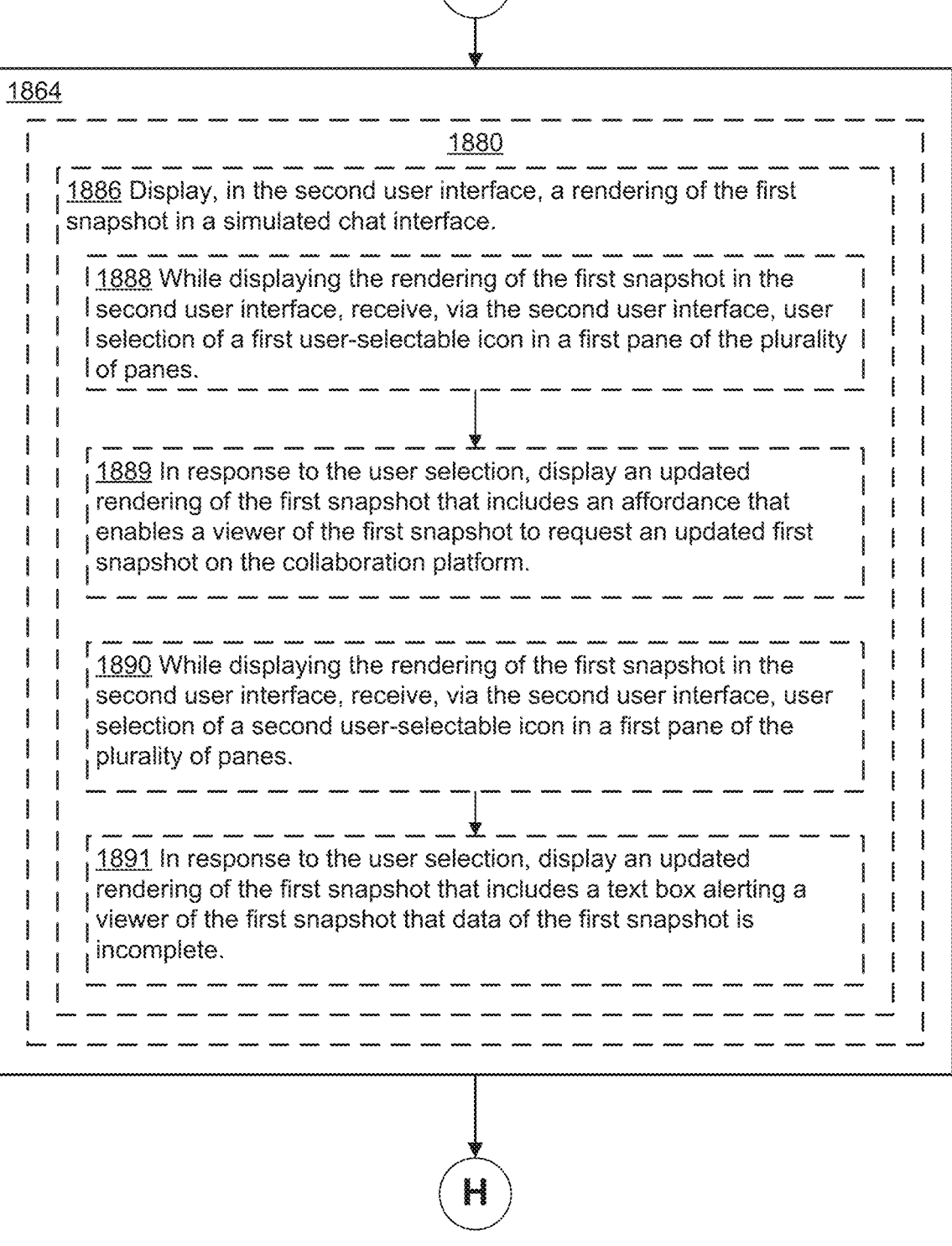
Figure 18I:
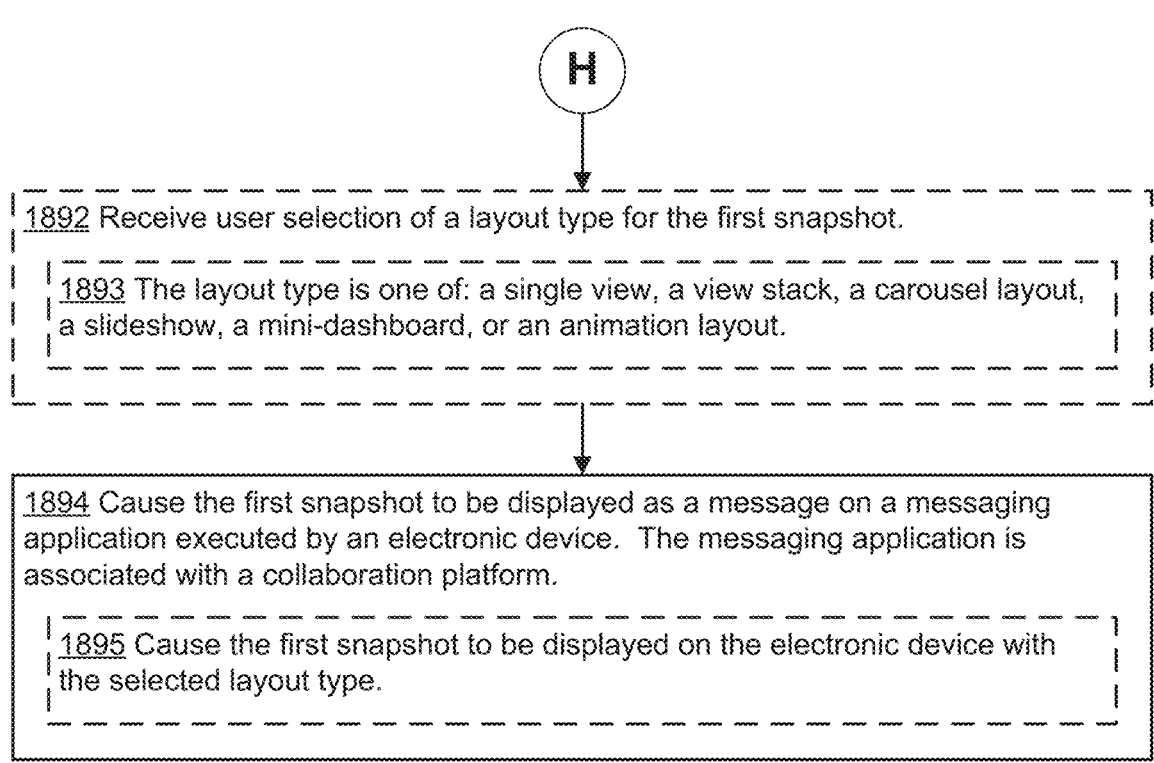

FIG. 17E illustrates that a month later, Chris sees that the snapshot for March has become stale, so he retrieves and shares an updated version. Meanwhile, Jamie can see the telemetry of this updated snapshot via her "My Snapshot Home" interface (e.g., snapshot home user interface 274), as illustrated in FIG. 17F. In some implementations, the "My Snapshot Home" interface includes panes 1720 (e.g., panels) that each corresponds to a respective snapshot authored by Jamie. In some implementations, each of the panes 1720 includes a respective corresponding information panel 1722 that displays telemetry information regarding the respective snapshot. In this usage scenario, Jamie notes that Paul (a sales representative for the East region) has not yet seen the updated snapshot, so she mentions him in a comment for the component, as illustrated in FIG. 17G. Once notified, Paul checks out the updated snapshot via his mobile phone, as illustrated in FIG. 17H.

Flowcharts

FIGS. 18A to 18I provide a flowchart of a method 1800 of retargeting dashboard content as data snapshots (e.g., dashboard snapshots) for collaboration platforms, in accordance with some implementations. The method 1800 is also called a process.

The method 1800 is performed (1802) at a computing device (e.g., computing device 200) that has a display (e.g., display 212), one or more processors (e.g., CPU(s) 202), and memory (e.g., memory 206). The memory stores (1804) one or more programs configured for execution by the one or more processors. In some implementations, the operations shown in FIGS. 1A, 1B, 6A-6D, 7A-7C, 9, 9A-9D, 10, 11A-11C, 12A-12D, 13A, 13B, 14A, 14B, 15A-15L, 16, and 17A-17H correspond to instructions stored in the memory or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 1800 may be combined and/or the order of some operations may be changed.

Method 1800 relates to creating snapshot component(s) from dashboard content and creating data snapshots that includes one or more snapshot components, for display on a messaging application associated with a collaboration platform. While data dashboards are a useful tool for analyzing and displaying data, they may not be ready for sharing with audiences such as business users because they often contain a large amount of information with higher complexity. Method 1800 improve user experience by introducing a streamlined process that enables dashboard authors to effectively retarget dashboard content as data snapshots. For example, a snapshot author can select relevant dashboard content, configure specific conditions for insights, and link different portions of dashboards for coherence, with respect to their communication goals. In some implementations, the data snapshots have a form factor that is compatible with the viewers' devices or screen context. As a result, user experience with data communication is improved.

Referring to FIG. 18A, the computing device receives (1806) user selection of a first data element from a first data dashboard (e.g., data dashboards 258, data dashboard 702) that is displayed on the computing device (e.g., via a dashboard user interface 232). The user selection designates the first data element as a first snapshot component (e.g., data snapshot component) of a first snapshot. In some implementations, the designation of the first data element as the first data snapshot causes the computing device to create a placeholder for a snapshot component based on the coordinates of the first data element on the first data dashboard. In some implementations, the designation of the first data element as the first data snapshot causes the computing device to create a data structure (e.g., a data structure having the properties illustrated in FIG. 12C) of a snapshot component.

In some implementations, in accordance with receiving the user selection designating the first data element as the first snapshot component, the computing device generates (1808) a first component specification corresponding to the first snapshot component, where the first component specification includes the plurality of component properties. The computing device populates (1810) the first component specification with the respective first values in accordance with the user specification of the respective first values for at least the subset of the properties.

In some implementations, as discussed with respect to Section HD and FIGS. 12A to 12D, a (snapshot) component is formalized as a tuple of metadata, data, measures, time frame, breakdowns, filters, content type, worksheet, text message, template, template specification, annotations, and interactive filters. The metadata property includes the name, identifier, and pointers to the originating dashboard cell. The data property stores the entire data at the time of creation to enable interactive snapshots. Each measure item consists of a measure field, a formatting expression (e.g., $0.2 for U.S. Dollar), and an aggregation method. The time frame property contains a temporal field, a time range, a time unit (e.g., week, month) and a periodicity filter. A time range can be specified using a start or end date only, start and end dates, and a start date with an interval. A periodicity filter expresses time points to filter in within a time range, consisting of index and unit (e.g., 1-5 day for weekdays). Each breakdown item includes a dimension field, a ranking field (measure), the numbers of top- and bottom-ranked items (topN, bottomN), and a sorting order descending/ascending). For instance, a breakdown item with Category dimension and Sales measure sorts the Category items by their Sales values. If topN and bottomN are provided, then the specified number of top- and bottom-ranked items are shown. Each filter item represents a filter expression, such as a field and data values/ranges. In some implementations, Philo loads the data, measures, breakdowns, and filters from the original dashboard cell when a component is initially created.

In some implementations, the first data element is (1812) a data value of a measure data field; and the data value is determined via a first aggregation type. In some implementations, the first data element comprises (1814) a data mark of a data visualization on the first dashboard.

In some implementations, the first data element is (1816) a data visualization on the first dashboard.

Referring to FIG. 18B, the computing device, in response to receiving the user selection of the first data element from the first data dashboard, displays (1818), in a first user interface (e.g., component creator user interface 244), a plurality of component properties for the first snapshot component. This is illustrated in FIGS. 6A, 6B, and 6C. In some implementations, displaying the first user interface includes replacing display of the view of the first data dashboard (e.g., on a dashboard user interface 232) with the first user interface.

In some implementations, the disclosed systems and user interfaces support data professionals to create interactive snapshots in a flexible way through template-based design transformation. In some implementations, the computing device displays (1820), via the first user interface, a plurality of template icons (e.g., template icons 676) corresponding to a plurality of templates (e.g., template designs). In some implementations, a template design for a component is defined by supported tasks (e.g., task keywords), such as "breakdown," "ranking," "percentage," "proportion," "time difference," "time comparison," "goal," "trend," and "correlation", and applicability (e.g., text template, and parameter definitions (params). This is illustrated in FIGS. 15A to 15L. Each template design serves or achieves a business-oriented "message" or a goal like breaking down a value, comparing a value to a goal, or seeing a trend.

In some implementations, in response to the receiving the user selection of the first data element from the first data dashboard, the computing device replaces (1822) the display of the first data dashboard with a view of the first user interface. For example, in FIG. 7B, the computing device receives user selection of a data element 704-1 in the data dashboard 702 and user selection of an affordance 706 designating the data element "Sales" as a snapshot component of a data snapshot. In response to receiving the user selection, the computing device replaces the display of the data dashboard 702 (e.g., and the dashboard user interface 232) with a view of the snapshot creator user interface 244.

In some implementations, the first data dashboard is (1824) displayed in a data visualization application (e.g., data visualization application 230) and the first user interface is a user interface of the data visualization application.

In some implementations, the first data dashboard is (1826) displayed in a data visualization application and the first user interface is a user interface of the collaboration platform (e.g., messaging application 270) (e.g., associated with a collaboration platform server 500).

In some implementations, the first data dashboard is (1828) displayed in a data visualization application and the first user interface is a user interface of an application that is distinct from the data visualization application and distinct from the collaboration platform.

Referring to FIG. 18C, the computing device receives (1830), via the first user interface, user specification of respective first values for at least a first subset of component properties of the plurality of component properties.

In some implementations, the computing device receives (1831), via the first user interface, user selection of one or more measure data fields (e.g., measure data field(s) 622), a number format for a respective data field (e.g., format 624), and an aggregation method for the respective data field (e.g., aggregate 626) (e.g., a sum, a mean or average, maximum, count, or variance). In some implementations, instead of receiving user selection of the data fields, the computing device pre-populates the first user interface (e.g., the measures panel 612 of the first user interface) with the measure data field, and identifies a format and an aggregation type.

In some implementations, the computing device receives (1832), via the first user interface, user selection of a dimension data field (e.g., one or more dimension data fields) (e.g., breakdown field 638) and a sorting order (e.g., ordering 643) (e.g., ascending or descending order).

In some implementations, the computing device receives (1834), via the first user interface, user specification of a temporal data field (e.g., time dimension data field 628) (e.g., a reference time field, such as ship date or order date) and a date/time range for filtering the first data element, as illustrated by a time interval filter 630, a start date 632, a time unit 634, and/or a periodicity filter 636 in FIG. 6B. In some implementations, the date/time range is specified by (i) a time interval (e.g., time interval filter 630) with a start date (e.g., start date 632) or (ii) a start date and an end date.

In some implementations, the computing device receives (1836) user selection of a first template icon of the plurality of template icons, the first template icon corresponding to a first template of the plurality of templates (see, e.g., FIGS. 15A to 15L for template designs), and receives (1838) user specification of one or more parameters for the first template (e.g., via template parameters panel 620).

The computing device, in accordance with receiving the user specification of the respective first values for at least the first subset of component properties, updates (1840) (e.g., formalizes) the first snapshot component according to the respective first values.

In some implementations, the computing device generates (1842) the first snapshot component (e.g., according to the respective first values).

In some implementations, generating the first snapshot component includes generating (1844) a bar chart having a plurality of data bars, where each of the data bars (i) represents a respective data value of a measure data field that is broken down by the dimension data field and (ii) has a respective length that represents a portion of the first data element corresponding to the respective data value; and arranging (1846) the data bars in the sorting order according to respective lengths of the data bars.

In some implementations, generating the first snapshot component includes filtering (1850) the first data element to the date/time range of the temporal field.

In some implementations, generating the first snapshot includes formatting (1852) the first snapshot component according to the first template and the one or more parameters.

In some implementations, the computing device automatically generates (1854) a preview (e.g., a rendering) of the first snapshot component in accordance with the user specification of the respective first values for at least the first subset of component properties. The preview indicates what the first snapshot component will look like when the data snapshot is generated.

In some implementations, the computing device displays (1856) the preview of the first snapshot component in the first user interface (e.g., in a preview column 604 of the component creator user interface 244). In some implementations, the computing device is configured to automatically update the preview of the first snapshot component in response to updates/modifications to values(s) of the component properties.

In some implementations, while displaying the preview of the first snapshot component, the computing device receives (1858) user input on the preview of the first snapshot component to annotate the first snapshot at a first position of the first snapshot (e.g., using the annotation panel 672). For example, a user can click on or draw a shape (e.g., a circle, rectangle, arrow, and/or line) on the preview of the first snapshot component. In response to receiving the user input, the computing device updates (1860) display of the preview of the snapshot component to include a shape and/or a color at the first position, to indicate that t. In some implementations, the user input further includes a text input that explains the reason for the annotation.

In some implementations, after generating the first snapshot component, the computing device displays (1862) a visual representation of the first snapshot component in the first data dashboard. This is illustrated in FIG. 7C (e.g., representation 712).

With continued reference to FIG. 18F, the computing device generates (1864) a first snapshot that includes the first snapshot component.

In some implementations, the first data snapshot includes (1866) a second snapshot component that is distinct from the first snapshot component. In some implementations, after generating the first snapshot component, the computing device receives (e.g., via the dashboard user interface 232) user selection of a second data element. The user selection designates the second data element as the second snapshot component for a first snapshot.

In some implementations, the user selection designating the second data element as the second snapshot component is received (1868) via the first data dashboard that is displayed on the computing device.

In some implementations, the user selection designating the second data element as the second snapshot component is received (1870) via a second data dashboard, distinct from the first data dashboard, that is displayed on the computing device (e.g., the first and second snapshot components originate from different dashboards).

In some implementations, the first data element is (1872) derived from a first data source and the second data element is derived from a second data source that is distinct from the first data source.

In some implementations, in accordance with receiving the user selection, the computing device generates (1874) a second component specification corresponding to the second snapshot component. The second component specification including the plurality of component properties.

In some implementations, the first snapshot is (1876) specified by a plurality of snapshot properties. For example, as described in Section II.D. and FIGS. 11A to 11C, a single snapshot is formally declared as a tuple of metadata, components, text message, curation, export, auto-recur, freshness, and completeness. Generating the first snapshot includes receiving user specification of respective second values corresponding to the plurality of snapshot properties, including a first date/time until which data in the first snapshot is valid (e.g., the first snapshot includes a first snapshot component that expires at the first date/time) and an identification of the collaboration platform (e.g., a messaging group, a Slack channel) to which the first snapshot is to be exported.

In some implementations, the plurality of snapshot properties includes (1878) metadata properties, including: a first metadata property that specifies an identifier of the first snapshot; a second metadata property that specifies an owner of the first snapshot; and a third metadata property that specifies a pointer to the first chat message that displays the first snapshot.

In some implementations, generating the first snapshot includes displaying a second user interface (e.g., snapshot creator user interface 248) that includes a plurality of panes (e.g., panels), wherein a respective pane of the plurality of panes corresponds to a respective snapshot property of a plurality of snapshot properties of the first snapshot. User selection of a respective field in a respective pane, of the plurality of panes. specifies a respective value for a respective corresponding snapshot property.

In some implementations, the method 1800 includes after updating the first snapshot component according to the respective first values, replacing (1881) display of the first user interface with a view of the first data dashboard. The second user interface is displayed in response to user selection of an affordance (e.g., user selectable icon) (e.g., "compose and export snapshot") from the view of the first data dashboard.

In some implementations, the first data dashboard is (1882) displayed in a data visualization application and the second user interface is a user interface of the data visualization application.

In some implementations, the first data dashboard is (1883) displayed in a data visualization application and the second user interface is a user interface of the collaboration platform.

In some implementations, the first data dashboard is (1884) displayed in a data visualization application and the second user interface is a user interface of an application that is distinct from the data visualization application and distinct from the collaboration platform.

In some implementations, the first user interface and the second user interface are (1885) both interfaces of the same application.

In some implementations, the computing device displays (1886), in the second user interface (e.g., in a preview pane/column 804), a rendering of the first snapshot in a simulated chat interface. This is illustrated in FIG. 8.

In some implementations, while displaying the rendering of the first snapshot in the second user interface, the computing device receives (1888), via the second user interface, user selection of a first user-selectable icon (e.g., box 826 "Allow others to refresh") in a first pane of the plurality of panes. In response to the user selection, the computing device displays (1889) an updated rendering of the first snapshot (e.g., in the preview column 806) that includes an affordance (e.g., a user-selectable element) (e.g., freshness indicator 828) that enables a viewer of the first snapshot to request an updated first snapshot on the collaboration platform. Displaying an updated rendering of the first snapshot with an affordance that enables a viewer of the first snapshot to request an updated first snapshot improves user experience by informing viewers about the validity or timeliness of the data, which in turn leads to improved user trust in the data.

In some implementations, while displaying the rendering of the first snapshot in the second user interface, the computing device receives (1890), via the second user interface, user selection of a second user-selectable icon (e.g., option 832) in a second pane of the plurality of planes. In response to the user selection, the computing device displays (1891) an updated rendering of the first snapshot that includes a text box alerting a viewer of the first snapshot that data of the first snapshot is incomplete. Displaying an updated rendering of the first snapshot with a text box alerting a viewer of the first snapshot that data of the first snapshot is incomplete improves user experience by alerting the viewers to the presence of missing data. This in turn leads to improved user trust in the data because the majority of users do not typically spend their time looking for missing data.

In some implementations, the computing device receives (1892) user selection of a layout type (e.g., curation method) for the first snapshot. In some implementations, the layout type is (1893) one of: a single view, a view stack, a carousel layout, a slideshow, a mini-dashboard, or an animation layout (e.g., GIF animation). This is illustrated in FIGS. 9A to 9D.

The computing device causes (1894) the first snapshot to be displayed as a message on a messaging application (e.g., messaging application 270 executed by an electronic device (e.g., distinct from the computing device) (e.g., electronic device 400). The messaging application is associated with a collaboration platform.

In some implementations, causing the first snapshot to be displayed on the electronic device includes causing (1895) the first snapshot to be displayed on the electronic device with the selected layout type.

It should be understood that the particular order in which the operations in FIGS. 18A to 18I have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1900 and 2000) are also applicable in an analogous manner to method 1800 described above with respect to FIGS. 18A to 18I.

FIGS. 19A to 19F provide a flowchart of a method 1900 of generating data snapshots for collaboration platforms, in accordance with some implementations. The method 1900 is also called a process.

The method 1900 is performed (1902) at a computer system (e.g., data visualization server 300 or collaboration platform server 500) that includes one or more processors (e.g., CPU(s) 302) and memory (e.g., memory 314). The memory stores (1904) one or more programs configured for execution by the one or more processors. In some implementations, the operations shown in FIGS. 1A, 1B, 6A-6D, 7A-7C, 9, 9A-9D, 10, 11A-11C, 12A-12D, 13A, 13B, 14A, 14B, 15A-15L, 16, and 17A-17H correspond to instructions stored in the memory or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 1900 may be combined and/or the order of some operations may be changed.

Method 1900 relates to creating a first data snapshot that includes one or more snapshot components, for display on a messaging application associated with a collaboration platform. Specifically, the first data snapshot includes a date/time for which data in the first snapshot is valid (e.g., fresh or up-to-date). When the computer system determines that the data in a snapshot component of the first snapshot is no longer up-to-date, the computer system retrieves (automatically, without user intervention), from a data source corresponding to the snapshot component, one or more updated data values and generates an updated snapshot using the updated data values. As a result, instead of relying on data professionals to constantly update the reports when new data arrives, the disclosed system improves user trust in the data and minimizes miscommunication with viewers (e.g., due to presenting invalid data).

The computer system receives (1906) user specification of respective values for a plurality of snapshot properties of a first snapshot. For example, in some implementations, the plurality of snapshot properties includes a metadata property, a components property, a text message property, a curation property, an export property, an auto-recur property, a freshness property, and a completeness property, as described with respect to Section II.D. and FIGS. 11A to 11C and 16.

The first snapshot includes (1908) one or more (e.g., at least one, at least two) snapshot components (e.g., snapshot components 252), including a first snapshot component that is extracted from a first data dashboard (e.g., data dashboard 258). The first data dashboard is associated with a first data source (e.g., data source 266). The user specification includes a first date/time for which data in the first snapshot is valid (e.g., the first snapshot includes a first snapshot component that expires, or whose values will not be up-to-date at the first) date/time. The user specification also includes a first collaboration platform (or a first channel of a collaboration platform) (e.g., a messaging group, a Slack channel) to which the first snapshot is to be exported.

In some implementations, the first snapshot component is generated (1912) according to a first snapshot component specification (e.g., component specification 250). The first snapshot component specification including a plurality of component properties having a plurality of corresponding property values, as discussed with respect to Section II.D, FIGS. 12A to 12D, and step 1810 in method 1800.

In some implementations, the first snapshot component specification is stored (1912) on the computer system (see, e.g., FIG. 3B).

In some implementations, the one or more snapshot components comprise (1914) a plurality of snapshot components. Each snapshot component of the plurality of snapshot components corresponds to a respective data element from a respective data dashboard.

In some implementations, the respective data element is (1916) one of: one or more data cells from the respective data dashboard; one or more data values of a data field from the respective data dashboard; one or more data fields from the respective dashboard; one or more data marks of a data visualization from the respective dashboard; or one or more data visualizations from the respective dashboard.

Referring to FIG. 19B, in some implementations, the one or more snapshot components include (1918) a second snapshot component that is extracted from a second data dashboard.

In some implementations, the second data dashboard is (1920) associated with the first data source.

In some implementations, the second data dashboard is (1922) associated with a second data source that is distinct from the first data source.

In some implementations, receiving the user specification of the respective values for the plurality of snapshot properties of the first snapshot includes receiving (1924) user specification of a plurality of first values corresponding to an automatic recurrence property of the first snapshot. In some implementations, the plurality of first values includes at least two of: a recurrence frequency (e.g., every week, every two weeks, or every month) (e.g., recurrence time interval 818); a recurrence expiration date (e.g., recurrence expiration date 820); and a time of day (e.g., a time of day 822) at which a recurrence of the first snapshot is caused to be displayed on the messaging application (e.g., messaging application 270).

Figure 9A:
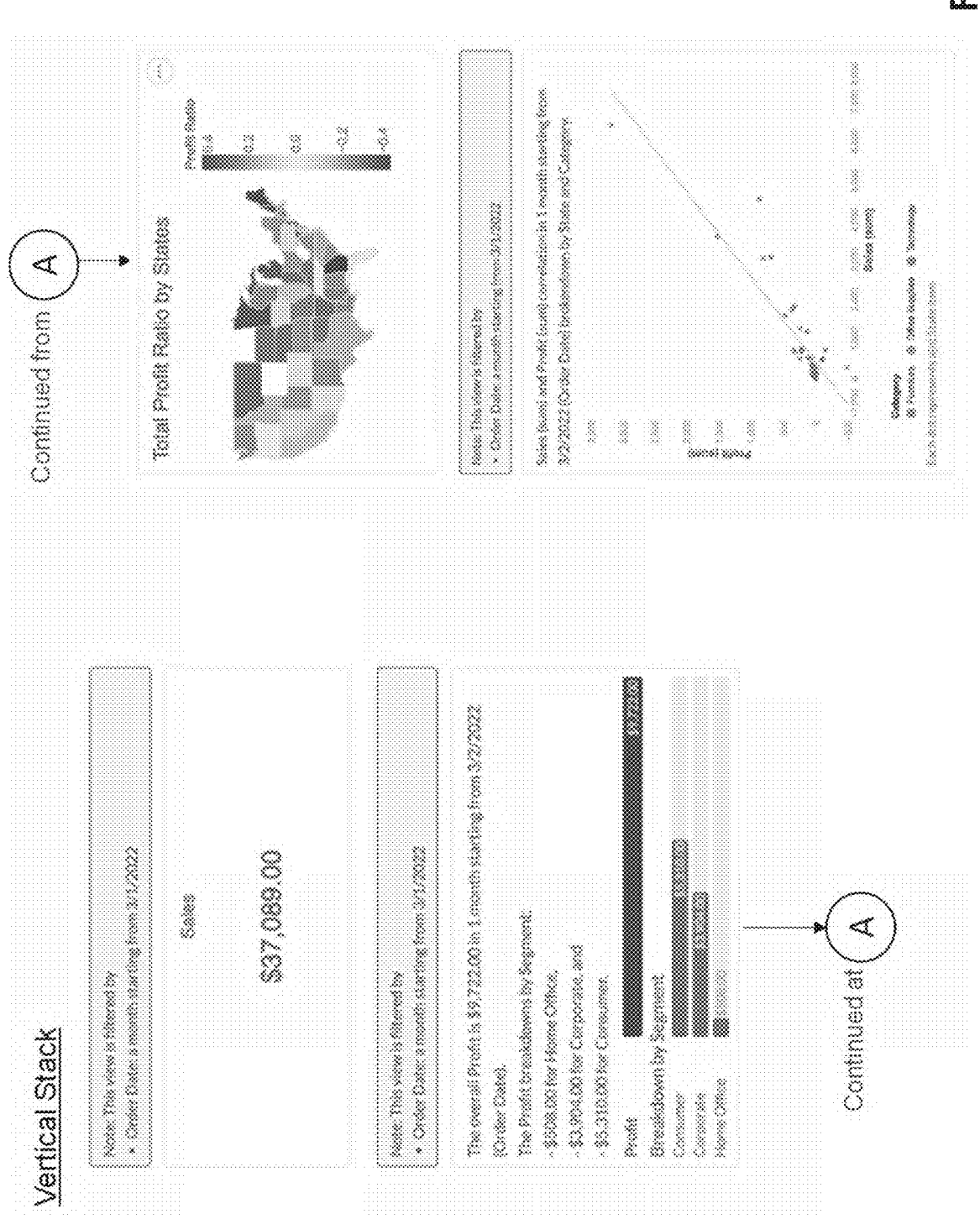
Figure 9C:
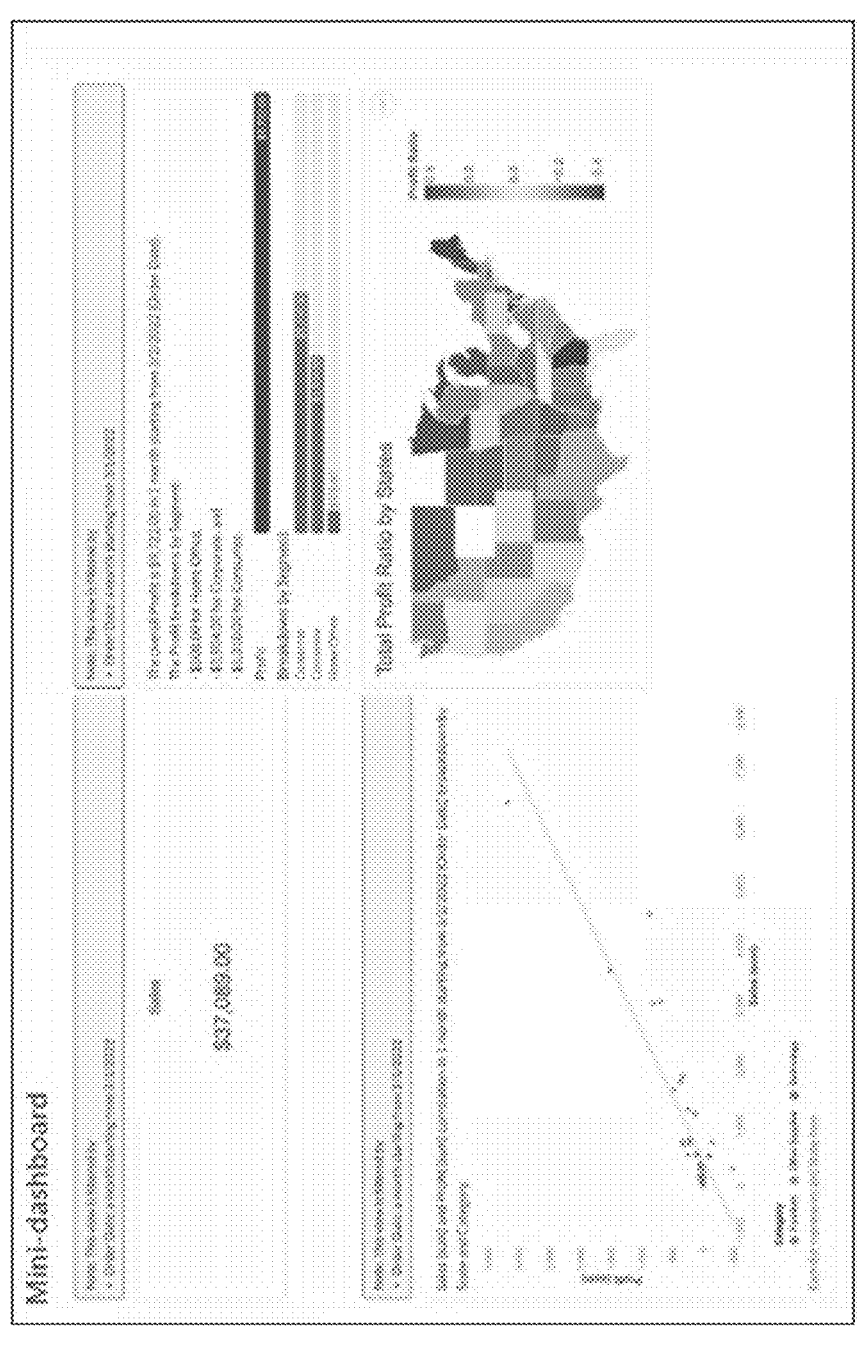
Figure 9D:
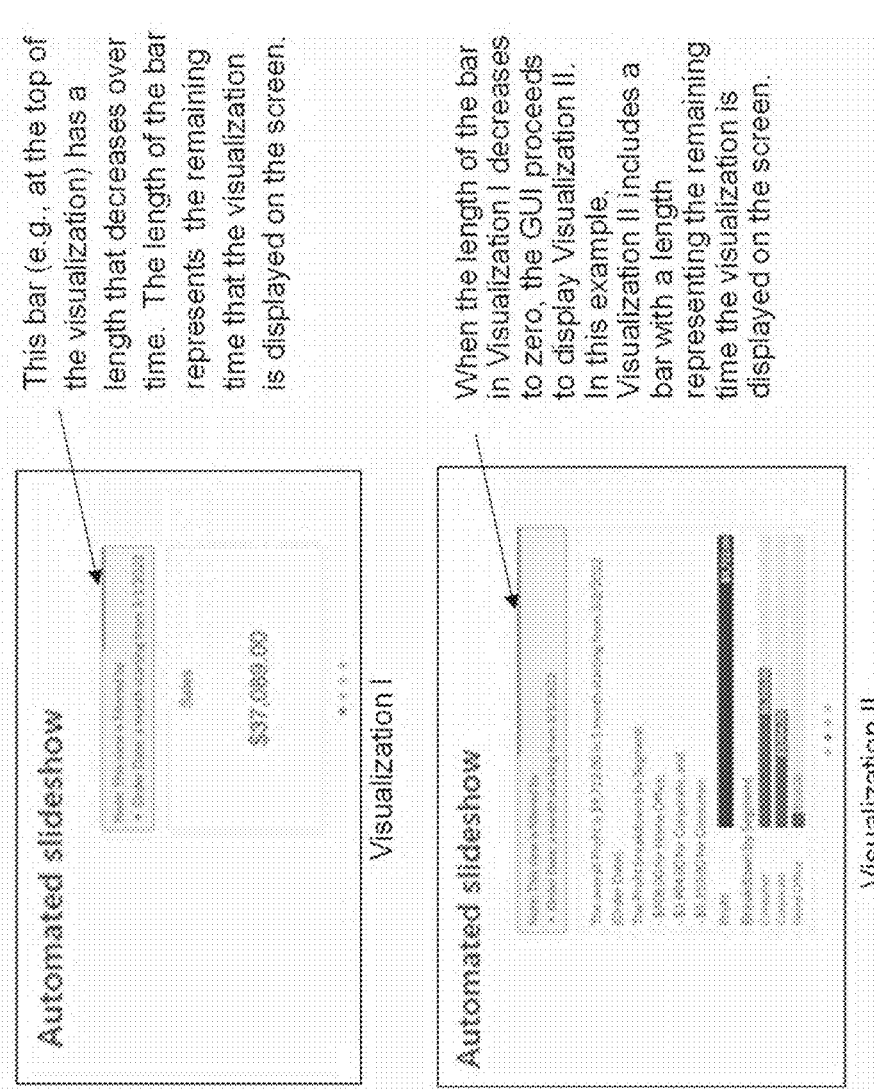

In some implementations, receiving the user specification of the respective values for the plurality of snapshot properties of the first snapshot includes receiving (1926) user specification of a layout type (e.g., curation method) for the first snapshot. Examples of curation methods are illustrated in FIG. 9A. For example, in some implementations, the layout type (e.g., curation method) is (1928) one of: a single view, a view stack, a carousel layout, a slideshow, a mini-dashboard, or an animation layout (e.g., GIF animation).

In some implementations, the user specification of the respective values for the plurality of snapshot properties of a first snapshot is received (1930) via a computing device (e.g., computing device 200) that is communicatively connected with, and distinct from, the computer system (e.g., data visualization server 300).

In some implementations, in accordance with receiving the user specification of the respective values for the plurality of snapshot properties of the first snapshot, the computer system causes (1932) a rendering of the first snapshot (e.g., rendering 838) to be displayed in a simulated chat interface (e.g., in preview panel 836) in the computing device (e.g., in a snapshot creator user interface 248.

Figure 19C:
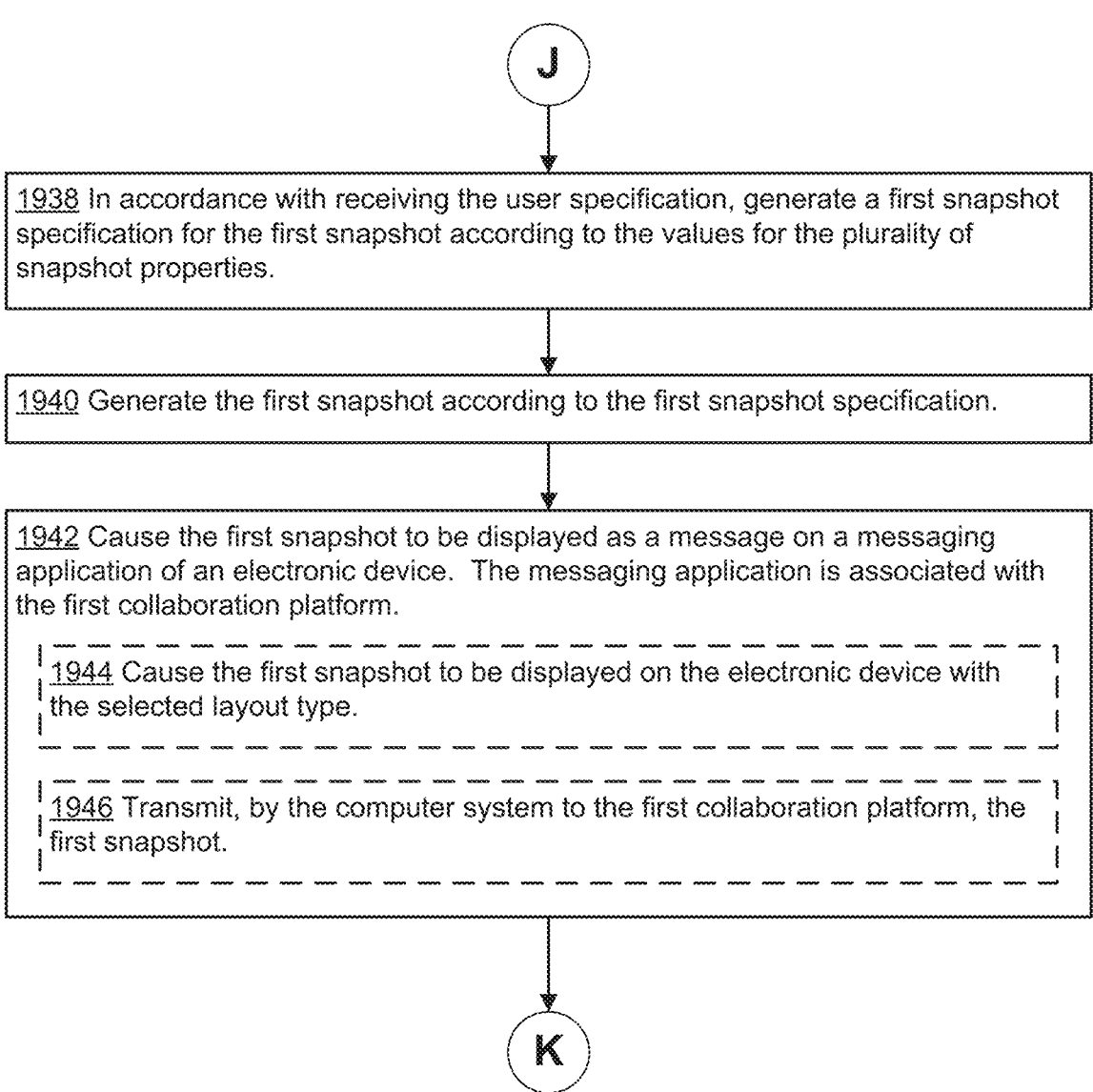

Referring to FIG. 19C, the computer system, in accordance with receiving the user specification, generates (1938) a first snapshot specification (e.g., snapshot specification 254) for the first snapshot according to the respective values for the plurality of snapshot properties. For example, in some implementations, a snapshot is formally declared as a tuple of metadata, components, text message, curation, export, auto-recur, freshness, and completeness. The metadata property includes the name, identifier (e.g., unique ID), and owner of a snapshot as well as a pointer to the actual chat message for this snapshot. Then, a snapshot needs a list of one or more components and an optional text message encompassing those components. The curation property specifies a curation method and details (e.g., slideshow timing, mini-dashboard layout). The export property contains the published date and time, the originally shared channel, the permission to share, and additionally shared channels. The auto-recur property rules whether to auto-recur, the interval by which to retrieve an update, and the time in a day to publish the updated snapshot.

The computer system generates (1940) the first snapshot according to the first snapshot specification.

The computer system causes (1942) the first snapshot to be displayed as a message on a messaging application (e.g., messaging application 270) of an electronic device (e.g., electronic device 400, distinct from the computer system). The messaging application is associated with the first collaboration platform (e.g., having a collaboration platform server 500).

In some implementations, causing the first snapshot to be displayed on the electronic device includes causing (1944) the first snapshot to be displayed on the electronic device with the selected layout type.

In some implementations, causing the first snapshot to be displayed as a message on the messaging application comprises transmitting (1946), by the computer system to the first collaboration platform, the first snapshot.

Referring to FIG. 19D, in some implementations, the computer system receives (1948) a first request from the first collaboration platform to update the first snapshot.

In some instances, the first request is initiated (1950) by a user of the electronic device.

In some instances, the first request is initiated (1952) by an author of the first snapshot.

In some implementations, in response to the first request, the computer system determines (1954) (e.g., by analyzing the first snapshot specification, such as a "freshness" value corresponding to the "freshness" property of the first snapshot specification) that a current date/time of the first request exceeds the first date/time for which the data in the first snapshot is valid.

In some implementations, in accordance with the determination that the current date/time of the first request exceeds the first date/time for which the data in the first snapshot is valid, the computer system retrieves (1956) (e.g., automatically, without user intervention), from the first data source, one or more updated data values for the first snapshot component. Because the first snapshot specification lists one or more components of the first snapshot (e.g., components property), and the metadata property of a respective snapshot includes pointers to the originating dashboard cell, the computer system can determine a respective data source (or data sources) for each of the snapshot components and retrieve updated data from the data sources directly and automatically without requiring user intervention.

In some implementations, after retrieving, from the first data source, the one or more updated data values for the first snapshot component, the computer system updates (1958) the first snapshot component specification according to the one or more updated data values.

In some implementations, the computer system generates (1962) an updated snapshot with the one or more updated data values for the first snapshot component.

In some implementations, the computer system causes (1964) the updated snapshot to be to be displayed on the electronic device.

With continued reference to FIG. 19E, in some implementations, subsequent to causing the first snapshot to be displayed as a message on the messaging application, the computer system, in accordance with a determination that the plurality of first values corresponding to the automatic recurrence property are satisfied, retrieves (1966) (e.g., automatically, without user intervention), from one or more data sources corresponding to the one or more snapshot components of the first snapshot, respective current data values for the one or more snapshot components. For example, the plurality of first values are satisfied when the recurrence frequency is met, or when the recurrence expiration is met, and/or when a time of day at which a recurrence of the first snapshot is caused to be displayed on the messaging application has past.

In some implementations, the computer system generates (1968) a first recurring version of the first snapshot.

In some implementations, the computer system causes (1970) the first recurring version of the first snapshot to be displayed (e.g., as a new message, on the same channel) on the messaging application of the electronic device.

In some implementations, the plurality of values includes (1972) the time of day at which a recurrence of the first snapshot is caused to be displayed on the messaging application. Causing the first recurring version of the first snapshot to be displayed on the messaging application of the electronic device includes causing the first recurring version of the first snapshot to be displayed at the time of day specified in the automatic recurrence property.

In some implementations, the computer system updates (1974) the first snapshot specification according to the respective current data values for the one or more snapshot components.

It should be understood that the particular order in which the operations in FIGS. 19A to 19E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1800 and 2000) are also applicable in an analogous manner to method 1900 described above with respect to FIGS. 19A to 19E.

FIGS. 20A to 20D provide a flowchart of a method 2000 of interacting with data snapshots, in accordance with some implementations. The method 2000 is also called a process.

The method 2000 is performed (2002) at a computing device (e.g., computing device 200 or electronic device 400) that includes one or more processors (e.g., CPU(s) 202 or CPU(s) 402) and memory (e.g., memory 206 or memory 406). The memory stores (2004) one or more programs configured for execution by the one or more processors. In some implementations, the operations shown in FIGS. 1A, 1B, 6A-6D, 7A-7C, 9, 9A-9D, 10, 11A-11C, 12A-12D, 13A, 13B, 14A, 14B, 15A-15L, 16, and 17A-17H correspond to instructions stored in the memory or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 1900 may be combined and/or the order of some operations may be changed.

Method 2000 relates to a user interface (e.g., snapshot home user interface 274) for supporting and monitoring the post-sharing life cycle of dashboard snapshots (e.g., data snapshots). Along with conversations, viewers will interact with dashboard snapshots, which log data. In some instances, dashboard snapshot creators may want to see such telemetry information to know about the spreadability and popularity of the snapshots they have authored. In addition, considering a user has actively shared dashboard snapshots on collaboration platform, it is often difficult to search or find their past dashboard snapshots. The disclosed user interface displays a collection of the past dashboard snapshots of a user and the telemetry information of each dashboard snapshot within a collaboration platform application in a centralized location, thereby facilitating better organization and conveyance of data. It also enhances user experience (e.g., by allowing a snapshot author to quickly and efficiently locate a snapshot instead of searching through multiple messages or threads).

The disclosed user interface (e.g., snapshot home user interface 274) also improves over conventional approaches such as "pinning" snapshots (i.e., bookmarking important contents in a conversation channel) on an author's own direct message channel because the number of snapshots can grow very quickly over time (e.g., especially when snapshots configured to auto-recur). Snapshot telemetry is useful for monitoring audiences' reactions, especially when is difficult for an author to connect with individual viewers (e.g., when audience size is large). In some instances, the snapshot telemetry/engagement data (e.g., view counts, emoji-reactions, identification of viewers who have viewed or engaged with the snapshots) can provide snapshot authors with a better understanding of the forms of content that get more attention from their audiences. Snapshot authors can use this understanding to adjust their subsequent snapshot designs, levels of detail, and publishing cadences accordingly. As a result, the disclosed method, system, and user interfaces improves data communication and makes the user-device interface more efficient.

The computing device displays a user interface (e.g., snapshot home user interface 274) that includes a plurality of panes (e.g., panes 1720; FIG. 10) corresponding to a plurality of snapshots (i) authored by a user (e.g., a first user account) of the computing device and (ii) displayed on a messaging application of a collaboration platform. Each pane, of the plurality of panes, includes (2008) a respective view (e.g., a visual rendering) of the respective snapshot (e.g., as illustrated in FIGS. 10 and 17F). The plurality of snapshots includes (2010) a first snapshot having one or more snapshot components. Each of the snapshot components is generated from a respective data element of a respective data dashboard.

In some implementations, the user interface is (2012) an interface of the collaboration platform.

In some implementations, the user interface is (2014) part of the same application displaying the respective data dashboard.

In some implementations, the respective data element is (2016) one of: one or more data cells from the respective data dashboard; one or more data values of a data field from the respective data dashboard; one or more data marks of a data visualization from the respective dashboard; or one or more data visualizations from the respective dashboard.

Referring to FIG. 20B, in some implementations, the first snapshot includes (2020) a first snapshot component generated from a first data element of a first data dashboard and a second snapshot component generated from a second data element of a second data dashboard, distinct from the first data dashboard.

In some implementations, the first data element and the second data element are (2022) associated with the same data source.

In some implementations, the first data element and the second data element are (2024) associated with distinct data sources.

The computing device displays (2026), in an information panel (e.g., information 1004, information panel 1722) adjacent to the first snapshot, information (e.g., telemetry information) regarding the first snapshot, including: (i) metadata of one or more originating dashboards (or originating dashboard cells) corresponding to the one or more snapshot components of the first snapshot; and (ii) identification of a first channel (e.g., a messaging group, a Slack channel) of the collaboration platform to which the first snapshot is published For example, in some implementations, the type of provided telemetry information includes: a number of views, a number of unique views, comments regarding the first snapshot, a number of reaction counts for the first snapshot, a list of people who viewed, commented, and/or reacted to the first snapshot, comment content of comments received for the first snapshot, usage of interactive filters by viewers, as well as general metadata (e.g., name, published date, and original dashboard).

In some implementations, the information regarding the first snapshot further includes identification (2028) of one or more users of the collaboration platform who have viewed the first snapshot.

In some implementations, the information regarding the first snapshot further includes (2030) information (e.g., metadata) regarding a date and time that the first snapshot was published on (e.g., to) the messaging application (or published to the collaboration platform).

Figure 20C:
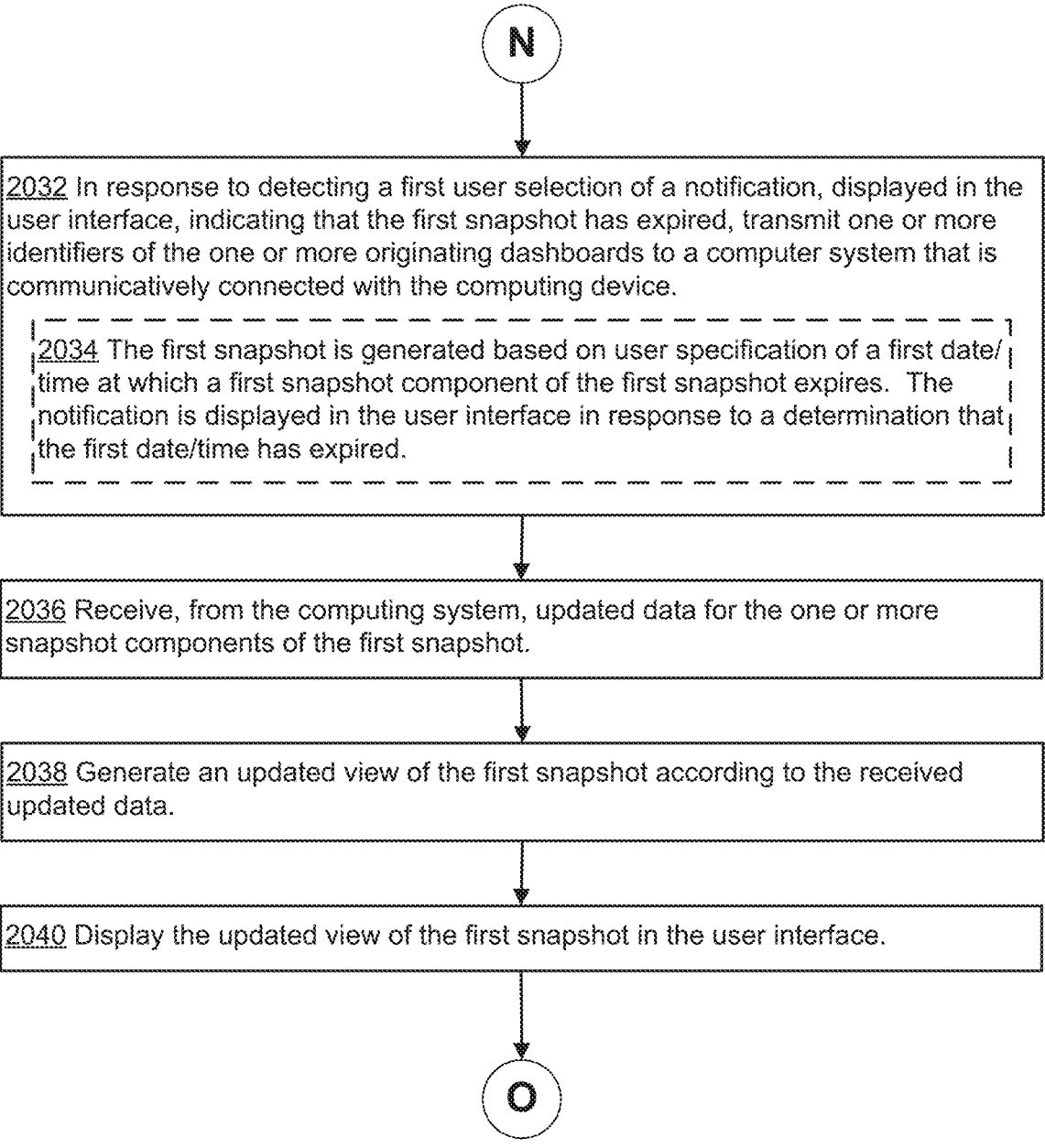
Figure 20D:
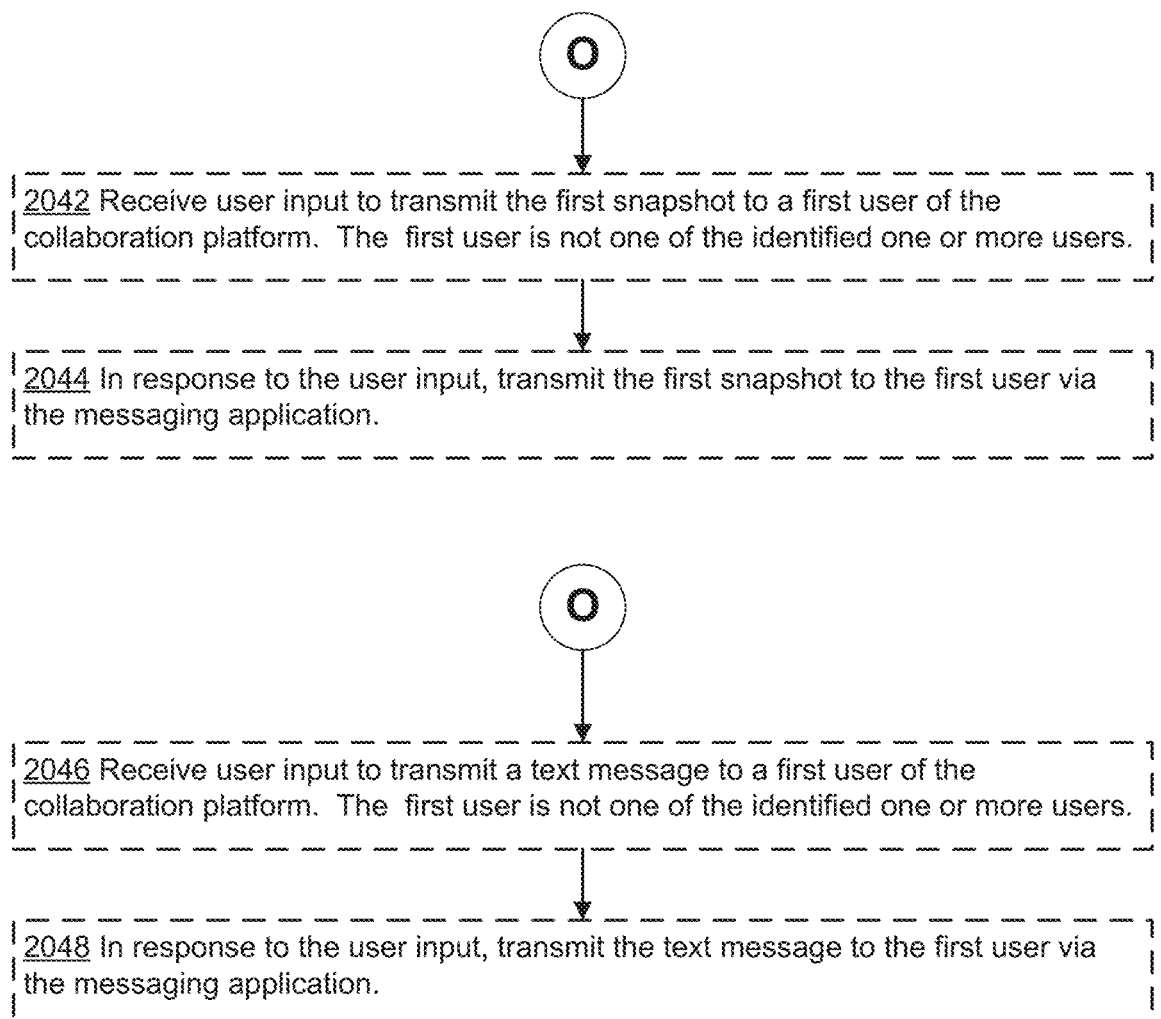

Referring to FIG. 20C, the computing device, in response to detecting a first user selection of a notification, displayed in the user interface (e.g., in the information panel), indicating that the first snapshot has expired (e.g., is no longer valid or fresh), transmits (2032) one or more identifiers of the one or more originating dashboards (or originating dashboard cells) to a computer system (e.g., data visualization server 300) that is communicatively connected with the computing device.

In some implementations, the first snapshot is generated (2034) based on user specification of a first date/time at which the first component expires. The notification is displayed in the user interface in response to a determination that the first date/time has expired.

The computing device receives (2036), from the computing system, updated data (or metadata) (e.g., data or metadata that are valid for the current time period) for the one or more snapshot components of the first snapshot;

The computing device generates (2038) an updated view of the first snapshot according to the received updated data.

The computing device displays (2040) the updated view of the first snapshot in the user interface.

In some implementations the computing device receives (2042) user input to transmit the first snapshot to a first user of the collaboration platform, where the first user is not one of the identified one or more users. In response to the user input, the computing device transmits (2044) the first snapshot to the first user via the messaging application.

In some implementations the computing device receives (2046) receiving user input to transmit a text message (e.g., distinct from the first snapshot) to a first user of the collaboration platform, wherein the first user is not one of the identified one or more users. In response to the user input, the computing device transmits (2048) the first snapshot to the first user via the messaging application.

It should be understood that the particular order in which the operations in FIGS. 20A to 20D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1800 and 1900) are also applicable in an analogous manner to method 2000 described above with respect to FIGS. 20A to 20D.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory stores a subset of the modules and data structures identified above. Furthermore, the memory may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or implementations.

As used herein, the term "and/or" encompasses any combination of listed elements. For example, "A, B, and/or C" includes the following sets of elements: A only, B only, C only, A and B without C, A and C without B, B and C without A, and a combination of all three elements, A, B, and C.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

Illustration of Subject Technology as Clauses

Some implementations are described with respect to the following clauses:

Clause 1. A method of retargeting dashboard content as data snapshots for collaboration platforms, comprising:

at a computing device having a display, one or more processors, and memory storing one or more programs configured for execution by the one or more processors:

receiving user selection of a first data element from a first data dashboard that is displayed on the computing device, the user selection designating the first data element as a first snapshot component of a first snapshot;

in response to receiving the user selection of the first data element from the first data dashboard, displaying, in a first user interface, a plurality of component properties for the first snapshot component;

receiving, via the first user interface, user specification of respective first values for at least a first subset of component properties of the plurality of component properties; in accordance with receiving the user specification of the respective first values for at least the first subset of component properties:

updating the first snapshot component according to the respective first values; generating a first snapshot that includes the first snapshot component; and causing the first snapshot to be displayed as a message on a messaging application executed by an electronic device, the messaging application associated with a collaboration platform.

Clause 2. The method of clause 1, further comprising: in accordance with receiving the user selection designating the first data element as the first snapshot component:

generating a first component specification corresponding to the first snapshot component, the first component specification including the plurality of component properties; and populating the first component specification with the respective first values in accordance with the user specification of the respective first values for at least the subset of the properties.

Clause 3. The method of clause 1 or clause 2, further comprising:

receiving, via the first user interface, user selection of a dimension data field and a sorting order; and generating the first snapshot component includes:

generating a bar chart having a plurality of data bars, each of the data bars representing a respective data value of a measure data field that is broken down by the dimension field and having a respective length that represents a portion of the first data element corresponding to the respective data value; and arranging the data bars in the sorting order according to respective lengths of the data bars.

Clause 4. The method of any of clauses 1-3, further comprising:

receiving, via the first user interface, user specification of a temporal data field and a date/time range for filtering the first data element; and generating the first snapshot component includes filtering the first data element to the date/time range of the temporal field.

Clause 5. The method of any of clauses 1-4, further comprising:

displaying, via the first user interface, a plurality of template icons corresponding to a plurality of templates;

receiving user selection of a first template icon of the plurality of template icons, the first template icon corresponding to a first template of the plurality of templates; receiving user specification of one or more parameters for the first template; and generating the first snapshot includes formatting the first snapshot component according to the first template and the one or more parameters.

Clause 6. The method of any of clauses 1-5, further comprising:

automatically generating a preview of the first snapshot component in accordance with the user specification of the respective first values for at least the first subset of component properties; and displaying the preview of the first snapshot component in the first user interface.

Clause 7. The method of clause 6, further comprising:

while displaying the preview of the first snapshot component, receiving user input on the preview of the first snapshot component to annotate the first snapshot at a first position of the first snapshot; and in response to receiving the user input, updating display of the preview to include a shape and/or a color at the first position of the first snapshot component.

Clause 8. The method of any of clauses 1-7, further comprising:

after generating the first snapshot component, displaying a visual representation of the first snapshot component in the first data dashboard.

Clause 9. The method of any of clauses 1-8, further comprising:

in response to the user selection of the first data element from the first data dashboard, replacing the display of the first data dashboard with a view of the first user interface.

Clause 10. The method of any of clauses 1-9, wherein:

the first data element is a data value of a measure data field; and the data value is determined via a first aggregation type.

Clause 11. The method of any of clauses 1-10, wherein the first data element comprises a data mark of a data visualization on the first dashboard.

Clause 12. The method of any of clauses 1-11, wherein the first data element is a data visualization on the first dashboard.

Clause 13. The method of any of clauses 1-12, wherein:

the first snapshot includes a second snapshot component that is distinct from the first snapshot component; and the method further comprises after generating the first snapshot component and prior to generating the second snapshot component:

receiving user selection of a second data element, the user selection designating the second data element as the second snapshot component for a first snapshot; and in accordance with receiving the user selection, generating a second component specification corresponding to the second snapshot component, the second component specification including the plurality of component properties.

Clause 14. The method of clause 13, wherein receiving the user selection designating the second data element as the second snapshot component includes receiving the user selection of the second data element from the first data dashboard that is displayed on the computing device.

Clause 15. The method of clause 13 or clause 14, wherein receiving the user selection designating the second data element as the second snapshot component includes receiving user selection of the second data element from a second data dashboard, distinct from the first data dashboard, that is displayed on the computing device.

Clause 16. The method of any of clauses 13-15, wherein the first data element is derived from a first data source and the second data element is derived from a second data source that is distinct from the first data source.

Clause 17. The method of any of clauses 1-16, further comprising: prior to causing the first snapshot to be displayed on the electronic device, receiving user selection of a layout type for the first snapshot; and causing the first snapshot to be displayed on the electronic device includes causing the first snapshot to be displayed on the electronic device with the selected layout type.

Clause 18. The method of clause 17, wherein the layout type is one of: a single view, a view stack, a carousel layout, a slideshow, a mini-dashboard, or an animation layout.

Clause 19. The method of any of clause 1-18, wherein: the first snapshot is specified by a plurality of snapshot properties; and generating the first snapshot includes receiving user specification of respective second values corresponding to the plurality of snapshot properties, including:

a first date/time until which data in the first snapshot is valid; and an identification of the collaboration platform to which the first snapshot is to be exported.

Clause 20. The method of clause 19, wherein the plurality of snapshot properties includes metadata properties, including:

a first metadata property that specifies an identifier of the first snapshot;

a second metadata property that specifies an owner of the first snapshot; and a third metadata property that specifies a pointer to the first chat message that displays the first snapshot.

Clause 21. The method of any of clauses 1-20, wherein:

the first data dashboard is displayed in a data visualization application; and the first user interface is a user interface of the data visualization application.

Clause 22. The method of any of clauses 1-21, wherein: the first data dashboard is displayed in a data visualization application; and the first user interface is a user interface of the collaboration platform.

Clause 23. The method of any of clauses 1-22, wherein:

the first data dashboard is displayed in a data visualization application; and the first user interface is a user interface of an application that is distinct from the data visualization application and distinct from the collaboration platform.

Clause 24. The method of any of clauses 1-23, wherein generating the first snapshot includes:

displaying a second user interface that includes a plurality of panes;

wherein a respective pane of the plurality of panes corresponds to a respective snapshot property of a plurality of snapshot properties of the first snapshot; and wherein user selection of a respective field in a respective pane, of the plurality of panes. specifies a respective value for a respective corresponding snapshot property.

Clause 25. The method of clause 24, further comprising:

after updating the first snapshot component according to the respective first values, replacing display of the first user interface with a view of the first data dashboard, wherein the second user interface is displayed in response to user selection of an affordance from the view of the first data dashboard.

Clause 26. The method of clause 24 or clause 25, wherein:

the first data dashboard is displayed in a data visualization application; and the second user interface is a user interface of the data visualization application.

Clause 27. The method of clause 24 or clause 25, wherein:

the first data dashboard is displayed in a data visualization application; and the second user interface is a user interface of the collaboration platform.

Clause 28. The method of clause 24 or clause 25, wherein:

the first data dashboard is displayed in a data visualization application; and the second user interface is a user interface of an application that is distinct from the data visualization application and distinct from the collaboration platform.

Clause 29. The method of clause 24 or clause 25, wherein:

the first user interface and the second user interface are both interfaces of the same application.

Clause 30. The method of any of clauses 24-29, further comprising:

displaying, in the second user interface, a rendering of the first snapshot in a simulated chat interface.

Clause 31. The method of clause 30, further comprising:

while displaying the rendering of the first snapshot in the second user interface, receiving, via the second user interface, user selection of a first user-selectable icon in a first pane of the plurality of panes; and in response to the user selection, displaying an updated rendering of the first snapshot that includes an affordance that enables a viewer of the first snapshot to request an updated first snapshot on the collaboration platform.

Clause 32. The method of clause 30 or clause 31, further comprising:

while displaying the rendering of the first snapshot in the second user interface, receiving, via the second user interface, user selection of a second user-selectable icon in a second pane of the plurality of planes; and in response to the user selection, displaying an updated rendering of the first snapshot that includes a text box alerting a viewer of the first snapshot that data of the first snapshot is incomplete.

Clause 33. A computing device, comprising:

a display;

one or more processors; and memory coupled to the one or more processors, the memory storing one or more programs configured for execution by the one or more processors, the one or more programs including instructions for performing the method of any of clauses 1-32.

Clause 34. A non-transitory computer-readable medium storing one or more programs configured for execution by one or more processors of a computing device, the one or more programs comprising instructions for performing the method of any of clauses 1-32.

Clause 35. A method of generating data snapshots for collaboration platforms, comprising:

at a computer system having one or more processors, and memory storing one or more programs configured for execution by the one or more processors:

receiving user specification of respective values for a plurality of snapshot properties of a first snapshot, wherein:

the first snapshot includes one or more snapshot components, including a first snapshot component that is extracted from a first data dashboard, the first data dashboard associated with a first data source; and the user specification includes:

a first date/time for which data in the first snapshot is valid; and a first collaboration platform to which the first snapshot is to be exported;

in accordance with receiving the user specification:

generating a first snapshot specification for the first snapshot according to the respective values for the plurality of snapshot properties; and generating the first snapshot according to the first snapshot specification; and causing the first snapshot to be displayed as a message on a messaging application of an electronic device, the messaging application associated with the first collaboration platform.

Clause 36. The method of clause 35, further comprising:

receiving a first request from the first collaboration platform to update the first snapshot; and in response to the first request, determining that a current date/time of the first request exceeds the first date/time for which the data in the first snapshot is valid; in accordance with the determination:

retrieving, from the first data source, one or more updated data values for the first snapshot component;

generating an updated snapshot with the one or more updated data values for the first snapshot component; and causing the updated snapshot to be to be displayed on the electronic device.

Clause 37. The method of clause 36, wherein:

the first snapshot component is generated according to a first snapshot component specification, the first snapshot component specification including a plurality of component properties having a plurality of corresponding property values; and the method further comprises:

after retrieving, from the first data source, the one or more updated data values for the first snapshot component, updating the first snapshot component specification according to the one or more updated data values.

Clause 38. The method of clause 37, wherein the first snapshot component specification is stored on the computer system.

Clause 39. The method of any of clauses 36-38, wherein the first request is initiated by a user of the electronic device.

Clause 40. The method of any of clauses 36-38, wherein the first request is initiated by an author of the first snapshot.

Clause 41. The method of any of clauses 35-40, wherein receiving the user specification of the respective values for the plurality of snapshot properties of the first snapshot includes receiving user specification of a plurality of first values corresponding to an automatic recurrence property of the first snapshot, the plurality of first values including at least two of:

a recurrence frequency;

a recurrence expiration date; and a time of day at which a recurrence of the first snapshot is caused to be displayed on the messaging application.

Clause 42. The method of clause 41, further comprising: subsequent to causing the first snapshot to be displayed as a message on the messaging application:

in accordance with a determination by the computer system that the plurality of first values corresponding to the automatic recurrence property are satisfied:

retrieving, from one or more data sources corresponding to the one or more snapshot components of the first snapshot, respective current data values for the one or more snapshot components;

generating a first recurring version of the first snapshot; and causing the first recurring version of the first snapshot to be displayed on the messaging application of the electronic device.

Clause 43. The method of clause 42, wherein:

the plurality of first values corresponding to the automatic recurrence property of the first snapshot includes the time of day at which a recurrence of the first snapshot is caused to be displayed on the messaging application; and causing the first recurring version of the first snapshot to be displayed on the messaging application of the electronic device includes causing the first recurring version of the first snapshot to be displayed at the time of day specified in the automatic recurrence property.

Clause 44. The method of clause 42 or clause 43, further comprising updating the first snapshot specification according to the respective current data values for the one or more snapshot components.

Clause 45. The method of any of clauses 35-44, wherein receiving the user specification of the respective values for the plurality of snapshot properties of the first snapshot includes receiving user specification of a layout type for the first snapshot; and causing the first snapshot to be displayed on the electronic device includes causing the first snapshot to be displayed on the electronic device with the selected layout type.

Clause 46. The method of clause 44, wherein the layout type is one of: a single view, a view stack, a carousel layout, a slideshow, a mini-dashboard, or an animation layout.

Clause 47. The method of any of clauses 35-46, wherein:

the one or more snapshot components comprises a plurality of snapshot components; and each snapshot component of the plurality of snapshot components corresponds to a respective data element from a respective data dashboard.

Clause 48. The method of clause 47, wherein the respective data element is one of:

one or more data cells from the respective data dashboard;

one or more data values of a data field from the respective data dashboard;

one or more data fields from the respective dashboard;

one or more data marks of a data visualization from the respective dashboard; or one or more data visualizations from the respective dashboard.

Clause 49. The method of any of clauses 35-48, wherein the user specification is received via a computing device that is communicatively connected with, and distinct from, the computer system.

Clause 50. The method of clause 49, further comprising:

in accordance with receiving the user specification of the respective values for the plurality of snapshot properties of the first snapshot, causing a rendering of the first snapshot to be displayed in a simulated chat interface in the computing device.

Clause 51. The method of any of clauses 35-50, wherein causing the first snapshot to be displayed as a message on the messaging application comprises transmitting, by the computer system to the first collaboration platform, the first snapshot.

Clause 52. The method of any of clauses 35-51, wherein the one or more snapshot components include a second snapshot component that is extracted from a second data dashboard.

Clause 53. The method of clause 52, wherein the second data dashboard is associated with the first data source.

Clause 54. The method of clause 52, wherein the second data dashboard is associated with a second data source that is distinct from the first data source.

Clause 55. A computer system, comprising:

one or more processors; and memory coupled to the one or more processors, the memory storing one or more programs configured for execution by the one or more processors, the one or more programs including instructions for performing the method of any of clauses 35-54.

Clause 56. A non-transitory computer-readable medium storing one or more programs configured for execution by one or more processors of a computer system, the one or more programs comprising instructions for performing the method of any of clauses 35-54.

Clause 57. A method of interacting with data snapshots, comprising:

at a computing device that includes a display, one or more processors, and memory storing one or more programs configured for execution by the one or more processors:

displaying a user interface that includes a plurality of panes corresponding to a plurality of snapshots (i) authored by a user of the computing device and (ii) displayed on a messaging application of a collaboration platform, wherein:

each pane, of the plurality of panes, includes a respective view of the respective snapshot; and the plurality of snapshots includes a first snapshot having one or more snapshot components, wherein each of the snapshot components is generated from a respective data element of a respective data dashboard;

displaying, in an information panel adjacent to the first snapshot, information regarding the first snapshot, including:

metadata of one or more originating dashboards corresponding to the one or more snapshot components of the first snapshot; and identification of a first channel of the collaboration platform to which the first snapshot is published; and in response to detecting a first user selection of a notification, displayed in the user interface, indicating that the first snapshot has expired:

transmitting one or more identifiers of the one or more originating dashboards to a computer system that is communicatively connected with the computing device; and receiving, from the computing system, updated data for the one or more snapshot components of the first snapshot;

generating an updated view of the first snapshot according to the received updated data; and displaying the updated view of the first snapshot in the user interface.

Clause 58. The method of clause 57, wherein:

the first snapshot is generated based on user specification of a first date/time at which a first snapshot component of the first snapshot expires; and the notification is displayed in the user interface in response to a determination that the first date/time has expired.

Clause 59. The method of clause 57 or clause 58, wherein the information regarding the first snapshot further includes information regarding a date and time that the first snapshot was published on the messaging application.

Clause 60. The method of any of clauses 57-59, wherein the information regarding the first snapshot further includes:

identification of one or more users of the collaboration platform who have viewed the first snapshot.

Clause 61. The method of clause 60, further comprising:

receiving user input to transmit the first snapshot to a first user of the collaboration platform, wherein the first user is not one of the identified one or more users; and in response to the user input, transmitting the first snapshot to the first user via the messaging application.

Clause 62. The method of clauses 60 or 61, further comprising: receiving user input to transmit a text message to a first user of the collaboration platform, wherein the first user is not one of the identified one or more users; and in response to the user input, transmitting the text message to the first user via the messaging application.

Clause 63. The method of any of clauses 57-62, wherein the user interface is an interface of the collaboration platform.

Clause 64. The method of any of clauses 57-63, wherein the user interface is part of the same application displaying the respective data dashboard.

Clause 65. The method of any of clauses 57-64, wherein the respective data element is one of:

one or more data cells from the respective data dashboard;

one or more data values of a data field from the respective data dashboard;

one or more data fields from the respective dashboard;

one or more data marks of a data visualization from the respective dashboard; or one or more data visualizations from the respective dashboard.

Clause 66. The method of any of clauses 57-65, wherein the first snapshot includes:

a first snapshot component generated from a first data element of a first data dashboard; and a second snapshot component generated from a second data element of a second data dashboard, distinct from the first data dashboard.

Clause 67. The method of clause 66, wherein the first data element and the second data element are associated with the same data source.

Clause 68. The method of clause 66, wherein the first data element and the second data element are associated with distinct data sources.

Clause 69. A computer system, comprising:

one or more processors; and memory coupled to the one or more processors, the memory storing one or more programs configured for execution by the one or more processors, the one or more programs including instructions for performing the method of any of clauses 57-68.

Clause 70. A non-transitory computer-readable medium storing one or more programs configured for execution by one or more processors of a computer system, the one or more programs comprising instructions for performing the method of any of clauses 57-68.

What is claimed is:

1. A method of interacting with data snapshots, comprising:

at a computing device that includes a display, one or more processors, and memory storing one or more programs configured for execution by the one or more processors:

displaying a user interface that includes a plurality of panes corresponding to a plurality of snapshots (i) authored by a user of the computing device and (ii) displayed on a messaging application of a collaboration platform, wherein:

each pane, of the plurality of panes, includes a respective view of the respective snapshot; and the plurality of snapshots includes a first snapshot having one or more snapshot components, wherein each of the snapshot components is generated from a respective data element of a respective data dashboard;

displaying, in an information panel adjacent to the first snapshot, information regarding the first snapshot, including:

metadata of one or more originating dashboards corresponding to the one or more snapshot components of the first snapshot; and identification of a first channel of the collaboration platform to which the first snapshot is published; and in response to detecting a first user selection of a notification, displayed in the user interface, indicating that the first snapshot has expired:

transmitting one or more identifiers of the one or more originating dashboards to a computer system that is communicatively connected with the computing device; and receiving, from the computer system, updated data for the one or more snapshot components of the first snapshot;

generating an updated view of the first snapshot according to the received updated data; and displaying the updated view of the first snapshot in the user interface.

2. The method of claim 1, wherein:

the first snapshot is generated based on user specification of a first date/time at which a first snapshot component of the first snapshot expires; and the notification is displayed in the user interface in response to a determination that the first date/time has expired.

3. The method of claim 1, wherein the information regarding the first snapshot further includes information regarding a date and time that the first snapshot was published on the messaging application.

4. The method of claim 1, wherein the information regarding the first snapshot further includes:

identification of one or more users of the collaboration platform who have viewed the first snapshot.

5. The method of claim 4, further comprising:

receiving user input to transmit the first snapshot to a first user of the collaboration platform, wherein the first user is not one of the identified one or more users; and in response to the user input, transmitting the first snapshot to the first user via the messaging application.

6. The method of claim 4, further comprising:

receiving user input to transmit a text message to a first user of the collaboration platform, wherein the first user is not one of the identified one or more users; and in response to the user input, transmitting the text message to the first user via the messaging application.

7. The method of claim 1, wherein the user interface is an interface of the collaboration platform.

8. The method of claim 1, wherein the user interface is part of the same application displaying the respective data dashboard.

9. The method of claim 1, wherein each data element is one of:

one or more data cells from the respective data dashboard;

one or more data values of a data field from the respective data dashboard;

one or more data marks of a data visualization from the respective dashboard; or one or more data visualizations from the respective dashboard.

10. The method of claim 1, wherein the first snapshot includes:

a first snapshot component generated from a first data element of a first data dashboard; and a second snapshot component generated from a second data element of a second data dashboard, distinct from the first data dashboard.

11. The method of claim 10, wherein the first data element and the second data element are associated with the same data source.

12. The method of claim 10, wherein the first data element and the second data element are associated with distinct data sources.

13. A computing device, comprising:

a display;

one or more processors; and memory coupled to the one or more processors, the memory storing one or more programs configured to be executed by the one or more processors, the one or more programs including instructions for:

displaying a user interface that includes a plurality of panes corresponding to a plurality of snapshots (i) authored by a user of the computing device and (ii) displayed on a messaging application of a collaboration platform, wherein:

each pane, of the plurality of panes, includes a respective view of the respective snapshot; and the plurality of snapshots includes a first snapshot having one or more snapshot components, wherein each of the snapshot components is generated from a respective data element of a respective data dashboard;

displaying, in an information panel adjacent to the first snapshot, information regarding the first snapshot, including:

metadata of one or more originating dashboards corresponding to the one or more snapshot components of the first snapshot; and identification of a first channel of the collaboration platform to which the first snapshot is published; and in response to detecting a first user selection of a notification, displayed in the user interface, indicating that the first snapshot has expired:

transmitting one or more identifiers of the one or more originating dashboards to a computer system that is communicatively connected with the computing device; and receiving, from the computing system, updated data for the one or more snapshot components of the first snapshot;

generating an updated view of the first snapshot according to the received updated data; and displaying the updated view of the first snapshot in the user interface.

14. The computing device of claim 13, wherein:

the first snapshot is generated based on user specification of a first date/time at which a first snapshot component of the first snapshot expires; and the notification is displayed in the user interface in response to a determination that the first date/time has expired.

15. The computing device of claim 13, wherein the information regarding the first snapshot further includes:

identification of one or more users of the collaboration platform who have viewed the first snapshot.

16. The computing device of claim 15, wherein the one or more programs further include instructions for:

receiving user input to transmit the first snapshot to a first user of the collaboration platform, wherein the first user is not one of the identified one or more users; and in response to the user input, transmitting the first snapshot to the first user via the messaging application.

17. The computing device of claim 15, wherein the one or more programs further include instructions for:

receiving user input to transmit a text message to a first user of the collaboration platform, wherein the first user is not one of the identified one or more users; and in response to the user input, transmitting the text message to the first user via the messaging application.

18. A non-transitory computer-readable storage medium storing one or more programs, the one or more programs comprising instructions, which when executed by a computing device having a display, one or more processors, and memory, cause the computing device to perform operations comprising:

displaying a user interface that includes a plurality of panes corresponding to a plurality of snapshots (i) authored by a user of the computing device and (ii) displayed on a messaging application of a collaboration platform, wherein:

each pane, of the plurality of panes, includes a respective view of the respective snapshot; and the plurality of snapshots includes a first snapshot having one or more snapshot components, wherein each of the snapshot components is generated from a respective data element of a respective data dashboard;

displaying, in an information panel adjacent to the first snapshot, information regarding the first snapshot, including:

metadata of one or more originating dashboards corresponding to the one or more snapshot components of the first snapshot; and identification of a first channel of the collaboration platform to which the first snapshot is published; and in response to detecting a first user selection of a notification, displayed in the user interface, indicating that the first snapshot has expired:

transmitting one or more identifiers of the one or more originating dashboards to a computer system that is communicatively connected with the computing device; and receiving, from the computing system, updated data for the one or more snapshot components of the first snapshot;

generating an updated view of the first snapshot according to the received updated data; and displaying the updated view of the first snapshot in the user interface.

19. The non-transitory computer-readable storage medium of claim 18, wherein the information regarding the first snapshot further includes information regarding a date and time that the first snapshot was published on the messaging application.

20. The non-transitory computer-readable storage medium of claim 18, wherein each data element is one of:

one or more data cells from the respective data dashboard;

one or more data values of a data field from the respective data dashboard;

one or more data marks of a data visualization from the respective dashboard; or one or more data visualizations from the respective dashboard.

\* \* \* \* \*